United States Patent
Tsuda et al.

(10) Patent No.: US 11,621,732 B2
(45) Date of Patent: Apr. 4, 2023

(54) HIGH-FREQUENCY FRONT END MODULE AND COMMUNICATION DEVICE

(71) Applicant: Murata Manufacturing Co., Ltd., Kyoto (JP)

(72) Inventors: Motoji Tsuda, Kyoto (JP); Takayuki Nakamura, Kyoto (JP); Daerok Oh, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/651,922

(22) Filed: Feb. 22, 2022

(65) Prior Publication Data

US 2022/0182081 A1    Jun. 9, 2022

Related U.S. Application Data

(63) Continuation of application No. 17/222,231, filed on Apr. 5, 2021, now Pat. No. 11,290,135, which is a (Continued)

(30) Foreign Application Priority Data

Feb. 5, 2018  (JP) ............................. JP2018-018138

(51) Int. Cl.
  *H04B 1/00*  (2006.01)
  *H04B 1/12*  (2006.01)
  (Continued)

(52) U.S. Cl.
  CPC ......... *H04B 1/0064* (2013.01); *H04B 1/0078* (2013.01); *H04B 1/126* (2013.01); *H04B 1/18* (2013.01); *H04B 7/0413* (2013.01)

(58) Field of Classification Search
  CPC ........ H04B 1/18; H04B 1/0064; H04B 1/126; H04B 1/0078; H04B 7/0413
  See application file for complete search history.

(56) References Cited

U.S. PATENT DOCUMENTS 10,998,924 B2    5/2021  Tsuda et al.
2008/0212552 A1*  9/2008  Fukamachi ............ H04B 1/006
                                      370/343

(Continued)

FOREIGN PATENT DOCUMENTS

JP  2014-011515 A  1/2014
JP  2015-139005 A  7/2015

(Continued)

OTHER PUBLICATIONS

International Search Report issued in Application No. PCT/JP2019/003988 dated Apr. 9, 2019.

(Continued)

*Primary Examiner* — Rahel Guarino
(74) *Attorney, Agent, or Firm* — Pearne & Gordon LLP

(57) ABSTRACT

A high-frequency front end module includes a primary antenna terminal and a secondary antenna terminal, a first multiplexer and a second multiplexer, a switch circuit, and a first amplifier and a second amplifier. The first multiplexer has a first transmission filter and a first reception filter. The second multiplexer has a second transmission filter and a second reception filter. The switch circuit exclusively switches connection between the primary antenna terminal and the first multiplexer and connection between the primary antenna terminal and the second multiplexer, and exclusively switches connection between the secondary antenna terminal and the first multiplexer and connection between the secondary antenna terminal and the second multiplexer.

14 Claims, 23 Drawing Sheets

Related U.S. Application Data continuation of application No. 16/984,512, filed on Aug. 4, 2020, now Pat. No. 10,998,924, which is a continuation of application No. PCT/JP2019/003988, filed on Feb. 5, 2019.

(51) Int. Cl.
  *H04B 1/18* (2006.01)
  *H04B 7/0413* (2017.01)

(56) References Cited

U.S. PATENT DOCUMENTS

| | | |
|---|---|---|
| 2014/0003300 A1 | 1/2014 | Weissman et al. |
| 2014/0133364 A1 | 5/2014 | Weissman et al. |
| 2018/0138927 A1 | 5/2018 | Nagumo et al. |
| 2018/0294858 A1 | 10/2018 | Pehlke |

FOREIGN PATENT DOCUMENTS

| | | |
|---|---|---|
| JP | 2015-528237 A | 9/2015 |
| JP | 2016-501467 A | 1/2016 |
| WO | 2017/013910 A1 | 1/2017 |

OTHER PUBLICATIONS

Written Opinion issued in Application No. PCT/JP2019/003988 dated Apr. 9, 2019.

\* cited by examiner

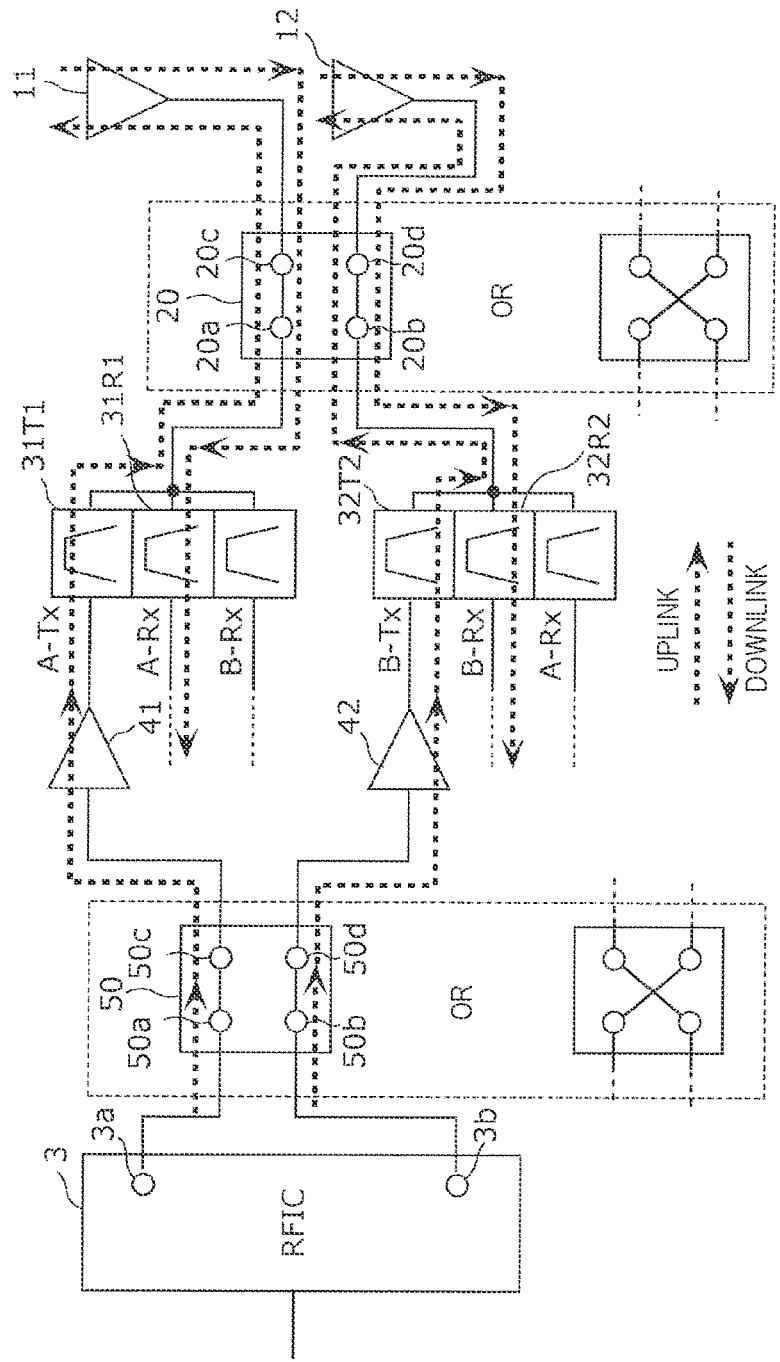

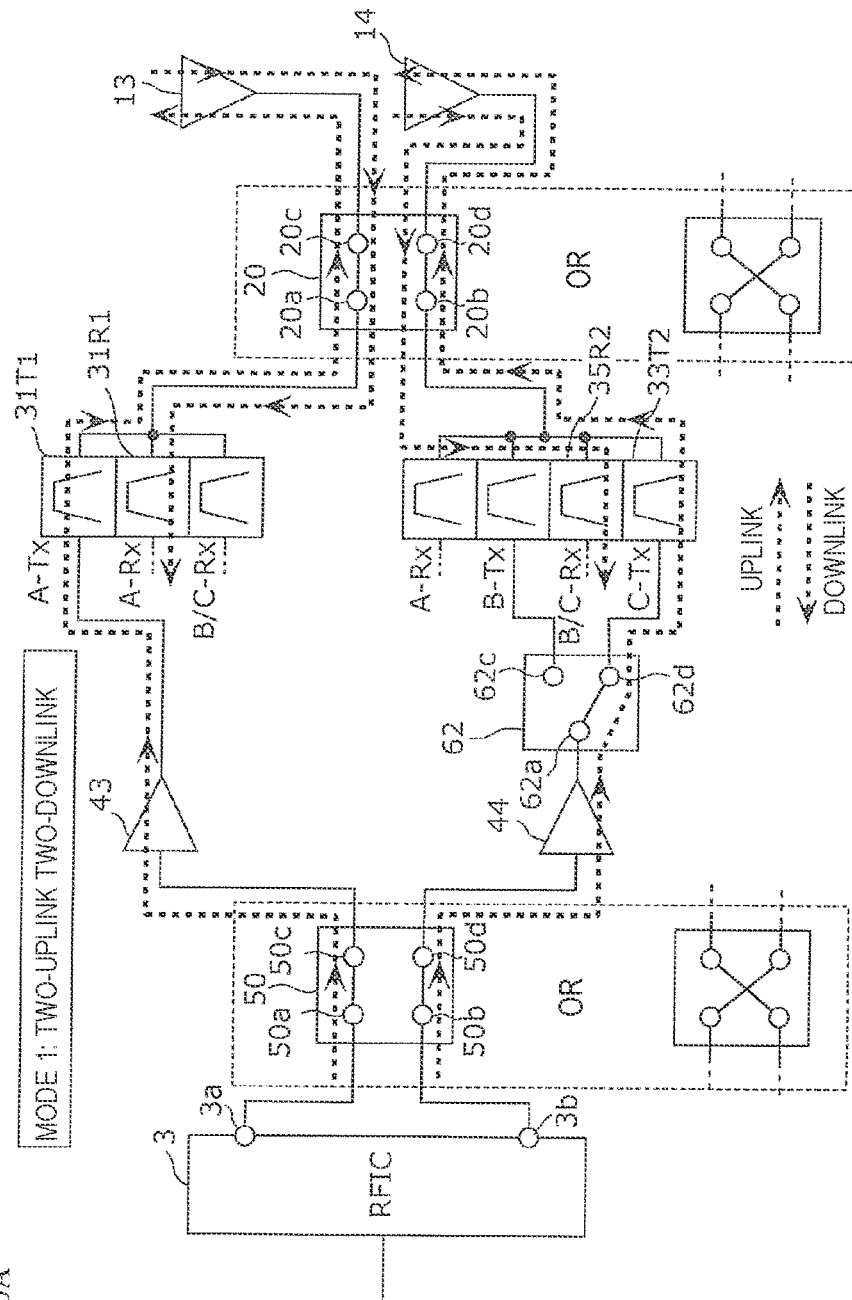

HIGH-FREQUENCY FRONT END MODULE AND COMMUNICATION DEVICE

This is a continuation of U.S. patent application Ser. No. 17/222,231 filed on Apr. 5, 2021, which is a continuation of U.S. patent application Ser. No. 16/984,512 filed on Aug. 4, 2020, which is a continuation of International Application No. PCT/JP2019/003988 filed on Feb. 5, 2019, which claims priority from Japanese Patent Application No. 2018-018138 filed on Feb. 5, 2018. The contents of these applications are incorporated herein by reference in their entireties.

BACKGROUND OF THE DISCLOSURE

1. Field of the Disclosure

The present disclosure relates to a high-frequency front end module and a communication device that process a high-frequency signal.

2. Description of the Related Art

There is a demand for applying a carrier aggregation (CA) system in which different frequency bands are simultaneously used to a multi-band and multi-mode compatible high-frequency front end module.

Japanese Unexamined Patent Application Publication (Translation of PCT Application) No. 2016-501467 discloses an antenna interface circuit that performs simultaneous transmission (two-uplink) and simultaneous reception (two-downlink) of signals in different frequency bands using two antennas. More specifically, the antenna interface circuit includes a first antenna interface circuit coupled to a first antenna and a second antenna interface circuit coupled to a second antenna. The first antenna interface circuit includes a first quadplexer for a first band and a second band. Additionally, the second antenna interface circuit includes a second quadplexer for the first band and the second band.

In a system applied to two-uplink two-downlink, as in the antenna interface circuit disclosed in Japanese Unexamined Patent Application Publication (Translation of PCT Application) No. 2016-501467, the two antennas are disposed in order to suppress mutual interference of two signals to be simultaneously transmitted, the first antenna is allocated to a primary antenna that is preferentially used in terms of antenna performance and the like, and the second antenna is allocated to a secondary antenna. In such a system, in order to optimize signal quality even in one-uplink, it is necessary to transmit and receive each of the first band and the second band by using the primary antenna. Therefore, each of the first antenna interface circuit and the second antenna interface circuit requires four filters of a transmission filter and a reception filter which take the first band as a pass band and a transmission filter and a reception filter which take the second band as a pass band. That is, since the antenna interface circuit disclosed in Japanese Unexamined Patent Application Publication (Translation of PCT Application) No. 2016-501467 requires a total of eight filters, there is a problem in that the circuit increases in size as the number of bands increases.

BRIEF SUMMARY OF THE DISCLOSURE

Accordingly, the present disclosure has been made in order to solve the above-described problem, and an object of the present disclosure is to provide a high-frequency front end module and a communication device which are reduced in size and in which CA of two-uplink two-downlink can be performed.

In order to achieve the above-described object, a high-frequency front end module according to a preferred embodiment of the present disclosure is a high-frequency front end module for executing two-uplink in which a signal in a first transmission band included in a first frequency band and a signal in a second transmission band included in a second frequency band which is different from the first frequency band are simultaneously transmitted, and two-downlink in which a signal in a first reception band included in the first frequency band and a signal in a second reception band included in the second frequency band are simultaneously received, the high-frequency front end module includes: a primary antenna and a secondary antenna; a first multiplexer and a second multiplexer; and a first switch circuit having a first terminal, a second terminal, a third terminal, and a fourth terminal, in which the first multiplexer has a first transmission filter which takes the first transmission band as a pass band and a first reception filter which takes the first reception band as a pass band, and does not have a transmission filter which takes the second transmission band as a pass band, the second multiplexer has a second transmission filter which takes the second transmission band as a pass band and a second reception filter which takes the second reception band as a pass band, and does not have a transmission filter which takes the first transmission band as a pass band, the first terminal is connected to the primary antenna, the second terminal is connected to the secondary antenna, the third terminal is connected to an output terminal of the first transmission filter and an input terminal of the first reception filter, and the fourth terminal is connected to an output terminal of the second transmission filter and an input terminal of the second reception filter.

In an existing system including a CA mode in which high-frequency signals in the first frequency band and the second frequency band which are two different bands are simultaneously used, in order to ensure signal quality such as isolation and the like of two high-frequency signals simultaneously transmitted/received, two antenna elements, such as a primary antenna which is preferentially used and a secondary antenna which is secondarily used, are disposed. In this case, because of necessity of making it possible to transmit/receive each of the high-frequency signals in the first frequency band and the second frequency band even by any of the antennas, a transmission path and a reception path of the first frequency band and a transmission path and a reception path of the second frequency band are connected to the primary antenna, and a transmission path and a reception path of the first frequency band and a transmission path and a reception path of the second frequency band are connected and disposed also to the secondary antenna. A filter for selectively allowing the desired frequency band to pass therethrough is disposed in each signal path, and in the existing configuration, it is necessary to connect four filters of a transmission filter and a reception filter of the first frequency band and a transmission filter and a reception filter of the second frequency band to each of the primary antenna and the secondary antenna, which increases the circuit in size.

In contrast, according to the above-described configuration, by disposing the first switch circuit, it is possible to arbitrarily distribute the high-frequency signals in the first frequency band and the second frequency band to the primary antenna and the secondary antenna, and execute CA of two-uplink two-downlink. Therefore, in the first multiplexer connected to one of the antennas, one of the two transmission filters of the first frequency band and the second frequency band can be reduced. In the same manner, in the second multiplexer, the other of the two transmission filters of the first frequency band and the second frequency band can be reduced. That is, two or more filters can be reduced as compared with the existing configuration. In this configuration, one switch circuit of a two-input two-output type is added, but the switch circuit is sufficiently smaller than the filter. Accordingly, it is possible to provide a small-sized high-frequency front end module in which CA of two-uplink two-downlink can be performed.

Furthermore, in the first switch circuit, conduction between the third terminal and the first terminal and conduction between the third terminal and the second terminal may be exclusively switched, and conduction between the fourth terminal and the first terminal and conduction between the fourth terminal and the second terminal may be exclusively switched.

According to this configuration, by switching the connection state of the first switch circuit, it is possible to arbitrarily distribute the high-frequency signals in the first frequency band and the second frequency band to the primary antenna and the secondary antenna, and execute CA of two-uplink two-downlink. Therefore, in the first multiplexer connected to one of the antennas, one of the two transmission filters of the first frequency band and the second frequency band can be reduced. In the same manner, in the second multiplexer, the other of the two transmission filters of the first frequency band and the second frequency band can be reduced.

Furthermore, the first multiplexer may not have a filter which takes the second reception band as a pass band, and the second multiplexer may not have a filter which takes the first reception band as a pass band.

According to this configuration, in the first multiplexer connected to one of the antennas, the transmission filter and the reception filter of one of the first frequency band and the second frequency band can be reduced. Additionally, in the second multiplexer connected to the other of the antennas, the transmission filter and the reception filter of the other of the first frequency band and the second frequency band can be reduced. That is, four or more filters can be reduced as compared with the existing configuration. Accordingly, it is possible to provide a smaller-sized high-frequency front end module in which CA of two-uplink two-downlink can be performed.

Furthermore, in a case where the two-uplink and the two-downlink are performed in the first frequency band and the second frequency band, and in a case where one-uplink in which only one of a signal in the first transmission band and a signal in the second transmission band is transmitted and the two-downlink in the first frequency band and the second frequency band are performed, one of a first connection state in which the third terminal and the first terminal are conductive to each other and the fourth terminal and the second terminal are conductive to each other, and a second connection state in which the third terminal and the second terminal are conductive to each other and the fourth terminal and the first terminal are conductive to each other may be selected.

According to this configuration, for example, in the case of two-uplink two-downlink, a frequency band to be transmitted/received by the primary antenna can be arbitrarily selected. Additionally, for example, in the case of one-uplink two-downlink, even in a mode in which a high-frequency signal in any of frequency bands is transmitted, a signal path for transporting a signal in a frequency band to be transmitted and received can be connected to the primary antenna, and a signal path for transporting a signal in a frequency band only for reception can be connected to the secondary antenna.

Furthermore, the first multiplexer may further have a fourth reception filter which takes the second reception band as a pass band, and the second multiplexer may further have a third reception filter which takes the first reception band as a pass band.

According to this configuration, since the first multiplexer has the first reception filter corresponding to the first frequency band and the fourth reception filter corresponding to the second frequency band, in a case of one-uplink two-downlink in which a high-frequency signal in the first frequency band is transmitted, for example, only one of the primary antenna and the secondary antenna may be used. Additionally, since the second multiplexer has the third reception filter corresponding to the first frequency band and the second reception filter corresponding to the second frequency band, in a case of one-uplink two-downlink in which a high-frequency signal in the second frequency band is transmitted, for example, only one of the primary antenna and the secondary antenna may be used. Accordingly, it is possible to simplify the CA operation of one-uplink two-downlink.

Furthermore, in a case where the two-uplink and the two-downlink are performed in the first frequency band and the second frequency band, one of a first connection state in which the third terminal and the first terminal are conductive to each other and the fourth terminal and the second terminal are conductive to each other, and a second connection state in which the third terminal and the second terminal are conductive to each other and the fourth terminal and the first terminal are conductive to each other may be selected, in a case of one-uplink two-downlink in which transmission in the first frequency band is performed and a signal in the first reception band and a signal in the second reception band are simultaneously received, one of a third connection state in which the third terminal and the first terminal are conductive to each other, and a fourth connection state in which the third terminal and the second terminal are conductive to each other may be selected, and in a case of one-uplink two-downlink in which transmission in the second frequency band is performed and a signal in the first reception band and a signal in the second reception band are simultaneously received, one of a fifth connection state in which the fourth terminal and the first terminal are conductive to each other, and a sixth connection state in which the fourth terminal and the second terminal are conductive to each other may be selected.

According to this configuration, in the case of one-uplink two-downlink, only one of the primary antenna and the secondary antenna may be used. Accordingly, it is possible to simplify the CA operation of one-uplink two-downlink.

Furthermore, a second switch circuit having a fifth terminal, a sixth terminal, a seventh terminal, and an eighth terminal, a first amplifier whose output terminal is connected to an input terminal of the first transmission filter, and a second amplifier whose output terminal is connected to an input terminal of the second transmission filter may further be included, the fifth terminal may be connected to an input terminal of the first amplifier, the sixth terminal may be connected to an input terminal of the second amplifier, a signal for the primary antenna may be inputted to the seventh terminal, a signal for the secondary antenna may be inputted to the eighth terminal, and in the second switch circuit, conduction between the seventh terminal and the fifth terminal may be selected in a case where conduction between the third terminal and the first terminal is selected, conduction between the eighth terminal and the fifth terminal may be selected in a case where conduction between the third terminal and the second terminal is selected, conduction between the seventh terminal and the sixth terminal may be selected in a case where conduction between the fourth terminal and the first terminal is selected, and conduction between the eighth terminal and the sixth terminal may be selected in a case where conduction between the fourth terminal and the second terminal is selected.

According to this configuration, since the second switch circuit achieves the connection state corresponding to the connection state of the first switch circuit, it is possible to output or input a signal for the primary antenna and a signal for the secondary antenna without changing terminal arrangement of a high-frequency signal processing circuit (RFIC) that outputs a high-frequency signal to the high-frequency front end module and to which the high-frequency signal from the high-frequency front end module is inputted, for example. Accordingly, it is possible to simplify the circuit configurations of the high-frequency front end circuit and the peripheral circuits thereof. In addition, in the existing configuration, it is necessary to provide a switch for switching connection between a transmission amplifier and a plurality of transmission filters included in a multiplexer, but in this configuration, since each of the first multiplexer and the second multiplexer has only the transmission filter of one of the first frequency band and the second frequency band, the switch that is necessary in the existing configuration becomes unnecessary. Accordingly, it is possible to provide a small-sized and simplified high-frequency front end module in which CA of two-uplink two-downlink can be performed.

Furthermore, two-uplink in which two transmission signals among a transmission signal in the first transmission band included in the first frequency band, a transmission signal in the second transmission band included in the second frequency band which is different from the first frequency band, and a transmission signal in a third transmission band included in a third frequency band which is different from the first frequency band and the second frequency band are simultaneously transmitted, and two-downlink in which two reception signals among a reception signal in the first reception band included in the first frequency band, a reception signal in the second reception band included in the second frequency band, and a reception signal in a third reception band included in the third frequency band are simultaneously received may be executed, the first multiplexer may further have a fifth transmission filter which takes the third transmission band as a pass band and a fifth reception filter which takes the third reception band as a pass band, and the second multiplexer may further have a sixth transmission filter which takes the third transmission band as a pass band and a sixth reception filter which takes the third reception band as a pass band.

In an existing system including a CA mode in which two high-frequency signals among high-frequency signals in the first frequency band, the second frequency band, and the third frequency band which are three different bands are simultaneously used, in order to ensure signal quality such as isolation and the like of two high-frequency signals simultaneously transmitted/received, two antenna elements, such as a primary antenna which is preferentially used and a secondary antenna which is secondarily used, are disposed. In this case, because of necessity of making it possible to transmit/receive each of the high-frequency signals in the first frequency band, the second frequency band, and the third frequency band even by any of the antennas, a transmission path and a reception path of the first frequency band, a transmission path and a reception path of the second frequency band, and a transmission path and a reception path of the third frequency band are connected to the primary antenna, and transmission paths and reception paths are connected and disposed also to the secondary antenna in the same manner. That is, in the existing configuration, it is necessary to connect transmission filters and reception filters (six filters in total) of the first frequency band, the second frequency band, and the third frequency band to each of the primary antenna and the secondary antenna, which increases the circuit in size.

In contrast, according to the above-described configuration, by switching the connection state of the first switch circuit, it is possible to arbitrarily distribute the high-frequency signals in the first frequency band, the second frequency band, and the third frequency band to the primary antenna and the secondary antenna, and execute CA of two-uplink two-downlink. Therefore, in the first multiplexer connected to one of the antennas, for example, the transmission filter of the second frequency band can be reduced. In the same manner, in the second multiplexer, for example, the transmission filter of the first frequency band can be reduced. That is, two or more filters can be reduced as compared with the existing configuration. In this configuration, one switch circuit of a two-input two-output type is added, but the switch circuit is sufficiently smaller than the filter. Accordingly, it is possible to provide a small-sized high-frequency front end module in which CA of two-uplink two-downlink can be performed.

Furthermore, among a transmission signal in the first transmission band included in the first frequency band, a transmission signal in the second transmission band included in the second frequency band which is different from the first frequency band, and a transmission signal in a third transmission band included in a third frequency band which is different from the first frequency band and the second frequency band, (1) two-uplink of the transmission signal in the first transmission band and the transmission signal in the second transmission band, and (2) two-uplink of the transmission signal in the first transmission band and the transmission signal in the third transmission band may be executed, among a reception signal in the first reception band included in the first frequency band, a reception signal in the second reception band included in the second frequency band, and a reception signal in a third reception band which is included in the third frequency band and includes the second reception band, (3) two-downlink of the reception signal in the first reception band and the reception signal in the second reception band, and (4) two-downlink of the reception signal in the first reception band and the reception signal in the third reception band may be executed, the first multiplexer may further have a fourth reception filter which takes the third reception band as a pass band, the second multiplexer may further have a third reception filter which takes the first reception band as a pass band, and a sixth transmission filter which takes the third transmission band as a pass band, and the second reception filter may take, as a pass band, the third reception band which includes the second reception band.

According to the above-described configuration, since the first multiplexer does not have transmission filters of the second frequency band and the third frequency band and a reception filter of the second frequency band, and the second multiplexer does not have a transmission filter of the first frequency band and a reception filter dedicated to the second frequency band, it is possible to provide a small-sized high-frequency front end module in which CA of two-uplink two-downlink of three bands including two bands in an overlapping relationship can be performed.

Furthermore, the high-frequency front end module may (1) execute the two-uplink and the two-downlink of the first frequency band and the second frequency band, and (2) be capable of executing two-uplink two-downlink in which a high-frequency signal in a fourth frequency band which is different from the first frequency band and the second frequency band, and a high-frequency signal in a fifth frequency band which is different from the first frequency band, the second frequency band, and the fourth frequency band are simultaneously transmitted and simultaneously received, the first frequency band may be a band 66 of LTE (Long Term Evolution), the second frequency band may be a band 25 of LTE, the fourth frequency band may be a band 1 of LTE, and the fifth frequency band may be a band 3 of LTE.

According to this configuration, it is possible to provide a small-sized high-frequency front end module to which the bands 66, 25, 1, and 3 of LTE are applied and in which CA of two-uplink two-downlink of the band 66 and the band 25, and two-uplink two-downlink of the band 1 and the band 3 can be performed.

Furthermore, the high-frequency front end module may (1) execute the two-uplink and the two-downlink of the first frequency band and the second frequency band, and (2) be capable of executing two-uplink two-downlink in which a high-frequency signal in a fourth frequency band which is different from the first frequency band and the second frequency band, and a high-frequency signal in a fifth frequency band which is different from the first frequency band, the second frequency band, and the fourth frequency band are simultaneously transmitted and simultaneously received, the first frequency band may be a band 1 of LTE, the second frequency band may be a band 3 of LTE, the fourth frequency band may be a band 66 of LTE, and the fifth frequency band may be a band 25 of LTE.

According to this configuration, it is possible to provide a small-sized high-frequency front end module to which the bands 66, 25, 1, and 3 of LTE are applied and in which CA of two-uplink two-downlink of the band 66 and the band 25, and two-uplink two-downlink of the band 1 and the band 3 can be performed.

Furthermore, a communication device according to a preferred embodiment of the present disclosure includes: the high-frequency front end module according to any one of those described above, and an RF signal processing circuit configured to process a high-frequency signal transmitted and received by the high-frequency front end module.

According to this configuration, it is possible to provide a small-sized communication device in which CA of two-uplink two-downlink can be performed.

Other features, elements, characteristics and advantages of the present disclosure will become more apparent from the following detailed description of preferred embodiments of the present disclosure with reference to the attached drawings.

BRIEF DESCRIPTION OF THE SEVERAL VIEWS OF THE DRAWINGS

FIG. 4B is a circuit state diagram in a case of two-uplink two-downlink of a high-frequency front end module according to Modification 1 of Embodiment 1;

FIG. 10A is a circuit state diagram in a case of two-uplink two-downlink of a high-frequency front end module according to Modification of Embodiment 2;

DETAILED DESCRIPTION OF THE DISCLOSURE

Figure 1:
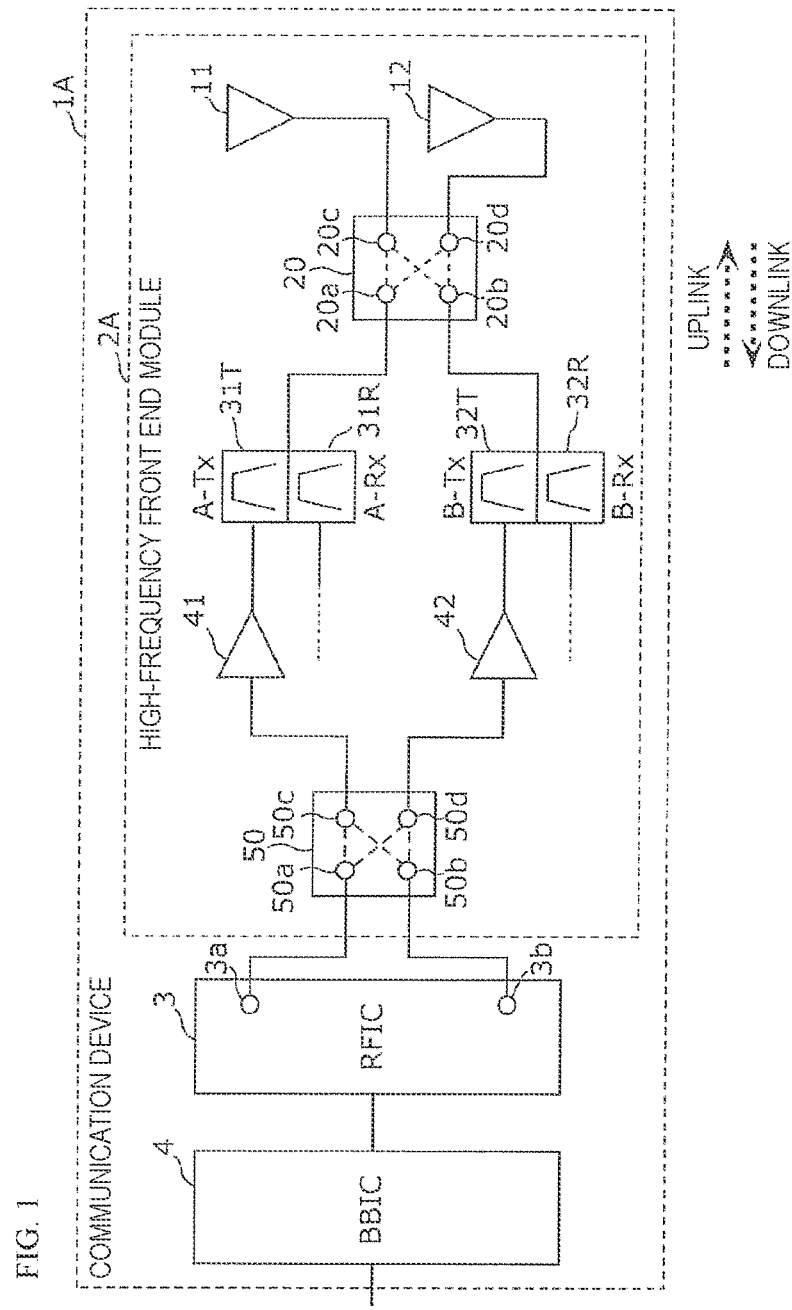
FIG. 1 is a circuit configuration diagram of a communication device according to Embodiment 1.

Hereinafter, embodiments of the present disclosure will be described in detail using working examples and the drawings. It should be noted that all embodiments described below indicate comprehensive or specific examples. Numerical values, shapes, materials, constituent elements, arrangement and connection forms of the constituent elements, and the like, which will be described in the following embodiments, are examples, and are not intended to limit the present disclosure. Constituent elements which are not described in independent claims among the constituent elements in the following embodiments are described as arbitrary constituent elements. In addition, sizes or size ratios of the constituent elements illustrated in the drawings are not necessarily strict.

Embodiment 1

1.1 Configurations of High-Frequency Front End Module 2A and Communication Device 1A FIG. 1 is a circuit configuration diagram of a communication device 1A according to Embodiment 1. As illustrated in the diagram, the communication device 1A includes a high-frequency front end module 2A, an RF signal processing circuit (RFIC) 3, and a baseband signal processing circuit (BBIC) 4.

The RFIC 3 is an RF signal processing circuit that processes a high-frequency signal transmitted/received through an antenna of the high-frequency front end module 2A. Specifically, the RFIC 3 performs signal processing on a high-frequency reception signal inputted through the high-frequency front end module 2A by down-conversion or the like, and outputs a reception signal generated by the signal processing to the BBIC 4. Furthermore, the RFIC 3 performs signal processing on a transmission signal inputted from the BBIC 4 by up-conversion or the like, and outputs a high-frequency transmission signal generated by the signal processing to the transmission-side signal path of the high-frequency front end module 2A.

The BBIC 4 is a circuit that performs signal processing by using an intermediate frequency band having a lower frequency than that of a high-frequency signal propagating in the high-frequency front end module 2A. A signal processed by the BBIC 4 is used, for example, as an image signal for image display, or is used as a voice signal for a call through a speaker.

Furthermore, the RFIC 3 also has a function as a control unit that controls the connection of a switch circuit (described later) included in the high-frequency front end module 2A on the basis of a band (frequency band) to be used. Specifically, the RFIC 3 switches the connection of the switch circuit included in the high-frequency front end module 2A by a control signal (not illustrated). Note that the control unit may be provided outside the RFIC 3, or may be provided in, for example, the high-frequency front end module 2A or the BBIC 4.

Next, the detailed configuration of the high-frequency front end module 2A will be described.

As illustrated in FIG. 1, the high-frequency front end module 2A includes a primary antenna 11 and a secondary antenna 12, switch circuits 20 and 50, transmission filters 31T and 32T, reception filters 31R and 32R, and transmission amplifiers 41 and 42.

According to the configuration described above, the high-frequency front end module 2A can execute two-uplink in which a signal in a first transmission band (A-Tx) included in a first frequency band (Band A) and a signal in a second transmission band (B-Tx) included in a second frequency band (Band B) which is different from the first frequency band are simultaneously transmitted, and two-downlink in which a signal in a first reception band (A-Rx) included in the first frequency band (Band A) and a signal in a second reception band (B-Rx) included in the second frequency band (Band B) are simultaneously received.

The primary antenna 11 is an antenna that is used in preference to the secondary antenna 12 in terms of antenna performance and the like, and is an antenna element capable of transmitting and receiving signals in Band A and Band B. Furthermore, the secondary antenna 12 is an antenna element capable of transmitting and receiving signals in Band A and Band B.

The transmission filter 31T is a first transmission filter whose input terminal is connected to the transmission amplifier 41, whose output terminal is connected to the switch circuit 20, and which takes A-Tx as a pass band.

The transmission filter 32T is a second transmission filter whose input terminal is connected to the transmission amplifier 42, whose output terminal is connected to the switch circuit 20, and which takes B-Tx as a pass band.

The reception filter 31R is a first reception filter whose input terminal is connected to the switch circuit 20, and which takes A-Rx as a pass band.

The reception filter 32R is a second reception filter whose input terminal is connected to the switch circuit 20, and which takes B-Rx as a pass band.

The transmission filter 31T and the reception filter 31R constitute a first multiplexer that selectively transmits and receives a high-frequency signal in Band A. Note that the first multiplexer does not have a transmission filter which takes B-Tx as a pass band. Furthermore, the first multiplexer does not have a reception filter which takes B-Rx as a pass band.

The transmission filter 32T and the reception filter 32R constitute a second multiplexer that selectively transmits and receives a high-frequency signal in Band B. Note that the second multiplexer does not have a transmission filter which takes A-Tx as a pass band. Furthermore, the second multiplexer does not have a reception filter which takes A-Rx as a pass band.

Note that in the present specification, the first multiplexer and the second multiplexer are each defined as a portion including a duplexer in which the output terminal of the transmission filter and the input terminal of the reception filter are commonly connected at the switch circuit 20, as in the present embodiment.

The switch circuit 20 is a first switch circuit having a terminal 20a (third terminal), a terminal 20b (fourth terminal), a terminal 20c (first terminal), and a terminal 20d (second terminal).

The terminal 20c is connected to the primary antenna 11, and the terminal 20d is connected to the secondary antenna 12. Furthermore, the terminal 20a is connected to the output terminal of the transmission filter 31T and the input terminal of the reception filter 31R, and the terminal 20b is connected to the output terminal of the transmission filter 32T and the input terminal of the reception filter 32R.

In the switch circuit 20, conduction between the terminal 20a and the terminal 20c and conduction between the terminal 20a and the terminal 20d are exclusively switched, and conduction between the terminal 20b and the terminal 20c and conduction between the terminal 20b and the terminal 20d are exclusively switched.

Note that in the switch circuit, "conduction between a terminal A and a terminal B and conduction between a terminal C and a terminal D are exclusively switched" means that (1) in a state in which the terminal A and the terminal B are conductive to each other, the terminal C and the terminal D are non-conductive to each other, and (2) in a state in which the terminal C and the terminal D are conductive to each other, the terminal A and the terminal B are non-conductive to each other.

The switch circuit 20 is, for example, a DPDT (Double Pole Double Throw) type switch circuit having the terminals 20a and 20b, and the terminals 20c and 20d. Note that the switch circuit 20 may be a switch circuit of a DP3T type, a DP4T type, or the like, and in this case, necessary terminals may be used in accordance with the number of bands to be used.

The high-frequency front end module 2A includes the primary antenna 11 and the secondary antenna 12, the switch circuit 20, the first multiplexer, and the second multiplexer described above, thereby making it possible to arbitrarily distribute high-frequency signals in Band A and Band B to the primary antenna 11 and the secondary antenna 12 by switching the connection state of the switch circuit 20, and execute CA of two-uplink two-downlink. Here, since the first multiplexer does not have a transmission filter and a reception filter of Band B, and the second multiplexer does not have a transmission filter and a reception filter of Band A, it is possible to provide the high-frequency front end module 2A which is reduced in size and in which CA of two-uplink two-downlink can be performed.

Note that the high-frequency front end module 2A can execute so-called one-uplink two-downlink CA in which only one of a high-frequency signal in Band A and a high-frequency signal in Band B is transmitted and a high-frequency signal in Band A and a high-frequency signal in Band B are simultaneously received by the above-described configuration.

The transmission amplifier 41 is a first amplifier whose output terminal is connected to the input terminal of the transmission filter 31T, and is a power amplifier constituted by a transistor or the like, for example. Furthermore, the transmission amplifier 42 is a second amplifier whose output terminal is connected to the input terminal of the transmission filter 32T, and is a power amplifier constituted by a transistor or the like, for example.

The switch circuit 50 is a second switch circuit having a terminal 50a (seventh terminal), a terminal 50b (eighth terminal), a terminal 50c (fifth terminal), and a terminal 50d (sixth terminal).

The terminal 50c is connected to an input terminal of the transmission amplifier 41, and the terminal 50d is connected to an input terminal of the transmission amplifier 42. Furthermore, the terminal 50a is connected to an output terminal 3a of the RFIC 3, and a transmission signal for the primary antenna 11 is inputted thereto. Furthermore, the terminal 50b is connected to an output terminal 3b of the RFIC 3, and a transmission signal for the secondary antenna 12 is inputted thereto.

In the switch circuit 50, when conduction between the terminal 20a and the terminal 20c of the switch circuit 20 is selected, conduction between the terminal 50a and the terminal 50c is selected, and when conduction between the terminal 20a and the terminal 20d of the switch circuit 20 is selected, conduction between the terminal 50b and the terminal 50c is selected. Furthermore, when conduction between the terminal 20b and the terminal 20c of the switch circuit 20 is selected, conduction between the terminal 50a and the terminal 50d is selected, and when conduction between the terminal 20b and the terminal 20d of the switch circuit 20 is selected, conduction between the terminal 50b and the terminal 50d is selected.

The switch circuit 50 is, for example, a DPDT type switch circuit having the terminals 50a and 50b, and the terminals 50c and 50d. Note that the switch circuit 50 may be a switch circuit of a DP3T type, a DP4T type, or the like, and in this case, necessary terminals may be used in accordance with the number of bands to be used.

With this configuration, since the switch circuit 50 achieves a connection state corresponding to a connection state of the switch circuit 20, it is possible to output or input a signal for the primary antenna 11 and a signal for the secondary antenna 12 without changing terminal arrangement of the RFIC 3. Accordingly, it is possible to simplify the circuit configurations of the high-frequency front end module 2A and the communication device LA.

Note that the RFIC 3 may be constituted of two RF signal processing circuits, for example, may be constituted of a circuit that processes a signal for Band A and a circuit that processes a signal for Band B, or may be constituted of a circuit that processes a signal for the primary antenna 11 and a circuit that processes a signal for the secondary antenna 12.

1.2 Connection State of High-Frequency Front End Module 2A

Figure 2:
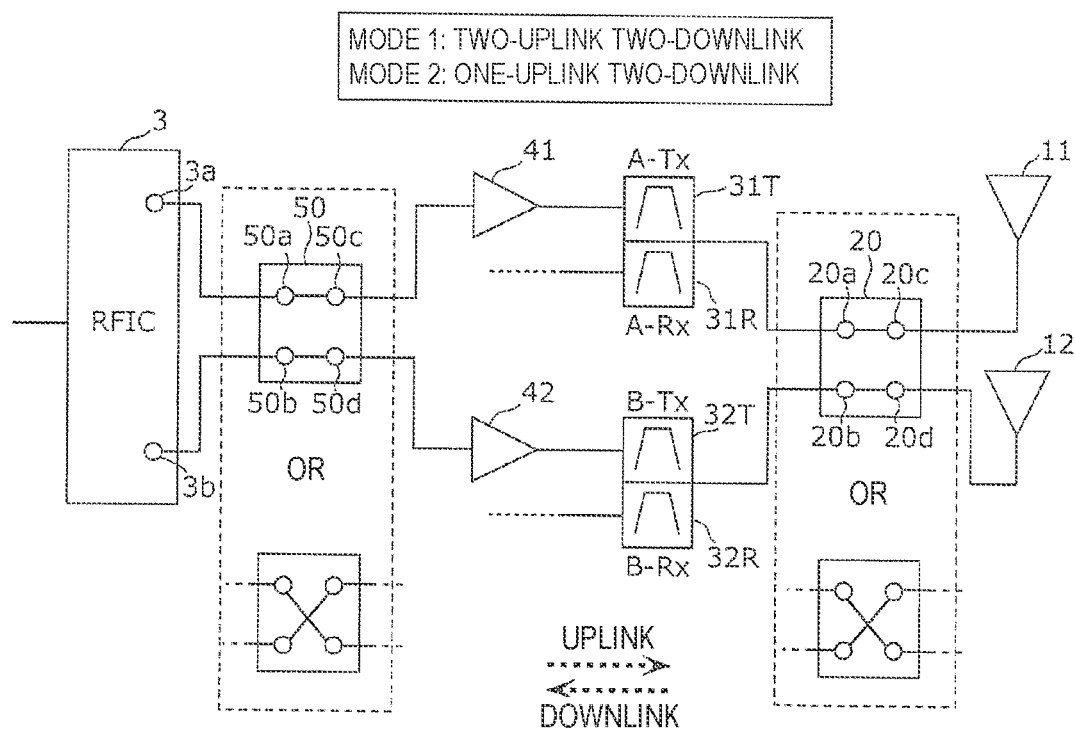
FIG. 2 is a circuit state diagram in CA of a high-frequency front end module according to Embodiment 1.

FIG. 2 is a circuit state diagram in CA of the high-frequency front end module 2A according to Embodiment 1. This diagram illustrates a circuit connection state in (1) a case of two-uplink of Band A and Band B and two-downlink of Band A and Band B (mode 1: two-uplink two-downlink), and (2) a case of one-uplink of Band A or Band B and two-downlink of Band A and Band B (mode 2: one-uplink two-downlink).

In both the mode 1 and the mode 2, as illustrated in FIG. 2, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

In this connection state, in the mode 1, a transmission signal in one of Band A and Band B is transmitted through the output terminal 3a, the switch circuit 50, the transmission amplifier 41, the first multiplexer, the switch circuit 20, and the primary antenna 11, and a transmission signal in the other of Band A and Band B is transmitted through the output terminal 3b, the switch circuit 50, the transmission amplifier 42, the second multiplexer, the switch circuit 20, and the secondary antenna 12. Furthermore, a reception signal in one of Band A and Band B is received by the RFIC 3 through the primary antenna 11, the switch circuit 20, and the first multiplexer, and a reception signal in the other of Band A and Band B is received by the RFIC 3 through the secondary antenna 12, the switch circuit 20, and the second multiplexer.

Furthermore, in the mode 2, when a transmission signal in one of Band A and Band B is transmitted through the output terminal 3*a*, the switch circuit 50, the transmission amplifier 41, the first multiplexer, the switch circuit 20, and the primary antenna 11, a reception signal in one of Band A and Band B is received by the RFIC 3 through the primary antenna 11, the switch circuit 20, and the first multiplexer, and a reception signal in the other of Band A and Band B is received by the RFIC 3 through the secondary antenna 12, the switch circuit 20, and the second multiplexer.

Alternatively, in both the mode 1 and the mode 2, as illustrated in FIG. 2, by the control unit, the terminal 20*a* and the terminal 20*d* are connected to each other, and the terminal 20*b* and the terminal 20*c* are connected to each other, in the switch circuit 20 (second connection state). Furthermore, the terminal 50*a* and the terminal 50*d* are connected to each other, and the terminal 50*b* and the terminal 50*c* are connected to each other, in the switch circuit 50.

In this connection state, in the mode 1, a transmission signal in one of Band A and Band B is transmitted through the output terminal 3*a*, the switch circuit 50, the transmission amplifier 42, the second multiplexer, the switch circuit 20, and the primary antenna 11, and a transmission signal in the other of Band A and Band B is transmitted through the output terminal 3*b*, the switch circuit 50, the transmission amplifier 41, the first multiplexer, the switch circuit 20, and the secondary antenna 12. Furthermore, a reception signal in one of Band A and Band B is received by the RFIC 3 through the primary antenna 11, the switch circuit 20, and the second multiplexer, and a reception signal in the other of Band A and Band B is received by the RFIC 3 through the secondary antenna 12, the switch circuit 20, and the first multiplexer.

Furthermore, in the mode 2, when a transmission signal in one of Band A and Band B is transmitted through the output terminal 3*a*, the switch circuit 50, the transmission amplifier 42, the second multiplexer, the switch circuit 20, and the primary antenna 11, a reception signal in one of Band A and Band B is received by the RFIC 3 through the primary antenna 11, the switch circuit 20, and the second multiplexer, and a reception signal in the other of Band A and Band B is received by the RFIC 3 through the secondary antenna 12, the switch circuit 20, and the first multiplexer.

1.3 Comparison of High-Frequency Front End Modules According to Embodiment 1 and Comparative Example 1

Figure 3:
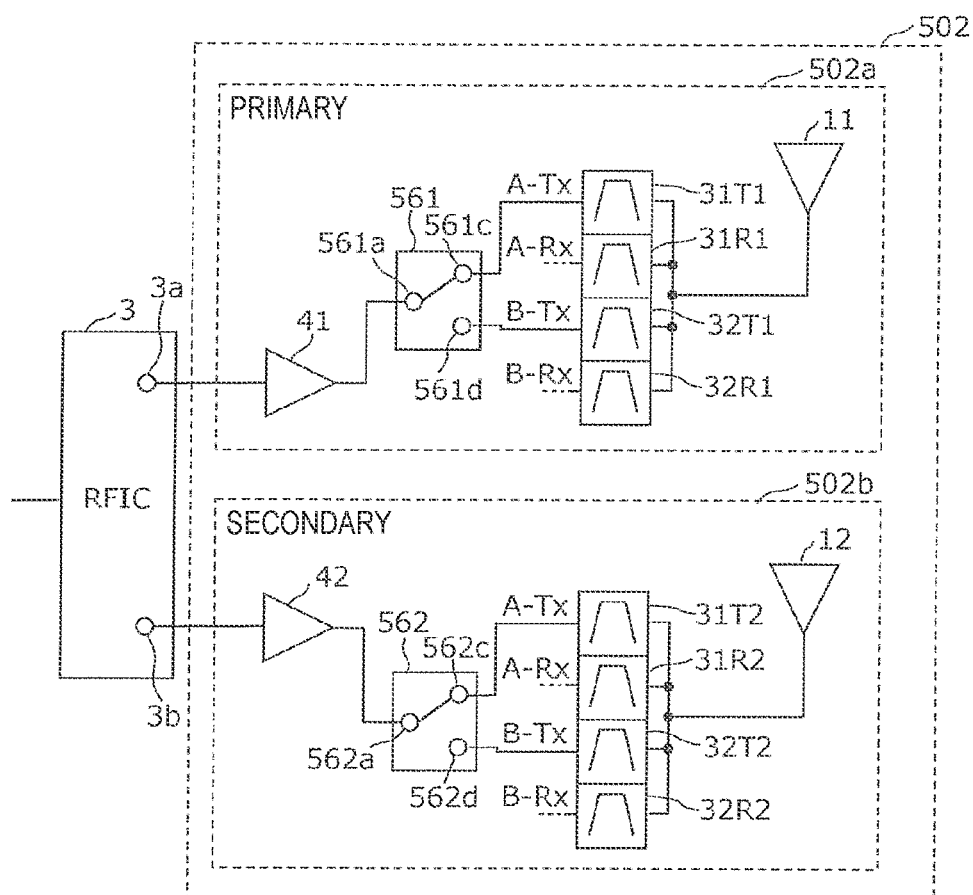
FIG. 3 is a circuit configuration diagram of a high-frequency front end module according to Comparative Example 1.

FIG. 3 is a circuit configuration diagram of a high-frequency front end module 502 according to Comparative Example 1. Note that the diagram also illustrates the RFIC 3 connected to the high-frequency front end module 502 according to Comparative Example 1. As illustrated in the diagram, the high-frequency front end module 502 includes a primary circuit 502*a* and a secondary circuit 502*b*. The primary circuit 502*a* includes the primary antenna 11, a switch circuit 561, transmission filters 31T1 and 32T1, reception filters 31R1 and 32R1, and the transmission amplifier 41. The transmission filters 31T1 and 32T1 and the reception filters 31R1 and 32R1 constitute a first multiplexer. The secondary circuit 502*b* includes the secondary antenna 12, a switch circuit 562, transmission filters 31T2 and 32T2, reception filters 31R2 and 32R2, and the transmission amplifier 42. The transmission filters 31T2 and 32T2 and the reception filters 31R2 and 32R2 constitute a second multiplexer. The high-frequency front end module 502 according to Comparative Example 1 is different from the high-frequency front end module 2A according to Embodiment 1 in the configurations of the first multiplexer, the second multiplexer, and the switch circuits. Hereinafter, the high-frequency front end module 502 according to Comparative Example 1 will be described focusing on the differences from the high-frequency front end module 2A according to Embodiment 1.

The switch circuit 561 is an SPDT (Single Pole Double Throw) type switch circuit having a common terminal 561*a* and selection terminals 561*c* and 561*d*. The common terminal 561*a* is connected to the output terminal of the transmission amplifier 41. The switch circuit 562 is an SPDT type switch circuit having a common terminal 562*a* and selection terminals 562*c* and 562*d*. The common terminal 562*a* is connected to the output terminal of the transmission amplifier 42.

The transmission filter 31T1 is a transmission filter whose input terminal is connected to the selection terminal 561*c*, whose output terminal is connected to the primary antenna 11, and which takes A-Tx as a pass band.

The transmission filter 32T1 is a transmission filter whose input terminal is connected to the selection terminal 561*d*, whose output terminal is connected to the primary antenna 11, and which takes B-Tx as a pass band.

The reception filter 31R1 is a reception filter whose input terminal is connected to the primary antenna 11, and which takes A-Rx as a pass band.

The reception filter 32R1 is a reception filter whose input terminal is connected to the primary antenna 11, and which takes B-Rx as a pass band.

The transmission filter 31T2 is a transmission filter whose input terminal is connected to the selection terminal 562*c*, whose output terminal is connected to the secondary antenna 12, and which takes A-Tx as a pass band.

The transmission filter 32T2 is a transmission filter whose input terminal is connected to the selection terminal 562*d*, whose output terminal is connected to the secondary antenna 12, and which takes B-Tx as a pass band.

The reception filter 31R2 is a reception filter whose input terminal is connected to the secondary antenna 12, and which takes A-Rx as a pass band.

The reception filter 32R2 is a reception filter whose input terminal is connected to the secondary antenna 12, and which takes B-Rx as a pass band.

According to the configuration described above, the high-frequency front end module 502 can execute two-uplink in which a signal in the first transmission band (A-Tx) included in Band A and a signal in the second transmission band (B-Tx) included in Band B are simultaneously transmitted, and two-downlink in which a signal in the first reception band (A-Rx) included in Band A and a signal in the second reception band (B-Rx) included in Band B are simultaneously received.

For example, in a state in which the common terminal 561*a* and the selection terminal 561*c* are connected to each other and the common terminal 562*a* and the selection terminal 562*d* are connected to each other, a transmission signal in Band A is transmitted through the output terminal 3*a*, the transmission amplifier 41, the first multiplexer, and the primary antenna 11, and a transmission signal in Band B is transmitted through the output terminal 3*b*, the transmission amplifier 42, the second multiplexer, and the secondary antenna 12. Furthermore, a reception signal in Band A is received by the RFIC 3 through the primary antenna 11 and the first multiplexer, and a reception signal in Band B is received by the RFIC 3 through the secondary antenna 12 and the second multiplexer.

Furthermore, in a state in which the common terminal 561a and the selection terminal 561d are connected to each other and the common terminal 562a and the selection terminal 562c are connected to each other, a transmission signal in Band B is transmitted through the output terminal 3a, the transmission amplifier 41, the first multiplexer, and the primary antenna 11, and a transmission signal in Band A is transmitted through the output terminal 3b, the transmission amplifier 42, the second multiplexer, and the secondary antenna 12. Furthermore, a reception signal in Band B is received by the RFIC 3 through the primary antenna 11 and the first multiplexer, and a reception signal in Band A is received by the RFIC 3 through the secondary antenna 12 and the second multiplexer.

In the high-frequency front end module 502 according to Comparative Example 1, in order to ensure signal quality such as isolation and the like of high-frequency signals in Band A and Band B simultaneously transmitted/received, two antenna elements, such as the primary antenna 11 which is preferentially used and the secondary antenna 12 which is secondarily used, are disposed. In this case, because of necessity of making it possible to transmit/receive each of the high-frequency signals in Band A and Band B even by any of the antennas, a transmission path and a reception path of Band A and a transmission path and a reception path of Band B are connected to the primary antenna 11, and a transmission path and a reception path of Band A and a transmission path and a reception path of Band B are connected and disposed also to the secondary antenna 12. A filter for selectively allowing a desired frequency band to pass therethrough is arranged in each signal path, and in the configuration of the high-frequency front end module 502 according to Comparative Example 1, four filters of the transmission filters 31T1 and 32T1 and the reception filters 31R1 and 32R1 are connected to the primary antenna 11. Furthermore, four filters of the transmission filters 31T2 and 32T2 and the reception filters 31R2 and 32R2 are connected to the secondary antenna 12. That is, in the front end module to which the primary antenna 11 and the secondary antenna 12 are applied, in order to achieve two-uplink two-downlink of the two frequency bands of Band A and Band B, a total of eight filters are required, and the circuit is enlarged.

In contrast, the high-frequency front end module 2A according to the present embodiment includes the primary antenna 11 and the secondary antenna 12, the switch circuit 20, the first multiplexer, and the second multiplexer, thereby making it possible to arbitrarily distribute high-frequency signals in Band A and Band B to the primary antenna 11 and the secondary antenna 12 by switching the connection state of the switch circuit 20, and execute CA of two-uplink two-downlink. Therefore, in the first multiplexer connected to one of the antennas, the transmission filter of Band B can be reduced. In the same manner, in the second multiplexer connected to the other of the antennas, the transmission filter of Band A can be reduced. That is, two or more filters can be reduced as compared with the configuration of the high-frequency front end module 502 according to Comparative Example 1.

In the configuration of the high-frequency front end module 2A according to the present embodiment, in comparison with the high-frequency front end module 502 according to Comparative Example 1, the one switch circuit 20 of a two-input two-output type is added, but the switch circuit 20 is sufficiently smaller than the transmission filter and the reception filter. Accordingly, it is possible to provide the high-frequency front end module 2A which is reduced in size and in which CA of two-uplink two-downlink can be performed.

Furthermore, in the high-frequency front end module 2A according to the present embodiment, by including the primary antenna 11 and the secondary antenna 12, the switch circuit 20, the first multiplexer, and the second multiplexer, even in the case of one-uplink two-downlink, by using both the primary antenna 11 and the secondary antenna 12, it is possible to reduce the reception filter of Band B in the first multiplexer connected to one of the antennas. Furthermore, in the second multiplexer connected to the other of the antennas, the reception filter of Band A can be reduced. That is, four or more filters in total can be reduced as compared with the configuration of the high-frequency front end module 502 according to Comparative Example 1. Accordingly, it is possible to provide the high-frequency front end module which is further reduced in size and in which CA of two-uplink two-downlink and one-uplink two-downlink can be performed.

1.4 Configurations of High-Frequency Front End Module 2B and Communication Device 1B According to Modification 1

Figure 4A:
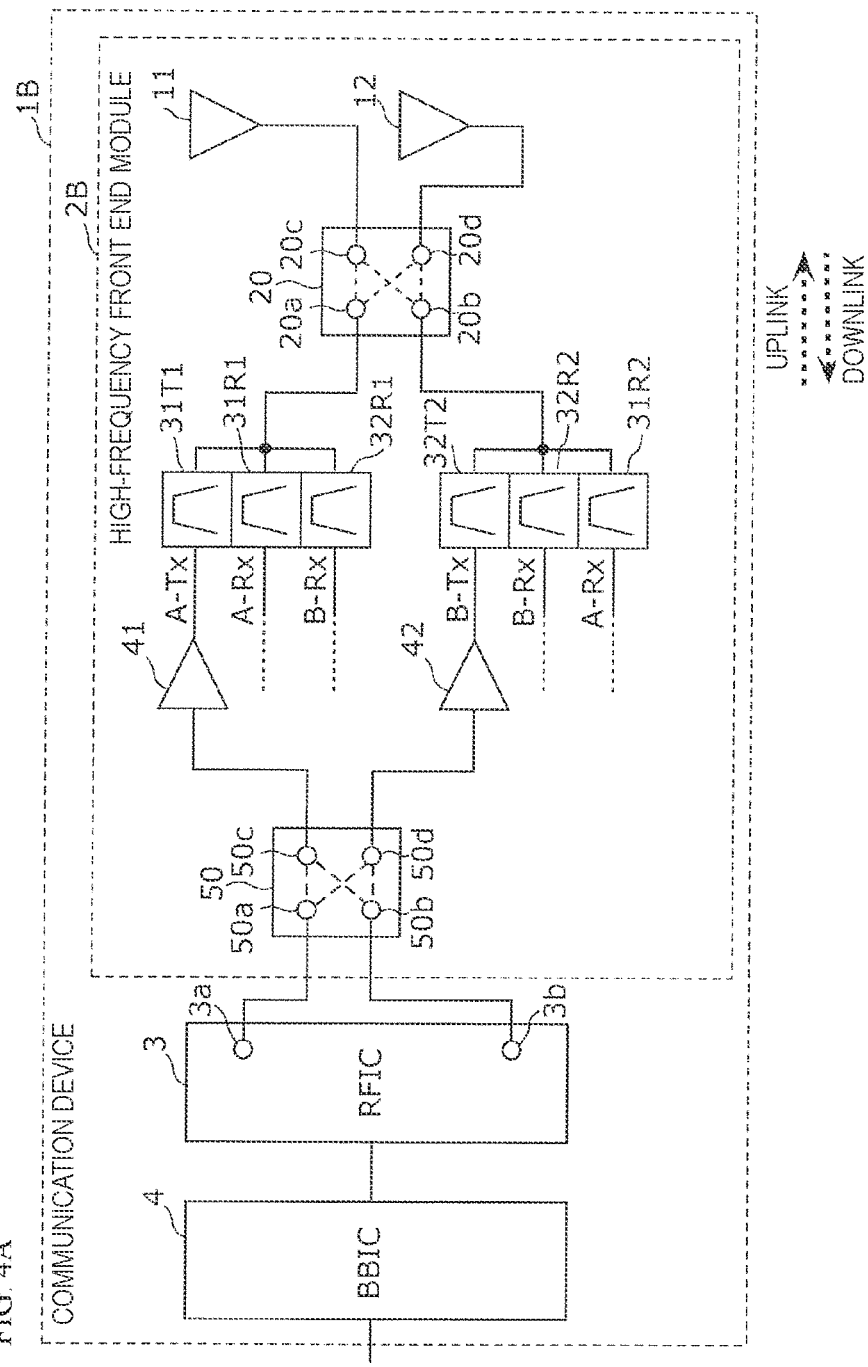
FIG. 4A is a circuit configuration diagram of a communication device according to Modification 1 of Embodiment 1.

FIG. 4A is a circuit configuration diagram of a communication device 1B according to Modification 1 of Embodiment 1. As illustrated in the diagram, the communication device 1B includes a high-frequency front end module 2B, the RFIC 3, and the BBIC 4. The communication device 1B according to the present modification differs from the communication device 1A according to Embodiment 1 in the configuration of the high-frequency front end module. Hereinafter, the communication device 1B according to the present modification will be described focusing on the differences from the communication device 1A according to Embodiment 1.

As illustrated in FIG. 4A, the high-frequency front end module 2B includes the primary antenna 11 and the secondary antenna 12, the switch circuits 20 and 50, the transmission filters 31T1 and 32T2, the reception filters 31R1, 31R2, 32R1, and 32R2, and the transmission amplifiers 41 and 42.

According to the configuration described above, the high-frequency front end module 2B can execute two-uplink in which a signal in the first transmission band (A-Tx) included in the first frequency band (Band A) and a signal in the second transmission band (B-Tx) included in the second frequency band (Band B) which is different from the first frequency band are simultaneously transmitted, and two-downlink in which a signal in the first reception band (A-Rx) included in the first frequency band (Band A) and a signal in the second reception band (B-Rx) included in the second frequency band (Band B) are simultaneously received.

The high-frequency front end module 2B according to Modification 1 is different from the high-frequency front end module 2A according to Embodiment 1 in the configurations of the first multiplexer and the second multiplexer. Hereinafter, the high-frequency front end module 2B according to Modification 1 will be described focusing on the differences from the high-frequency front end module 2A according to Embodiment 1.

The transmission filter 31T1 is a first transmission filter whose input terminal is connected to the transmission amplifier 41, whose output terminal is connected to the switch circuit 20, and which takes A-Tx as a pass band.

The transmission filter 32T2 is a second transmission filter whose input terminal is connected to the transmission amplifier 42, whose output terminal is connected to the switch circuit 20, and which takes B-Tx as a pass band.

The reception filter 31R1 is a first reception filter whose input terminal is connected to the switch circuit 20, and which takes A-Rx as a pass band.

The reception filter 32R1 is a fourth reception filter whose input terminal is connected to the switch circuit 20, and which takes B-Rx as a pass band.

The reception filter 32R2 is a second reception filter whose input terminal is connected to the switch circuit 20, and which takes B-Rx as a pass band.

The reception filter 31R2 is a third reception filter whose input terminal is connected to the switch circuit 20, and which takes A-Rx as a pass band.

The transmission filter 31T1 and the reception filters 31R1 and 32R1 constitute a first multiplexer that can transmit a high-frequency signal in Band A and receive high-frequency signals in Band A and Band B. Note that the first multiplexer does not have a transmission filter which takes B-Tx as a pass band.

The transmission filter 32T2 and the reception filters 32R2 and 31R2 constitute a second multiplexer that can transmit a high-frequency signal in Band B and receive high-frequency signals in Band A and Band B. Note that the second multiplexer does not have a transmission filter which takes A-Tx as a pass band.

1.5 Connection State of High-Frequency Front End Module 2B According to Modification 1

FIG. 4B is a circuit state diagram in a case of two-uplink two-downlink of the high-frequency front end module 2B according to Modification 1 of Embodiment 1. This diagram illustrates a circuit connection state in a case of two-uplink of Band A and Band B and two-downlink of Band A and Band B (mode 1: two-uplink two-downlink).

In the mode 1, as illustrated in FIG. 4B, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

In this connection state, in the mode 1, a transmission signal in one of Band A and Band B is transmitted through the output terminal 3a, the switch circuit 50, the transmission amplifier 41, the first multiplexer, the switch circuit 20, and the primary antenna 11, and a transmission signal in the other of Band A and Band B is transmitted through the output terminal 3b, the switch circuit 50, the transmission amplifier 42, the second multiplexer, the switch circuit 20, and the secondary antenna 12. Furthermore, a reception signal in one of Band A and Band B is received by the RFIC 3 through the primary antenna 11, the switch circuit 20, and the first multiplexer, and a reception signal in the other of Band A and Band B is received by the RFIC 3 through the secondary antenna 12, the switch circuit 20, and the second multiplexer.

Alternatively, in the mode 1, as illustrated in FIG. 4B, by the control unit, the terminal 20a and the terminal 20d are connected to each other, and the terminal 20b and the terminal 20c are connected to each other, in the switch circuit 20 (second connection state). Furthermore, the terminal 50a and the terminal 50d are connected to each other, and the terminal 50b and the terminal 50c are connected to each other, in the switch circuit 50.

In this connection state, in the mode 1, a transmission signal in one of Band A and Band B is transmitted through the output terminal 3a, the switch circuit 50, the transmission amplifier 42, the second multiplexer, the switch circuit 20, and the primary antenna 11, and a transmission signal in the other of Band A and Band B is transmitted through the output terminal 3b, the switch circuit 50, the transmission amplifier 41, the first multiplexer, the switch circuit 20, and the secondary antenna 12. Furthermore, a reception signal in one of Band A and Band B is received by the RFIC 3 through the primary antenna 11, the switch circuit 20, and the second multiplexer, and a reception signal in the other of Band A and Band B is received by the RFIC 3 through the secondary antenna 12, the switch circuit 20, and the first multiplexer.

Figure 4C:
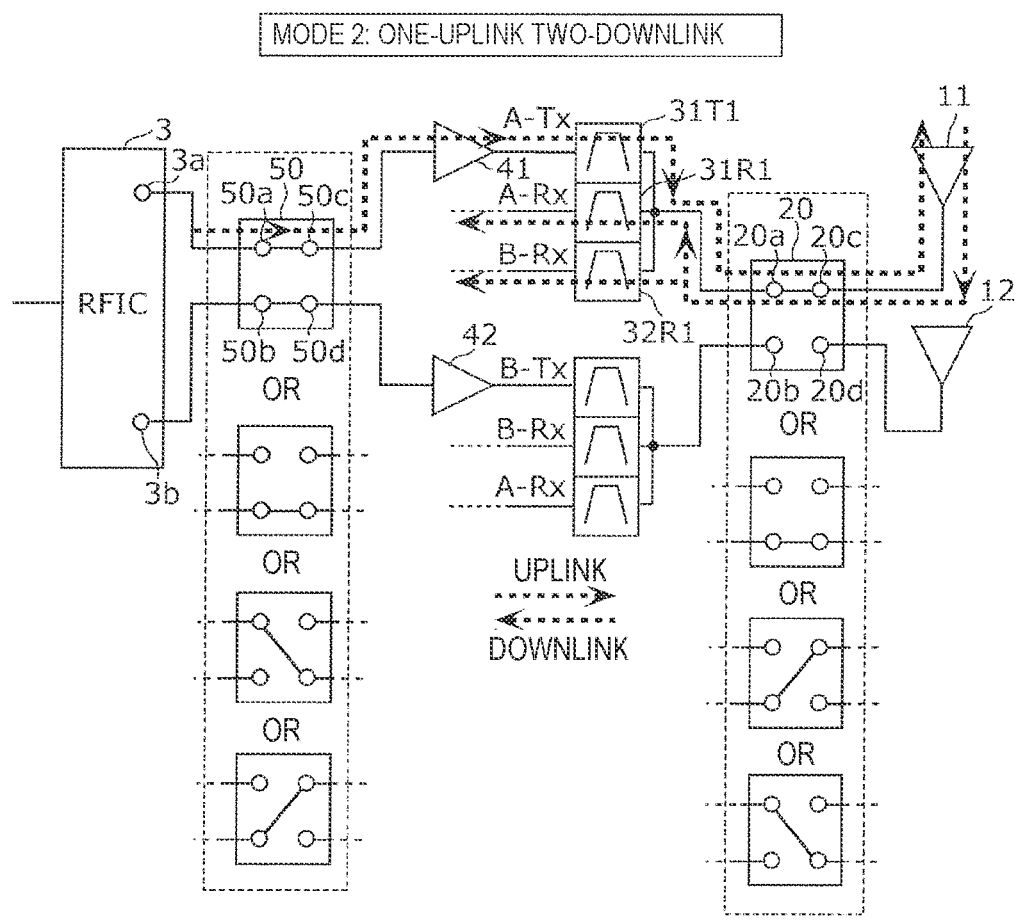
FIG. 4C is a circuit state diagram in a case of one-uplink two-downlink of the high-frequency front end module according to Modification 1 of Embodiment 1.

FIG. 4C is a circuit state diagram in a case of one-uplink two-downlink of the high-frequency front end module 2B according to Modification 1 of Embodiment 1. This diagram illustrates a circuit connection state in a case of one-uplink of Band A or Band B and two-downlink of Band A and Band B (mode 2: one-uplink two-downlink).

In the mode 2, as illustrated in FIG. 4C, by the control unit, the terminal 20a and the terminal 20c are connected to each other in the switch circuit 20 (third connection state). Furthermore, the terminal 50a and the terminal 50c are connected to each other in the switch circuit 50.

In this connection state, in the mode 2, a transmission signal in Band A is transmitted through the output terminal 3a, the switch circuit 50, the transmission amplifier 41, the first multiplexer, the switch circuit 20, and the primary antenna 11, and reception signals in Band A and Band B are received by the RFIC 3 through the primary antenna 11, the switch circuit 20, and the first multiplexer.

Alternatively, in the mode 2, as illustrated in FIG. 4C, by the control unit, the terminal 20b and the terminal 20c are connected to each other in the switch circuit 20 (fifth connection state). Furthermore, the terminal 50a and the terminal 50d are connected to each other in the switch circuit 50.

In this connection state, in the mode 2, a transmission signal in Band B is transmitted through the output terminal 3a, the switch circuit 50, the transmission amplifier 42, the second multiplexer, the switch circuit 20, and the primary antenna 11, and reception signals in Band A and Band B are received by the RFIC 3 through the primary antenna 11, the switch circuit 20, and the second multiplexer.

Note that in both the above-described two types of connection forms, the case of one-uplink two-downlink by passing through the output terminal 3a and the primary antenna 11 has been described as an example, but one-uplink two-downlink by passing through the output terminal 3b and the secondary antenna 12 (fourth connection state or sixth connection state) is also possible.

The high-frequency front end module 2B according to Modification 1 includes the primary antenna 11 and the secondary antenna 12, the switch circuit 20, the first multiplexer, and the second multiplexer, thereby making it possible to arbitrarily distribute high-frequency signals in Band A and Band B to the primary antenna 11 and the secondary antenna 12 by switching the connection state of the switch circuit 20, and execute CA of two-uplink two-downlink. Therefore, in the first multiplexer connected to one of the antennas, the transmission filter of Band B can be reduced. In the same manner, in the second multiplexer connected to the other of the antennas, the transmission filter of Band A can be reduced. That is, two filters can be reduced as compared with the configuration of the high-frequency front end module 502 according to Comparative Example 1.

In the configuration of the high-frequency front end module 2B according to Modification 1, in comparison with the high-frequency front end module 502 according to Comparative Example 1, the one switch circuit 20 of the two-input two-output type is added, but the switch circuit 20 is sufficiently smaller than the transmission filter and the reception filter. Accordingly, it is possible to provide the high-frequency front end module 2B which is reduced in size and in which CA of two-uplink two-downlink can be performed.

Furthermore, in the high-frequency front end module 2B according to Modification 1, in comparison with the high-frequency front end module 2A according to Embodiment 1, since the first multiplexer further includes the reception filter 32R1 corresponding to Band B, in the case of one-uplink two-downlink in which a high-frequency signal in Band A is transmitted, only one of the primary antenna 11 and the secondary antenna 12 may be used. Furthermore, since the second multiplexer further includes the reception filter 31R2 corresponding to Band A, in the case of one-uplink two-downlink in which a high-frequency signal in Band B is transmitted, only one of the primary antenna 11 and the secondary antenna 12 may be used. Accordingly, it is possible to simplify the CA operation of one-uplink two-downlink.

1.6 Configurations of High-Frequency Front End Module 2H and Communication Device 1H According to Modification 2

Figure 5:
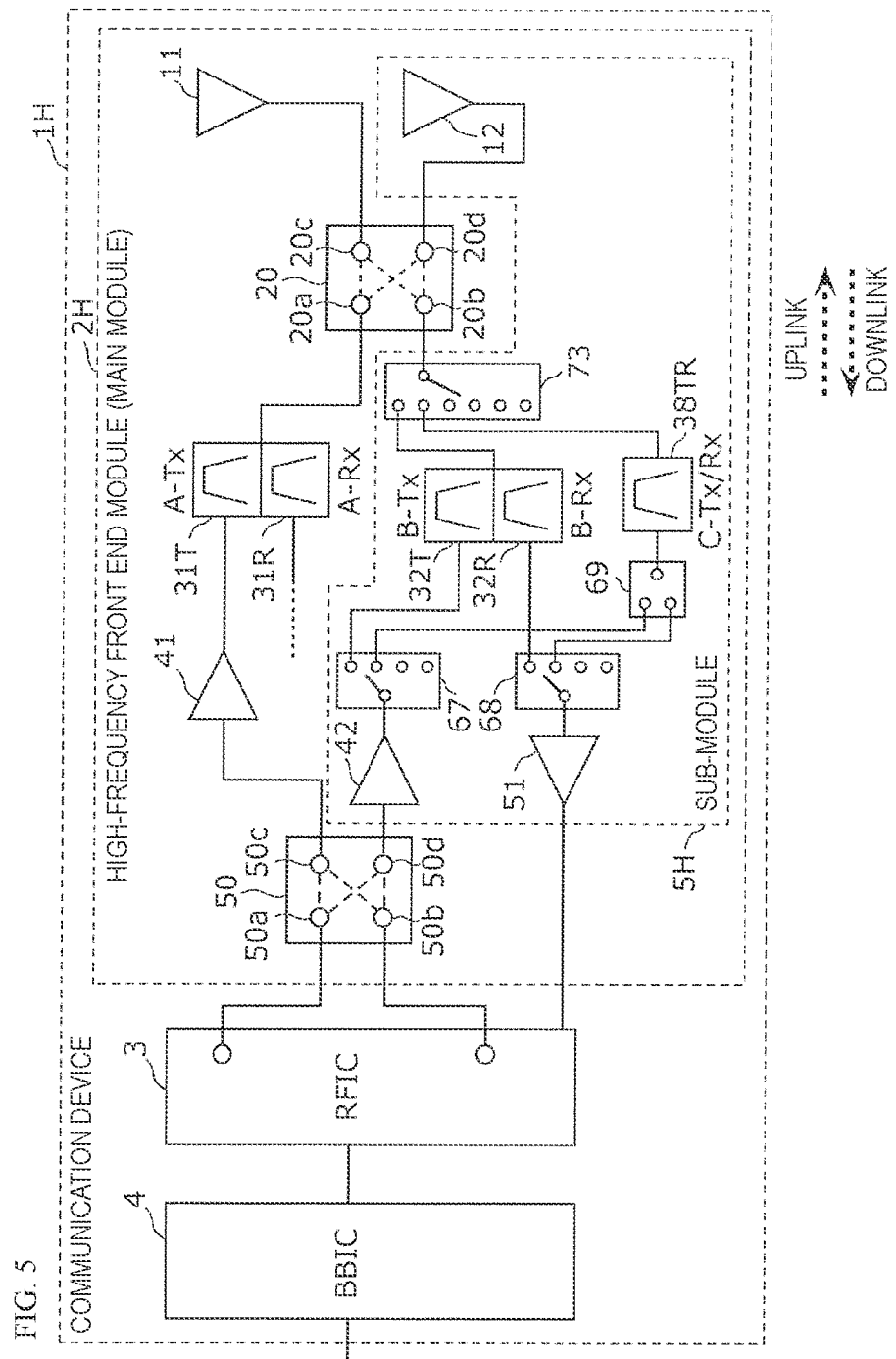
FIG. 5 is a circuit configuration diagram of a communication device according to Modification 2 of Embodiment 1.

FIG. 5 is a circuit configuration diagram of a communication device 1H according to Modification 2 of Embodiment 1. As illustrated in the diagram, the communication device 1H includes a high-frequency front end module 2H, the RFIC 3, and the BBIC 4. The communication device 1H according to the present modification differs from the communication device 1A according to Embodiment 1 in the configuration of the high-frequency front end module. Hereinafter, the communication device 1H according to the present modification will be described focusing on the differences from the communication device 1A according to Embodiment 1.

As illustrated in FIG. 5, the high-frequency front end module 2H includes the primary antenna 11 and the secondary antenna 12, switch circuits 20, 50, 67, 68, 69, and 73, the transmission filters 31T and 32T, the reception filters 31R and 32R, a transmission/reception filter 38TR, the transmission amplifiers 41 and 42, and a reception amplifier 51.

Furthermore, the secondary antenna 12, the switch circuits 67, 68, 69, and 73, the transmission filter 32T, the reception filter 32R, the transmission/reception filter 38TR, the transmission amplifier 42, and the reception amplifier 51 constitute a sub-module 5H.

The transmission/reception filter 38TR is a filter whose input terminal is connected to the switch circuit 73, whose output terminal is connected to the switch circuit 69, and which takes C-Rx as a pass band.

The reception amplifier 51 is an amplifier whose input terminal is connected to a common terminal of the switch circuit 68, and whose output terminal is connected to the RFIC 3.

The switch circuit 67 has a common terminal connected to the output terminal of the transmission amplifier 42, one selection terminal connected to the input terminal of the transmission filter 32T, and another selection terminal connected to one selection terminal of the switch circuit 69.

The switch circuit 68 has a common terminal connected to the input terminal of the reception amplifier 51, one selection terminal connected to the output terminal of the reception filter 32R, and another selection terminal connected to another selection terminal of the switch circuit 69.

The switch circuit 69 has a common terminal connected to the transmission/reception filter 38TR.

The switch circuit 73 has a common terminal connected to the terminal 20b, one selection terminal connected to the output terminal of the transmission filter 32T and the input terminal of the reception filter 32R, and another selection terminal connected to the transmission/reception filter 38TR.

An existing sub-module has a circuit configuration of only reception systems, but in the high-frequency front end module 2H according to the present modification, the sub-module 5H includes the transmission system circuit, which makes it possible to execute two-uplink CA. That is, the sub-module 5H has the transmission filter 32T and the reception filter 32R (duplexer) used in the case of frequency division duplex (FDD) and the transmission/reception filter 38TR used in the case of time division duplex (TDD).

Note that, in the existing configuration, to the switch circuit 73, a reception filter for the reception band B-Rx is connected instead of the transmission filter 32T and the reception filter 32R (duplexer), and a reception filter for the reception band C-Rx is connected instead of the transmission/reception filter 38TR, but by disposing the transmission filter 32T and the reception filter 32R (duplexer) and the transmission/reception filter 38TR, it is not necessary to connect a duplicate reception filter to the switch circuit 73. With this, miniaturization of the sub-module 5H and the high-frequency front end module 2H is achieved.

According to the configuration described above, the high-frequency front end module 2H can execute two-uplink in which a signal in the transmission band (A-Tx) included in Band A, and a signal in the transmission band (B-Tx) included in Band B or a signal in the transmission band (C-Tx) included in Band C are simultaneously transmitted, and two-downlink in which a signal in the reception band (A-Rx) included in Band A, and a signal in the reception band (B-Rx) included in Band B or a signal in the reception band (C-Rx) included in Band C are simultaneously received.

Embodiment 2

2.1 Configurations of High-Frequency Front End Module 2C and Communication Device 1C

Although Embodiment 1 has described the configurations of the communication device and the high-frequency front end module for executing CA in two frequency bands, the present embodiment describes the configurations of a communication device and a high-frequency front end module for executing CA of two frequency bands among three frequency bands.

Figure 6:
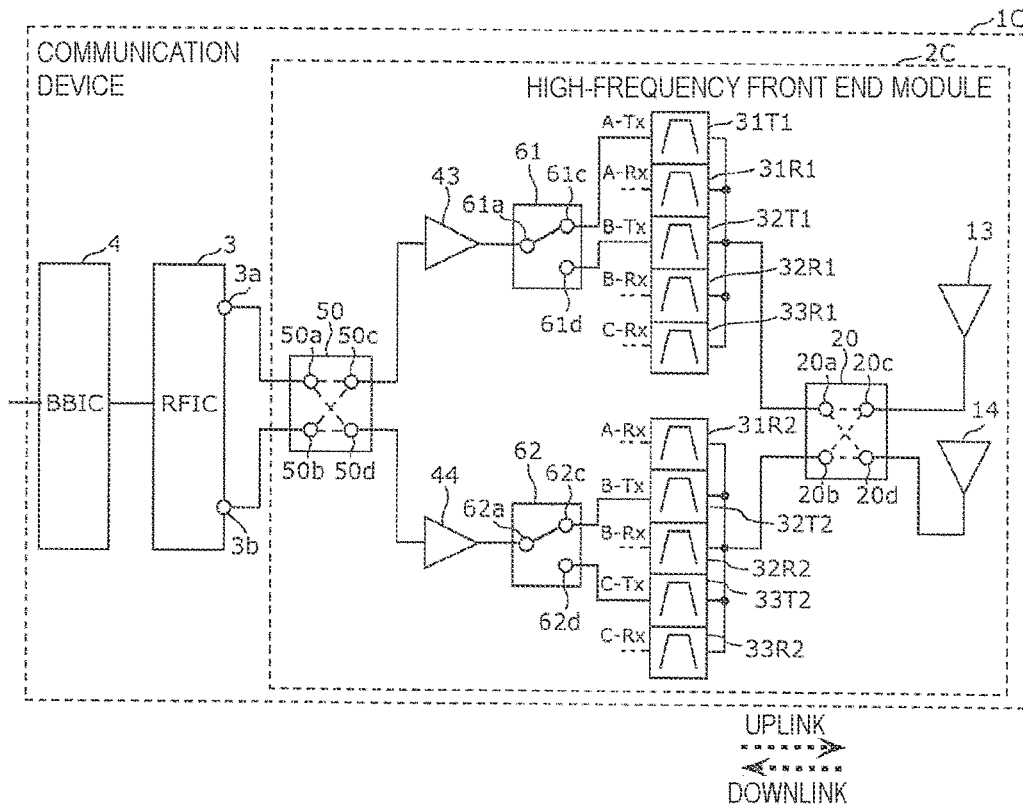
FIG. 6 is a circuit configuration diagram of a communication device according to Embodiment 2.

FIG. 6 is a circuit configuration diagram of a communication device 1C according to Embodiment 2. As illustrated in the diagram, the communication device 1C includes a high-frequency front end module 2C, the RFIC 3, and the BBIC 4. The communication device 1C according to the present embodiment differs from the communication device 1A according to Embodiment 1 in the configuration of the high-frequency front end module. Hereinafter, the communication device 1C according to the present embodiment will be described focusing on the differences from the communication device LA according to Embodiment 1.

As illustrated in FIG. 6, the high-frequency front end module 2C includes a primary antenna 13 and a secondary antenna 14, switch circuits 20, 50, 61, and 62, transmission filters 31T1, 32T1, 32T2, and 33T2, reception filters 31R1, 32R1, 33R1, 31R2, 32R2, and 33R2, and transmission amplifiers 43 and 44.

According to the configuration described above, the high-frequency front end module 2C can execute two-uplink in which two signals among a signal in the first transmission band (A-Tx) included in the first frequency band (Band A), a signal in the second transmission band (C-Tx) included in the second frequency band (Band C in the present embodiment) which is different from the first frequency band, and a signal in a third transmission band (B-Tx) included in a third frequency band (Band B in the present embodiment) which is different from the first frequency band and the second frequency band are simultaneously transmitted, and two-downlink in which two signals among a signal in the first reception band (A-Rx) included in the first frequency band (Band A), a signal in the second reception band (C-Rx) included in the second frequency band (Band C), and a signal in a third reception band (B-Rx) included in the third frequency band (Band B) which is different from the first frequency band and the second frequency band are simultaneously received.

The high-frequency front end module 2C according to the present embodiment is different from the high-frequency front end module 2A according to Embodiment 1 in a point that the configuration for transmitting/receiving signals in three frequency bands is included. Hereinafter, the high-frequency front end module 2C according to the present embodiment will be described focusing on the differences from the high-frequency front end module 2A according to Embodiment 1.

The primary antenna 13 is an antenna that is used in preference to the secondary antenna 14 in terms of antenna performance and the like, and is an antenna element capable of transmitting and receiving signals in Band A, Band B, and Band C. The secondary antenna 14 is an antenna element capable of transmitting and receiving signals in Band A, Band B, and Band C.

The switch circuit 61 is an SPDT type switch circuit having a common terminal 61a and selection terminals 61c and 61d. The common terminal 61a is connected to an output terminal of the transmission amplifier 43. The switch circuit 62 is an SPDT type switch circuit having a common terminal 62a and selection terminals 62c and 62d. The common terminal 62a is connected to an output terminal of the transmission amplifier 44.

The transmission filter 31T1 is a first transmission filter whose input terminal is connected to the selection terminal 61c, whose output terminal is connected to the switch circuit 20, and which takes A-Tx as a pass band.

The transmission filter 32T1 is a fifth transmission filter whose input terminal is connected to the selection terminal 61d, whose output terminal is connected to the switch circuit 20, and which takes B-Tx as a pass band.

The reception filter 31R1 is a first reception filter whose input terminal is connected to the switch circuit 20, and which takes A-Rx as a pass band.

The reception filter 32R1 is a fifth reception filter whose input terminal is connected to the switch circuit 20, and which takes B-Rx as a pass band.

The reception filter 33R1 is a fourth reception filter whose input terminal is connected to the switch circuit 20, and which takes C-Rx as a pass band.

The transmission filter 32T2 is a sixth transmission filter whose input terminal is connected to the selection terminal 62c, whose output terminal is connected to the switch circuit 20, and which takes B-Tx as a pass band.

The transmission filter 33T2 is a second transmission filter whose input terminal is connected to the selection terminal 62d, whose output terminal is connected to the switch circuit 20, and which takes C-Tx as a pass band.

The reception filter 31R2 is a third reception filter whose input terminal is connected to the switch circuit 20, and which takes A-Rx as a pass band.

The reception filter 32R2 is a sixth reception filter whose input terminal is connected to the switch circuit 20, and which takes B-Rx as a pass band.

The reception filter 33R2 is a second reception filter whose input terminal is connected to the switch circuit 20, and which takes C-Rx as a pass band.

The transmission filters 31T1 and 32T1 and the reception filters 31R1, 32R1, and 33R1 constitute a first multiplexer that can selectively transmit high-frequency signals in Band A and Band B and receive high-frequency signals in Band A, Band B, and Band C. Note that the first multiplexer does not have a transmission filter which takes C-Tx as a pass band.

The transmission filters 32T2 and 33T2 and the reception filters 31R2, 32R2, and 33R2 constitute a second multiplexer that can selectively transmit high-frequency signals in Band B and Band C and receive high-frequency signals in Band A, Band B, and Band C. Note that the second multiplexer does not have a transmission filter which takes A-Tx as a pass band.

The high-frequency front end module 2C described above includes the primary antenna 13 and the secondary antenna 14, the switch circuits 20, 61, and 62, the first multiplexer, and the second multiplexer described above, thereby making it possible to arbitrarily distribute high-frequency signals in Band A, Band B, and Band C to the primary antenna 13 and the secondary antenna 14 by switching the connection state of the switch circuits 20, 61, and 62, and execute CA of two-uplink two-downlink. Here, since the first multiplexer does not have a transmission filter of Band C and the second multiplexer does not have a transmission filter of Band A, it is possible to provide the high-frequency front end module 2C which is reduced in size and in which CA of two-uplink two-downlink can be performed.

2.2 Connection State of High-Frequency Front End Module 2C

Figure 7A:
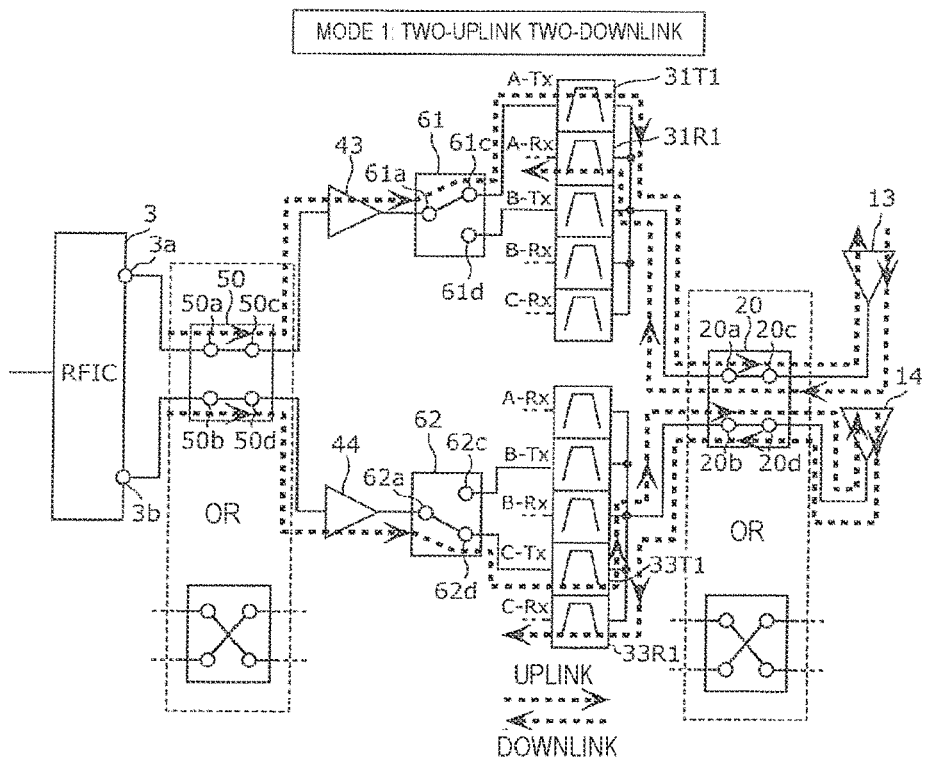
FIG. 7A is a circuit state diagram in a case of two-uplink two-downlink of a high-frequency front end module according to Embodiment 2.

FIG. 7A is a circuit state diagram in a case of two-uplink two-downlink of the high-frequency front end module 2C according to Embodiment 2. This diagram illustrates a circuit connection state in a case of two-uplink of Band A and Band C and two-downlink of Band A and Band C (mode 1: two-uplink two-downlink).

In the mode 1, as illustrated in FIG. 7A, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

Furthermore, by the control unit, the common terminal 61a and the selection terminal 61c are connected to each other in the switch circuit 61, and the common terminal 62a and the selection terminal 62d are connected to each other in the switch circuit 62.

In this connection state, in the mode 1, a transmission signal in Band A is transmitted through the output terminal 3a, the switch circuit 50, the transmission amplifier 43, the switch circuit 61, the first multiplexer, the switch circuit 20, and the primary antenna 13, and a transmission signal in Band C is transmitted through the output terminal 3b, the switch circuit 50, the transmission amplifier 44, the switch circuit 62, the second multiplexer, the switch circuit 20, and the secondary antenna 14. Furthermore, a reception signal in Band A is received by the RFIC 3 through the primary antenna 13, the switch circuit 20, and the first multiplexer, and a reception signal in Band C is received by the RFIC 3 through the secondary antenna 14, the switch circuit 20, and the second multiplexer.

Alternatively, in the mode 1, as illustrated in FIG. 7A, by the control unit, the terminal 20a and the terminal 20d are connected to each other, and the terminal 20b and the terminal 20c are connected to each other, in the switch circuit 20 (second connection state). Furthermore, the terminal 50a and the terminal 50d are connected to each other, and the terminal 50b and the terminal 50c are connected to each other, in the switch circuit 50.

Furthermore, by the control unit, the common terminal 61a and the selection terminal 61c are connected to each other in the switch circuit 61, and the common terminal 62a and the selection terminal 62d are connected to each other in the switch circuit 62.

In this connection state, in the mode 1, a transmission signal in Band C is transmitted through the output terminal 3a, the switch circuit 50, the transmission amplifier 44, the switch circuit 62, the second multiplexer, the switch circuit 20, and the primary antenna 13, and a transmission signal in Band A is transmitted through the output terminal 3b, the switch circuit 50, the transmission amplifier 43, the switch circuit 61, the first multiplexer, the switch circuit 20, and the secondary antenna 14. Furthermore, a reception signal in Band C is received by the RFIC 3 through the primary antenna 13, the switch circuit 20, and the second multiplexer, and a reception signal in Band A is received by the RFIC 3 through the secondary antenna 14, the switch circuit 20, and the first multiplexer.

Note that although not illustrated in FIG. 7A, a circuit connection state in a case of two-uplink two-downlink of Band B and Band C is as follows.

That is, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

Furthermore, by the control unit, the common terminal 61a and the selection terminal 61d are connected to each other in the switch circuit 61, and the common terminal 62a and the selection terminal 62d are connected to each other in the switch circuit 62.

In this connection state, a transmission signal in Band B is transmitted through the output terminal 3a, the switch circuit 50, the transmission amplifier 43, the switch circuit 61, the first multiplexer, the switch circuit 20, and the primary antenna 13, and a transmission signal in Band C is transmitted through the output terminal 3b, the switch circuit 50, the transmission amplifier 44, the switch circuit 62, the second multiplexer, the switch circuit 20, and the secondary antenna 14. Furthermore, a reception signal in Band B is received by the RFIC 3 through the primary antenna 13, the switch circuit 20, and the first multiplexer, and a reception signal in Band C is received by the RFIC 3 through the secondary antenna 14, the switch circuit 20, and the second multiplexer.

Alternatively, by the control unit, the terminal 20a and the terminal 20d are connected to each other, and the terminal 20b and the terminal 20c are connected to each other, in the switch circuit 20 (second connection state). Furthermore, the terminal 50a and the terminal 50d are connected to each other, and the terminal 50b and the terminal 50c are connected to each other, in the switch circuit 50.

Furthermore, by the control unit, the common terminal 61a and the selection terminal 61d are connected to each other in the switch circuit 61, and the common terminal 62a and the selection terminal 62d are connected to each other in the switch circuit 62.

In this connection state, a transmission signal in Band C is transmitted through the output terminal 3a, the switch circuit 50, the transmission amplifier 44, the switch circuit 62, the second multiplexer, the switch circuit 20, and the primary antenna 13, and a transmission signal in Band B is transmitted through the output terminal 3b, the switch circuit 50, the transmission amplifier 43, the switch circuit 61, the first multiplexer, the switch circuit 20, and the secondary antenna 14. Furthermore, a reception signal in Band C is received by the RFIC 3 through the primary antenna 13, the switch circuit 20, and the second multiplexer, and a reception signal in Band B is received by the RFIC 3 through the secondary antenna 14, the switch circuit 20, and the first multiplexer.

Furthermore, although not illustrated in FIG. 7A, a circuit connection state in a case of two-uplink two-downlink of Band A and Band B is as follows.

That is, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

Furthermore, by the control unit, the common terminal 61a and the selection terminal 61c are connected to each other in the switch circuit 61, and the common terminal 62a and the selection terminal 62c are connected to each other in the switch circuit 62.

In this connection state, a transmission signal in Band A is transmitted through the output terminal 3a, the switch circuit 50, the transmission amplifier 43, the switch circuit 61, the first multiplexer, the switch circuit 20, and the primary antenna 13, and a transmission signal in Band B is transmitted through the output terminal 3b, the switch circuit 50, the transmission amplifier 44, the switch circuit 62, the second multiplexer, the switch circuit 20, and the secondary antenna 14. Furthermore, a reception signal in Band A is received by the RFIC 3 through the primary antenna 13, the switch circuit 20, and the first multiplexer, and a reception signal in Band B is received by the RFIC 3 through the secondary antenna 14, the switch circuit 20, and the second multiplexer.

Alternatively, by the control unit, the terminal 20a and the terminal 20d are connected to each other, and the terminal 20b and the terminal 20c are connected to each other, in the switch circuit 20 (second connection state). Furthermore, the terminal 50a and the terminal 50d are connected to each other, and the terminal 50b and the terminal 50c are connected to each other, in the switch circuit 50.

Furthermore, by the control unit, the common terminal 61a and the selection terminal 61c are connected to each other in the switch circuit 61, and the common terminal 62a and the selection terminal 62c are connected to each other in the switch circuit 62.

In this connection state, a transmission signal in Band B is transmitted through the output terminal 3a, the switch circuit 50, the transmission amplifier 44, the switch circuit 62, the second multiplexer, the switch circuit 20, and the primary antenna 13, and a transmission signal in Band A is transmitted through the output terminal 3*b*, the switch circuit 50, the transmission amplifier 43, the switch circuit 61, the first multiplexer, the switch circuit 20, and the secondary antenna 14. Furthermore, a reception signal in Band B is received by the RFIC 3 through the primary antenna 13, the switch circuit 20, and the second multiplexer, and a reception signal in Band A is received by the RFIC 3 through the secondary antenna 14, the switch circuit 20, and the first multiplexer.

Figure 7B:
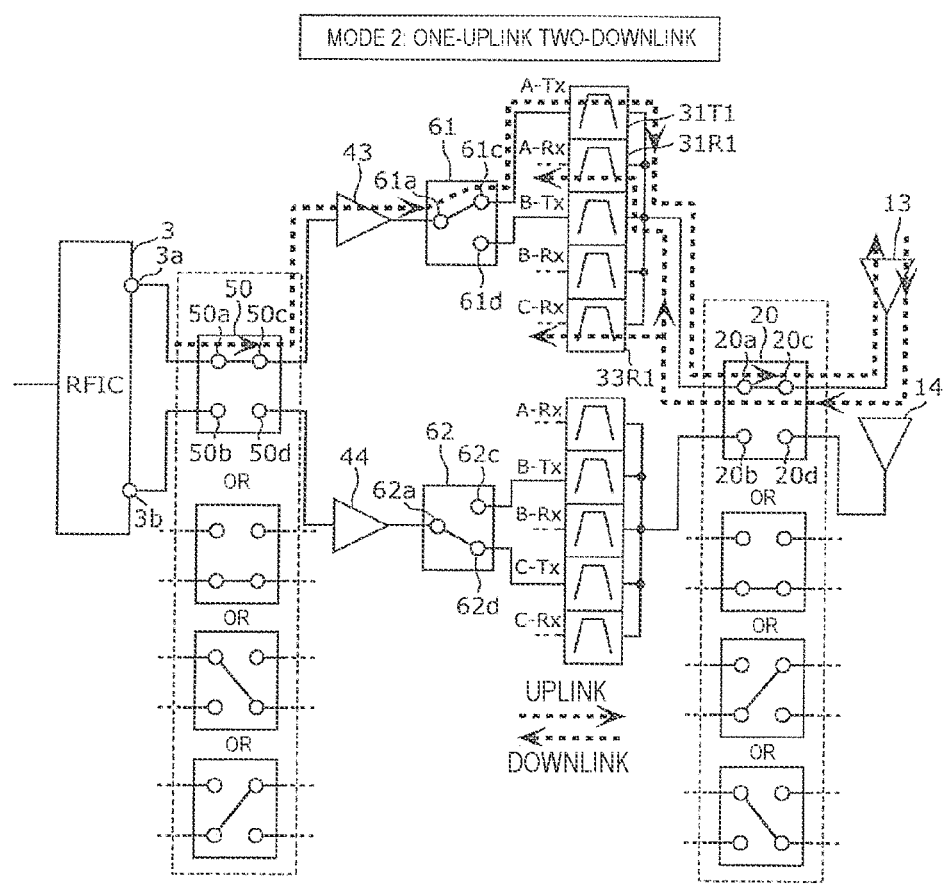
FIG. 7B is a circuit state diagram in a case of one-uplink two-downlink of the high-frequency front end module according to Embodiment 2.

FIG. 7B is a circuit state diagram in a case of one-uplink two-downlink of the high-frequency front end module 2C according to Embodiment 2. This diagram illustrates a circuit connection state in a case of one-uplink of Band A and two-downlink of Band A and Band C (mode 2: one-uplink two-downlink).

In the mode 2, as illustrated in FIG. 7B, by the control unit, the terminal 20*a* and the terminal 20*c* are connected to each other in the switch circuit 20. Furthermore, the terminal 50*a* and the terminal 50*c* are connected to each other in the switch circuit 50.

Furthermore, by the control unit, the common terminal 61*a* and the selection terminal 61*c* are connected to each other in the switch circuit 61.

In this connection state, in the mode 2, a transmission signal in Band A is transmitted through the output terminal 3*a*, the switch circuit 50, the transmission amplifier 43, the switch circuit 61, the first multiplexer, the switch circuit 20, and the primary antenna 13, and reception signals in Band A and Band C are received by the RFIC 3 through the primary antenna 13, the switch circuit 20, and the first multiplexer.

Alternatively, in the mode 2, one-uplink of Band C and two-downlink of Band A and Band C (mode 2: one-uplink two-downlink) can be performed. That is, by the control unit, the terminal 20*b* and the terminal 20*c* are connected to each other in the switch circuit 20. Furthermore, the terminal 50*a* and the terminal 50*d* are connected to each other in the switch circuit 50.

Furthermore, by the control unit, the common terminal 62*a* and the selection terminal 62*d* are connected to each other in the switch circuit 62.

In this connection state, in the mode 2, a transmission signal in Band C is transmitted through the output terminal 3*a*, the switch circuit 50, the transmission amplifier 44, the switch circuit 62, the second multiplexer, the switch circuit 20, and the primary antenna 13, and reception signals in Band A and Band C are received by the RFIC 3 through the primary antenna 13, the switch circuit 20, and the second multiplexer.

Note that in both the above-described two types of connection forms, the case of one-uplink two-downlink by passing through the output terminal 3*a* and the primary antenna 13 has been described as an example, but one-uplink two-downlink by passing through the output terminal 3*b* and the secondary antenna 14 is also possible.

Furthermore, although not illustrated in FIG. 7B, a circuit connection state in a case of one-uplink of Band B and two-downlink of Band B and Band C (mode 2: one-uplink two-downlink) is as follows.

In the mode 2, as illustrated in FIG. 7B, by the control unit, the terminal 20*a* and the terminal 20*c* are connected to each other in the switch circuit 20. Furthermore, the terminal 50*a* and the terminal 50*c* are connected to each other in the switch circuit 50.

Furthermore, by the control unit, the common terminal 61*a* and the selection terminal 61*d* are connected to each other in the switch circuit 61.

In this connection state, in the mode 2, a transmission signal in Band B is transmitted through the output terminal 3*a*, the switch circuit 50, the transmission amplifier 43, the switch circuit 61, the first multiplexer, the switch circuit 20, and the primary antenna 13, and reception signals in Band B and Band C are received by the RFIC 3 through the primary antenna 13, the switch circuit 20, and the first multiplexer.

Alternatively, in the mode 2, one-uplink of Band C and two-downlink of Band B and Band C (mode 2: one-uplink two-downlink) can be performed. That is, by the control unit, the terminal 20*b* and the terminal 20*c* are connected to each other in the switch circuit 20. Furthermore, the terminal 50*a* and the terminal 50*d* are connected to each other in the switch circuit 50.

Furthermore, by the control unit, the common terminal 62*a* and the selection terminal 62*d* are connected to each other in the switch circuit 62.

In this connection state, in the mode 2, a transmission signal in Band C is transmitted through the output terminal 3*a*, the switch circuit 50, the transmission amplifier 44, the switch circuit 62, the second multiplexer, the switch circuit 20, and the primary antenna 13, and reception signals in Band B and Band C are received by the RFIC 3 through the primary antenna 13, the switch circuit 20, and the second multiplexer.

Note that in both the above-described two types of connection forms, the case of one-uplink two-downlink by passing through the output terminal 3*a* and the primary antenna 13 has been described as an example, but one-uplink two-downlink by passing through the output terminal 3*b* and the secondary antenna 14 is also possible.

Furthermore, although not illustrated in FIG. 7B, a circuit connection state in a case of one-uplink of Band A and two-downlink of Band A and Band B (mode 2: one-uplink two-downlink) is as follows.

In the mode 2, as illustrated in FIG. 7B, by the control unit, the terminal 20*a* and the terminal 20*c* are connected to each other in the switch circuit 20. Furthermore, the terminal 50*a* and the terminal 50*c* are connected to each other in the switch circuit 50.

Furthermore, by the control unit, the common terminal 61*a* and the selection terminal 61*c* are connected to each other in the switch circuit 61.

In this connection state, in the mode 2, a transmission signal in Band A is transmitted through the output terminal 3*a*, the switch circuit 50, the transmission amplifier 43, the switch circuit 61, the first multiplexer, the switch circuit 20, and the primary antenna 13, and reception signals in Band A and Band B are received by the RFIC 3 through the primary antenna 13, the switch circuit 20, and the first multiplexer.

Alternatively, in the mode 2, one-uplink of Band B and two-downlink of Band A and Band B (mode 2: one-uplink two-downlink) can be performed. That is, by the control unit, the terminal 20*b* and the terminal 20*c* are connected to each other in the switch circuit 20. Furthermore, the terminal 50*a* and the terminal 50*d* are connected to each other in the switch circuit 50.

Furthermore, by the control unit, the common terminal 62*a* and the selection terminal 62*c* are connected to each other in the switch circuit 62.

In this connection state, in the mode 2, a transmission signal in Band B is transmitted through the output terminal 3a, the switch circuit 50, the transmission amplifier 44, the switch circuit 62, the second multiplexer, the switch circuit 20, and the primary antenna 13, and reception signals in Band A and Band B are received by the RFIC 3 through the primary antenna 13, the switch circuit 20, and the second multiplexer.

Alternatively, in the mode 2, by the control unit, the terminal 20a and the terminal 20c are connected to each other in the switch circuit 20. Furthermore, the terminal 50a and the terminal 50c are connected to each other in the switch circuit 50.

Furthermore, by the control unit, the common terminal 61a and the selection terminal 61d are connected to each other in the switch circuit 61.

In this connection state, in the mode 2, a transmission signal in Band B is transmitted through the output terminal 3a, the switch circuit 50, the transmission amplifier 43, the switch circuit 61, the first multiplexer, the switch circuit 20, and the primary antenna 13, and reception signals in Band A and Band B are received by the RFIC 3 through the primary antenna 13, the switch circuit 20, and the first multiplexer.

Note that, in all the above-described connection forms of one-uplink two-downlink, the case of one-uplink two-downlink by passing through the output terminal 3a and the primary antenna 13 has been described as an example, but one-uplink two-downlink by passing through the output terminal 3b and the secondary antenna 14 is also possible.

2.3 Comparison of High-Frequency Front End Modules According to Embodiment 2 and Comparative Example 2

Figure 8:
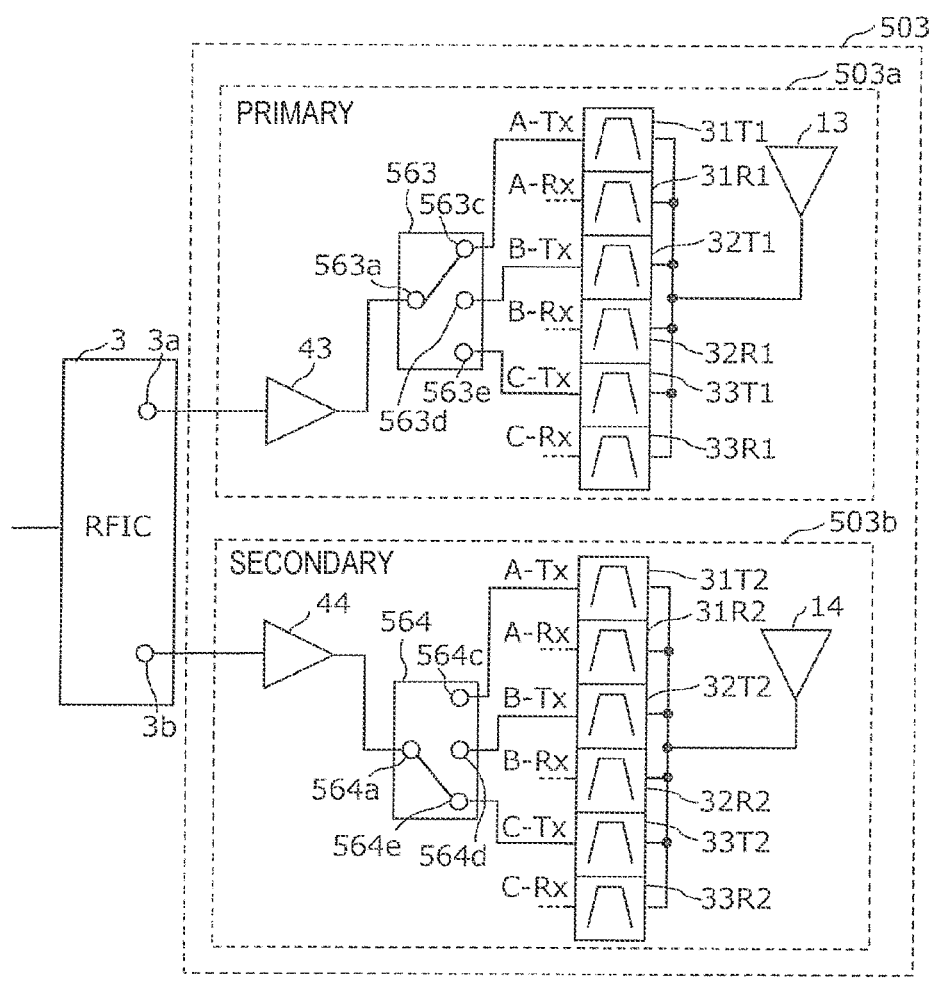
FIG. 8 is a circuit configuration diagram of a high-frequency front end module according to Comparative Example 2.

FIG. 8 is a circuit configuration diagram of a high-frequency front end module 503 according to Comparative Example 2. Note that the diagram also illustrates the RFIC 3 connected to the high-frequency front end module 503 according to Comparative Example 2. As illustrated in the diagram, the high-frequency front end module 503 includes a primary circuit 503a and a secondary circuit 503b. The primary circuit 503a includes the primary antenna 13, a switch circuit 563, transmission filters 31T1, 32T1, and 33T1, the reception filters 31R1, 32R1, and 33R1, and the transmission amplifier 43. The transmission filters 31T1, 32T1, and 33T1 and the reception filters 31R1, 32R1, and 33R1 constitute a first multiplexer. The secondary circuit 503b includes the secondary antenna 14, a switch circuit 564, the transmission filters 31T2, 32T2, and 33T2, the reception filters 31R2, 32R2, and 33R2, and the transmission amplifier 44. The transmission filters 31T2, 32T2, and 33T2 and the reception filters 31R2, 32R2, and 33R2 constitute a second multiplexer. The high-frequency front end module 503 according to Comparative Example 2 is different from the high-frequency front end module 2C according to Embodiment 2 in the configurations of the first multiplexer, the second multiplexer, and the switch circuit. Hereinafter, the high-frequency front end module 503 according to Comparative Example 2 will be described focusing on the differences from the high-frequency front end module 2C according to Embodiment 2.

The switch circuit 563 is an SP3T (Single Pole 3 Throw) type switch circuit having a common terminal 563a and selection terminals 563c, 563d, and 563e. The common terminal 563a is connected to the output terminal of the transmission amplifier 43. The switch circuit 564 is an SP3T type switch circuit having a common terminal 564a and selection terminals 564c, 564d, and 564e. The common terminal 564a is connected to the output terminal of the transmission amplifier 44.

The transmission filter 31T1 is a transmission filter whose input terminal is connected to the selection terminal 563c, whose output terminal is connected to the primary antenna 13, and which takes A-Tx as a pass band. The transmission filter 32T1 is a transmission filter whose input terminal is connected to the selection terminal 563d, whose output terminal is connected to the primary antenna 13, and which takes B-Tx as a pass band. The transmission filter 33T1 is a transmission filter whose input terminal is connected to the selection terminal 563e, whose output terminal is connected to the primary antenna 13, and which takes C-Tx as a pass band.

The reception filter 31R1 is a reception filter whose input terminal is connected to the primary antenna 13, and which takes A-Rx as a pass band. The reception filter 32R1 is a reception filter whose input terminal is connected to the primary antenna 13, and which takes B-Rx as a pass band. The reception filter 33R1 is a reception filter whose input terminal is connected to the primary antenna 13, and which takes C-Rx as a pass band.

The transmission filter 31T2 is a transmission filter whose input terminal is connected to the selection terminal 564c, whose output terminal is connected to the secondary antenna 14, and which takes A-Tx as a pass band. The transmission filter 32T2 is a transmission filter whose input terminal is connected to the selection terminal 564d, whose output terminal is connected to the secondary antenna 14, and which takes B-Tx as a pass band. The transmission filter 33T2 is a transmission filter whose input terminal is connected to the selection terminal 564e, whose output terminal is connected to the secondary antenna 14, and which takes C-Tx as a pass band.

The reception filter 31R2 is a reception filter whose input terminal is connected to the secondary antenna 14, and which takes A-Rx as a pass band. The reception filter 32R2 is a reception filter whose input terminal is connected to the secondary antenna 14, and which takes B-Rx as a pass band. The reception filter 33R2 is a reception filter whose input terminal is connected to the secondary antenna 14, and which takes C-Rx as a pass band.

According to the configuration described above, the high-frequency front end module 503 can execute two-uplink in which two signals among a signal in the first transmission band (A-Tx) included in Band A, a signal in the second transmission band (C-Tx) included in Band C, and a signal in the third transmission band (B-Tx) included in Band B are simultaneously transmitted, and two-downlink in which two signals among a signal in the first reception band (A-Rx) included in Band A, a signal in the second reception band (C-Rx) included in Band C, and a signal in the third reception band (B-Rx) included in Band B are simultaneously received.

For example, in a state in which the common terminal 563a and the selection terminal 563c are connected to each other and the common terminal 564a and the selection terminal 564e are connected to each other, it is possible to execute two-uplink two-downlink of Band A and Band C. That is, a transmission signal in Band A is transmitted through the output terminal 3a, the transmission amplifier 43, the first multiplexer, and the primary antenna 13, and a transmission signal in Band C is transmitted through the output terminal 3b, the transmission amplifier 44, the second multiplexer, and the secondary antenna 14. Furthermore, a reception signal in Band A is received by the RFIC 3 through the primary antenna 13 and the first multiplexer, and a reception signal in Band C is received by the RFIC 3 through the secondary antenna 14 and the second multiplexer. Furthermore, in a state in which the common terminal 563a and the selection terminal 563e are connected to each other and the common terminal 564a and the selection terminal 564c are connected to each other as well, it is possible to execute two-uplink two-downlink of Band A and Band C.

Furthermore, in a state in which the common terminal 563a and the selection terminal 563c are connected to each other and the common terminal 564a and the selection terminal 564d are connected to each other, or in a state in which the common terminal 563a and the selection terminal 563d are connected to each other and the common terminal 564a and the selection terminal 564c are connected to each other, it is possible to execute two-uplink two-downlink of Band A and Band B.

Furthermore, in a state in which the common terminal 563a and the selection terminal 563d are connected to each other and the common terminal 564a and the selection terminal 564e are connected to each other, or in a state in which the common terminal 563a and the selection terminal 563e are connected to each other and the common terminal 564a and the selection terminal 564d are connected to each other, it is possible to execute two-uplink two-downlink of Band B and Band C.

In the high-frequency front end module 503 according to Comparative Example 2, in order to ensure signal quality such as isolation and the like of high-frequency signals in two bands among Band A, Band B, and Band C simultaneously transmitted/received, two antenna elements, such as the primary antenna 13 which is preferentially used and the secondary antenna 14 which is secondarily used, are disposed. In this case, because of necessity of making it possible to transmit/receive each of the high-frequency signals in Band A, Band B, and Band C even by any of the antennas, a transmission path and a reception path of Band A, a transmission path and a reception path of Band B, and a transmission path and a reception path of Band C are connected to the primary antenna 13, and a transmission path and a reception path of Band A, a transmission path and a reception path of Band B, and a transmission path and a reception path of Band C are connected and disposed also to the secondary antenna 14. A filter for selectively allowing a desired frequency band to pass therethrough is arranged in each signal path, and in the configuration of the high-frequency front end module 503 according to Comparative Example 2, it is necessary to connect six filters to the primary antenna 13, and to similarly connect six filters to the secondary antenna 14. That is, in the front end module to which the primary antenna 13 and the secondary antenna 14 are applied, in order to achieve two-uplink two-downlink of two arbitrary frequency bands among Band A, Band B, and Band C, a total of 12 filters are required, and the circuit is enlarged.

In contrast, according to the high-frequency front end module 2C according to the present embodiment, it is possible to arbitrarily distribute high-frequency signals in Band A, Band B, and Band C to the primary antenna 13 and the secondary antenna 14 by switching the connection state of the switch circuit 20, and execute CA of two-uplink two-downlink. Therefore, in the first multiplexer connected to one of the antennas, for example, the transmission filter of Band C can be reduced. In the same manner, in the second multiplexer connected to the other of the antennas, for example, the transmission filter of Band A can be reduced. That is, in the high-frequency front end module 2C according to the present embodiment, a total of ten filters are disposed, and two filters can be reduced as compared with the configuration of the high-frequency front end module 503 according to Comparative Example 2.

In the configuration of the high-frequency front end module 2C according to the present embodiment, in comparison with the high-frequency front end module 503 according to Comparative Example 2, the one switch circuit 20 of the two-input two-output type is added, but the switch circuit 20 is sufficiently smaller than the transmission filter and the reception filter. Accordingly, it is possible to provide the high-frequency front end module 2C which is reduced in size and in which CA of two-uplink two-downlink can be performed.

Figure 9:
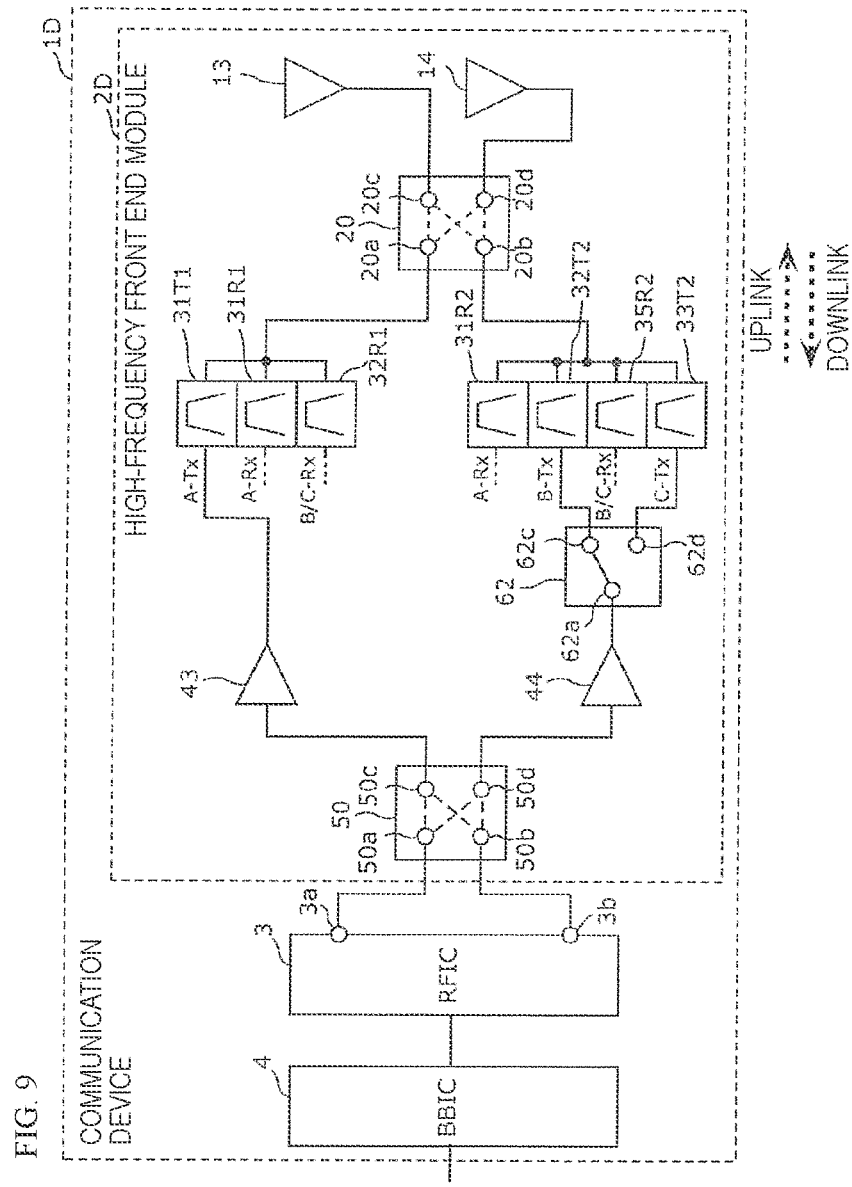
FIG. 9 is a circuit configuration diagram of a communication device according to Modification of Embodiment 2.

2.4 Configurations of High-Frequency Front End Module 2D and Communication Device 1D According to Modification FIG. 9 is a circuit configuration diagram of a communication device 1D according to Modification of Embodiment 2. As illustrated in the diagram, the communication device 1D includes a high-frequency front end module 2D, the RFIC 3, and the BBIC 4. The communication device 1D according to the present modification differs from the communication device 1C according to Embodiment 2 in the configuration of the high-frequency front end module. Hereinafter, the communication device 1D according to the present modification will be described focusing on the differences from the communication device 1C according to Embodiment 2.

As illustrated in FIG. 9, the high-frequency front end module 2D includes the primary antenna 13 and the secondary antenna 14, the switch circuits 20, 62, and 50, the transmission filters 31T1, 32T2, and 33T2, reception filters 31R1, 32R1, 31R2, and 35R2, and the transmission amplifiers 43 and 44.

Note that the communication device 1D according to the present modification is applied in a case where Band A, Band B, and Band C have the following frequency relationship. That is, the relationship is such that Band A overlaps with neither Band B nor Band C in the frequency band, and the reception band of Band B includes the reception band of Band C.

According to the configuration described above, the high-frequency front end module 2D can execute (1) two-uplink two-downlink of Band A and Band B, and (2) two-uplink two-downlink of Band A and Band C. Note that since Band B includes Band C, two-uplink two-downlink of Band B and Band C is not executed.

The high-frequency front end module 2D according to the present modification is different from the high-frequency front end module 2C according to Embodiment 2 in the configurations of the first multiplexer and the second multiplexer. Hereinafter, the high-frequency front end module 2D according to the present modification will be described focusing on the differences from the high-frequency front end module 2C according to Embodiment 2.

The switch circuit 62 is an SPDT type switch circuit having the common terminal 62a and the selection terminals 62c and 62d. The common terminal 62a is connected to the output terminal of the transmission amplifier 44.

The transmission filter 31T1 is a first transmission filter whose input terminal is connected to the transmission amplifier 43, whose output terminal is connected to the switch circuit 20, and which takes A-Tx as a pass band.

The reception filter 31R1 is a first reception filter whose input terminal is connected to the switch circuit 20, and which takes A-Rx as a pass band.

The reception filter 32R1 is a fifth reception filter whose input terminal is connected to the switch circuit 20, and which takes B-Rx and C-Rx as a pass band.

The transmission filter 32T2 is a sixth transmission filter whose input terminal is connected to the selection terminal 62c, whose output terminal is connected to the switch circuit 20, and which takes B-Tx as a pass band.

The transmission filter 33T2 is a second transmission filter whose input terminal is connected to the selection terminal 62d, whose output terminal is connected to the switch circuit 20, and which takes C-Tx as a pass band.

The reception filter 31R2 is a third reception filter whose input terminal is connected to the switch circuit 20, and which takes A-Rx as a pass band.

The reception filter 35R2 is a second reception filter whose input terminal is connected to the switch circuit 20, and which takes, as a pass band, a band which includes B-Rx and C-Rx.

The transmission filter 31T1 and the reception filters 31R1 and 32R1 constitute a first multiplexer that can selectively transmit a high-frequency signal in Band A and receive high-frequency signals in Band A, Band B, and Band C. Note that the first multiplexer does not have a transmission filter which takes B-Tx as a pass band and a transmission filter which takes C-Tx as a pass band.

The transmission filters 32T2 and 33T2 and the reception filters 31R2 and 35R2 constitute a second multiplexer that can selectively transmit high-frequency signals in Band B and Band C and receive high-frequency signals in Band A, Band B, and Band C. Note that the second multiplexer does not have a transmission filter which takes A-Tx as a pass band and a reception filter which takes C-Rx as a pass band and does not take part of B-Rx as a pass band.

The high-frequency front end module 2D described above includes the primary antenna 13 and the secondary antenna 14, the switch circuits 20 and 62, the first multiplexer, and the second multiplexer described above, thereby making it possible to arbitrarily distribute high-frequency signals in Band A, Band B, and Band C to the primary antenna 13 and the secondary antenna 14 by switching the connection state of the switch circuits 20 and 62, and execute two-uplink two-downlink of Band A and Band B, and two-uplink two-downlink of Band A and Band C. Here, since the first multiplexer does not have a transmission filter of Band B, a transmission filter of Band C, and a reception filter of Band C, and the second multiplexer does not have a transmission filter of Band A and a reception filter dedicated to Band C, it is possible to provide the high-frequency front end module 2D which is reduced in size and in which CA of two-uplink two-downlink in three bands including two bands in an overlapping relationship can be performed.

2.5 Connection State of High-Frequency Front End Module 2D According to Modification FIG. 10A is a circuit state diagram in a case of two-uplink two-downlink of the high-frequency front end module 2D according to Modification of Embodiment 2. This diagram illustrates a circuit connection state in a case of two-uplink of Band A and Band C and two-downlink of Band A and Band C (mode 1: two-uplink two-downlink).

In the mode 1, as illustrated in FIG. 10A, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

Furthermore, by the control unit, the common terminal 62a and the selection terminal 62d are connected to each other in the switch circuit 62.

In this connection state, in the mode 1, a transmission signal in Band A is transmitted through the output terminal 3a, the switch circuit 50, the transmission amplifier 43, the first multiplexer, the switch circuit 20, and the primary antenna 13, and a transmission signal in Band C is transmitted through the output terminal 3b, the switch circuit 50, the transmission amplifier 44, the switch circuit 62, the second multiplexer, the switch circuit 20, and the secondary antenna 14. Furthermore, a reception signal in Band A is received by the RFIC 3 through the primary antenna 13, the switch circuit 20, and the first multiplexer, and a reception signal in Band C is received by the RFIC 3 through the secondary antenna 14, the switch circuit 20, and the second multiplexer (reception filter 35R2).

Alternatively, in the mode 1, as illustrated in FIG. 10A, by the control unit, the terminal 20a and the terminal 20d are connected to each other, and the terminal 20b and the terminal 20c are connected to each other, in the switch circuit 20 (second connection state). Furthermore, the terminal 50a and the terminal 50d are connected to each other, and the terminal 50b and the terminal 50c are connected to each other, in the switch circuit 50.

Furthermore, by the control unit, the common terminal 62a and the selection terminal 62d are connected to each other in the switch circuit 62.

In this connection state, in the mode 1, a transmission signal in Band C is transmitted through the output terminal 3a, the switch circuit 50, the transmission amplifier 44, the switch circuit 62, the second multiplexer, the switch circuit 20, and the primary antenna 13, and a transmission signal in Band A is transmitted through the output terminal 3b, the switch circuit 50, the transmission amplifier 43, the first multiplexer, the switch circuit 20, and the secondary antenna 14. Furthermore, a reception signal in Band C is received by the RFIC 3 through the primary antenna 13, the switch circuit 20, and the second multiplexer (reception filter 35R2), and a reception signal in Band A is received by the RFIC 3 through the secondary antenna 14, the switch circuit 20, and the first multiplexer.

Furthermore, in the high-frequency front end module 2D, two-uplink of Band A and Band B and two-downlink of Band A and Band B (mode 1: two-uplink two-downlink) can be performed.

That is, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

Furthermore, by the control unit, the common terminal 62a and the selection terminal 62c are connected to each other in the switch circuit 62.

In this connection state, in the mode 1, a transmission signal in Band A is transmitted through the output terminal 3a, the switch circuit 50, the transmission amplifier 43, the first multiplexer, the switch circuit 20, and the primary antenna 13, and a transmission signal in Band B is transmitted through the output terminal 3b, the switch circuit 50, the transmission amplifier 44, the switch circuit 62 (through the selection terminal 62c), the second multiplexer, the switch circuit 20, and the secondary antenna 14. Furthermore, a reception signal in Band A is received by the RFIC 3 through the primary antenna 13, the switch circuit 20, and the first multiplexer, and a reception signal in Band B is received by the RFIC 3 through the secondary antenna 14, the switch circuit 20, and the second multiplexer (reception filter 35R2).

Alternatively, by the control unit, the terminal 20a and the terminal 20d are connected to each other, and the terminal 20b and the terminal 20c are connected to each other, in the switch circuit 20 (second connection state). Furthermore, the terminal 50a and the terminal 50d are connected to each other, and the terminal 50b and the terminal 50c are connected to each other, in the switch circuit 50.

Furthermore, by the control unit, the common terminal 62a and the selection terminal 62c are connected to each other in the switch circuit 62.

In this connection state, in the mode 1, a transmission signal in Band B is transmitted through the output terminal 3a, the switch circuit 50, the transmission amplifier 44, the switch circuit 62 (through the selection terminal 62c), the second multiplexer, the switch circuit 20, and the primary antenna 13, and a transmission signal in Band A is transmitted through the output terminal 3b, the switch circuit 50, the transmission amplifier 43, the first multiplexer, the switch circuit 20, and the secondary antenna 14. Furthermore, a reception signal in Band B is received by the RFIC 3 through the primary antenna 13, the switch circuit 20, and the second multiplexer (reception filter 35R2), and a reception signal in Band A is received by the RFIC 3 through the secondary antenna 14, the switch circuit 20, and the first multiplexer.

Figure 10B:
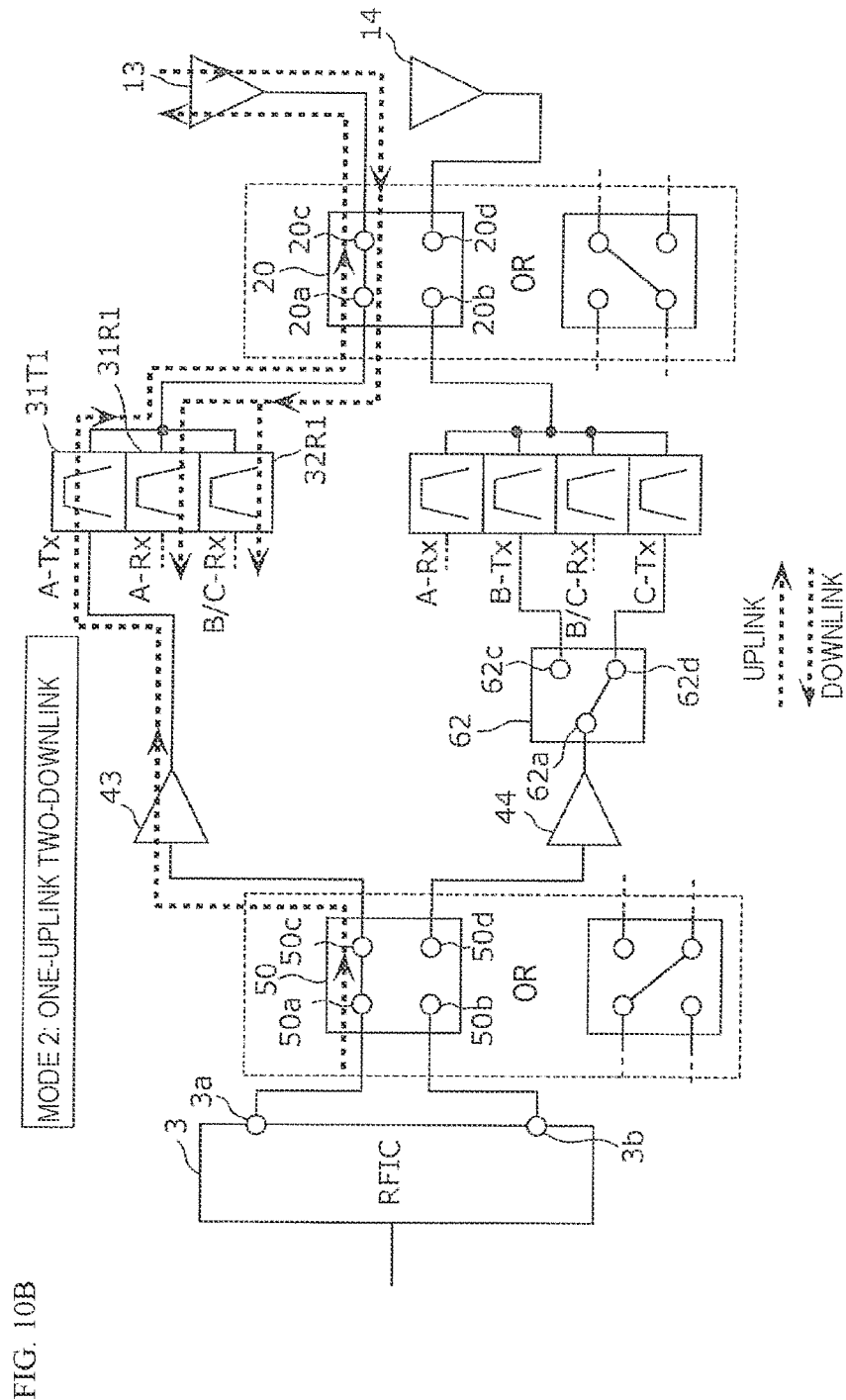
FIG. 10B is a circuit state diagram in a case of one-uplink (Band A) two-downlink of the high-frequency front end module according to Modification of Embodiment 2.

FIG. 10B is a circuit state diagram in a case of one-uplink two-downlink of the high-frequency front end module 2D according to Modification of Embodiment 2. This diagram illustrates a circuit connection state in a case of one-uplink of Band A and two-downlink of Band A and Band B (mode 2: one-uplink two-downlink).

In the mode 2, as illustrated in FIG. 10B, by the control unit, the terminal 20a and the terminal 20c are connected to each other in the switch circuit 20 (third connection state). Furthermore, the terminal 50a and the terminal 50c are connected to each other in the switch circuit 50.

In this connection state, in the mode 2, a transmission signal in Band A is transmitted through the output terminal 3a, the switch circuit 50, the transmission amplifier 43, the first multiplexer, the switch circuit 20, and the primary antenna 13, and reception signals in Band A and Band B are received by the RFIC 3 through the primary antenna 13, the switch circuit 20, and the first multiplexer.

Furthermore, in the above-described connection state, one-uplink of Band A and two-downlink of Band A and Band C (mode 2: one-uplink two-downlink) can also be performed.

That is, a transmission signal in Band A is transmitted through the output terminal 3a, the switch circuit 50, the transmission amplifier 43, the first multiplexer, the switch circuit 20, and the primary antenna 13, and reception signals in Band A and Band C are received by the RFIC 3 through the primary antenna 13, the switch circuit 20, and the first multiplexer.

Furthermore, in the high-frequency front end module 2D, one-uplink of Band B and two-downlink of Band A and Band B (mode 2: one-uplink two-downlink) can be performed.

That is, by the control unit, the terminal 20b and the terminal 20c are connected to each other in the switch circuit 20 (fifth connection state). Furthermore, the terminal 50a and the terminal 50d are connected to each other in the switch circuit 50.

Furthermore, by the control unit, the common terminal 62a and the selection terminal 62c are connected to each other in the switch circuit 62.

In this connection state, in the mode 2, a transmission signal in Band B is transmitted through the output terminal 3a, the switch circuit 50, the transmission amplifier 44, the switch circuit 62 (through the selection terminal 62c), the second multiplexer, the switch circuit 20, and the primary antenna 13, and reception signals in Band A and Band B are received by the RFIC 3 through the primary antenna 13, the switch circuit 20, and the second multiplexer.

Furthermore, in the above-described connection state, one-uplink of Band C and two-downlink of Band A and Band C (mode 2: one-uplink two-downlink) can also be performed.

That is, by the control unit, the terminal 20b and the terminal 20c are connected to each other in the switch circuit 20 (fifth connection state). Furthermore, the terminal 50a and the terminal 50d are connected to each other in the switch circuit 50.

Furthermore, by the control unit, the common terminal 62a and the selection terminal 62d are connected to each other in the switch circuit 62.

That is, a transmission signal in Band C is transmitted through the output terminal 3a, the switch circuit 50, the transmission amplifier 44, the switch circuit 62, the second multiplexer, the switch circuit 20, and the primary antenna 13, and reception signals in Band A and Band C are received by the RFIC 3 through the primary antenna 13, the switch circuit 20, and the second multiplexer.

Note that in the above-described two types of connection forms, the case of one-uplink two-downlink by passing through the output terminal 3a and the primary antenna 13 has been described as an example, but one-uplink two-downlink by passing through the output terminal 3b and the secondary antenna 14 is also possible.

The high-frequency front end module 2D according to the present modification includes the primary antenna 13 and the secondary antenna 14, the switch circuit 20, the first multiplexer, and the second multiplexer, thereby making it possible to execute two-uplink two-downlink of two bands of Band A and Band B, and two-uplink two-downlink of two bands of Band A and Band C, by switching the connection state of the switch circuit 20. By arbitrarily distributing high-frequency signals in Band A and Band B to the primary antenna 13 and the secondary antenna 14, and arbitrarily distributing high-frequency signals in Band A and Band C to the primary antenna 13 and the secondary antenna 14, CA of two-uplink two-downlink can be performed. Therefore, in the first multiplexer connected to one of the antennas, the transmission filters of Band B and Band C can be reduced. In the same manner, in the second multiplexer connected to the other of the antennas, the transmission filter of Band A can be reduced. That is, three or more filters can be reduced as compared with the configuration of the high-frequency front end module 503 according to Comparative Example 2.

Furthermore, in the configuration of the high-frequency front end module 2D according to the present modification, as compared with the high-frequency front end module 2C according to Embodiment 2, it is possible to further reduce three filters of the transmission filter of Band B and the reception filter dedicated to Band C as the filters constituting the first multiplexer, and the reception filter dedicated to Band C as the second multiplexer. Furthermore, in the case of one-uplink two-downlink, only one of the primary antenna 13 and the secondary antenna 14 may be used. Accordingly, it is possible to provide the high-frequency front end module 2D which is further reduced in size and in which CA of two-uplink two-downlink can be performed and the CA operation of one-uplink two-downlink is simplified.

Embodiment 3

3.1 Configurations of High-Frequency Front End Module 2E and Communication Device 1E Embodiment 1 has described the configurations of the communication device and the high-frequency front end module for executing CA in two frequency bands, and Embodiment 2 has described the configurations of the communication device and the high-frequency front end module for executing CA in two frequency bands among three frequency bands. In contrast, the present embodiment describes the configurations of a communication device and a high-frequency front end module for executing CA of two frequency bands among four frequency bands.

Figure 11:
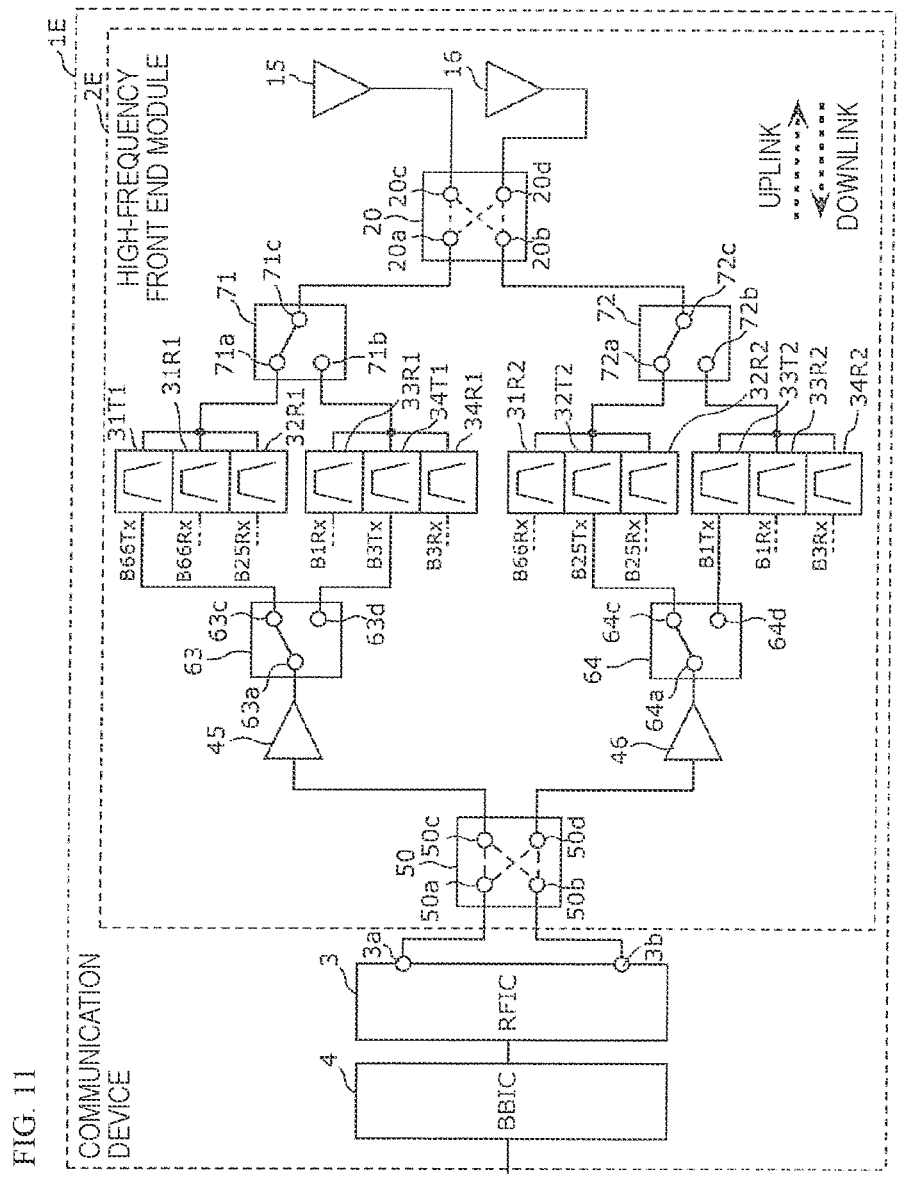
FIG. 11 is a circuit configuration diagram of a communication device according to Embodiment 3.

FIG. 11 is a circuit configuration diagram of a communication device 1E according to Embodiment 3. As illustrated in the diagram, the communication device 1E includes a high-frequency front end module 2E, the RFIC 3, and the BBIC 4. The communication device 1E according to the present embodiment differs from the communication device 1C according to Embodiment 2 in the configuration of the high-frequency front end module. Hereinafter, the communication device 1E according to the present embodiment will be described focusing on the differences from the communication device 1C according to Embodiment 2.

As illustrated in FIG. 11, the high-frequency front end module 2E includes a primary antenna 15 and a secondary antenna 16, switch circuits 20, 50, 63, 64, 71, and 72, transmission filters 31T1, 34T1, 32T2, and 33T2, reception filters 31R1, 32R1, 33R1, 34R1, 31R2, 32R2, 33R2, and 34R2, and transmission amplifiers 45 and 46.

According to the configuration described above, the high-frequency front end module 2E can execute (1) two-uplink in which a transmission signal in a first transmission band (B66-Tx) included in a first frequency band (Band 66) and a transmission signal in a second transmission band (B25-Tx) included in a second frequency band (Band 25) are simultaneously transmitted, (2) two-downlink in which a reception signal in a first reception band (B66-Rx) included in the first frequency band (Band 66) and a reception signal in a second reception band (B25-Rx) included in the second frequency band (Band 25) are simultaneously received, (3) two-uplink in which a transmission signal in a third transmission band (B1-Tx) included in a third frequency band (Band 1) and a transmission signal in a fourth transmission band (B3-Tx) included in a fourth frequency band (Band 3) are simultaneously transmitted, and (4) two-downlink in which a reception signal in a third reception band (B1-Rx) included in the third frequency band (Band 1) and a reception signal in a fourth reception band (B3-Rx) included in the fourth frequency band (Band 3) are simultaneously received.

Note that in the present embodiment, a working example in which each of the four frequency bands is allocated to a specific band of LTE (Long Term Evolution) is described. Note that Band 66 has a transmission band (about 1710-1780 MHz) and a reception band (about 2110-2200 MHz). Band 25 has a transmission band (about 1850-1915 MHz) and a reception band (about 1930-1995 MHz). Band 1 has a transmission band (about 1920-1980 MHz) and a reception band (about 2110-2170 MHz). Band 3 has a transmission band (about 1710-1785 MHz) and a reception band (about 1805-1880 MHz).

In the frequency allocation described above, a relationship in which the transmission band of Band 3 includes the transmission band of Band 66 is established, and a relationship in which the reception band of Band 66 includes the reception band of Band 1 is established. In the four frequency bands, there is no other overlapping and inclusion relationship.

By the relationship of the frequency band, the high-frequency front end module 2E according to the present embodiment is configured such that two-uplink of Band 66 and Band 3 is not executed, and two-downlink of Band 66 and Band 1 is not executed.

The high-frequency front end module 2E according to the present embodiment is different from the high-frequency front end module 2C according to Embodiment 2 in a point that the configuration for transmitting/receiving signals in four frequency bands is included. Hereinafter, the high-frequency front end module 2E according to the present embodiment will be described focusing on the differences from the high-frequency front end module 2C according to Embodiment 2.

The primary antenna 15 is an antenna that is used in preference to the secondary antenna 16 in terms of antenna performance and the like, and is an antenna element capable of transmitting and receiving signals in Band 66, Band 25, Band 1, and Band 3. The secondary antenna 16 is an antenna element capable of transmitting and receiving signals in Band 66, Band 25, Band 1, and Band 3.

The switch circuit 63 is an SPDT type switch circuit having a common terminal 63a and selection terminals 63c and 63d. The common terminal 63a is connected to an output terminal of the transmission amplifier 45. The switch circuit 64 is an SPDT type switch circuit having a common terminal 64a and selection terminals 64c and 64d. The common terminal 64a is connected to an output terminal of the transmission amplifier 46.

The switch circuit 71 is an SPDT type switch circuit having a common terminal 71c and selection terminals 71a and 71b. The common terminal 71c is connected to the terminal 20a of the switch circuit 20. The switch circuit 72 is an SPDT type switch circuit having a common terminal 72c and selection terminals 72a and 72b. The common terminal 72c is connected to the terminal 20b of the switch circuit 20.

The transmission filter 31T1 is a first transmission filter whose input terminal is connected to the selection terminal 63c, whose output terminal is connected to the selection terminal 71a, and which takes B66-Tx as a pass band.

The transmission filter 34T1 is a seventh transmission filter whose input terminal is connected to the selection terminal 63d, whose output terminal is connected to the selection terminal 71b, and which takes B3-Tx as a pass band.

The reception filter 31R1 is a first reception filter whose input terminal is connected to the selection terminal 71a, and which takes B66-Rx as a pass band.

The reception filter 32R1 is a fourth reception filter whose input terminal is connected to the selection terminal 71a, and which takes B25-Rx as a pass band.

The reception filter 33R1 is a fifth reception filter whose input terminal is connected to the selection terminal 71b, and which takes B1-Rx as a pass band.

The reception filter 34R1 is a seventh reception filter whose input terminal is connected to the selection terminal 71b, and which takes B3-Rx as a pass band.

The transmission filter 32T2 is a second transmission filter whose input terminal is connected to the selection terminal 64c, whose output terminal is connected to the selection terminal 72a, and which takes B25-Tx as a pass band.

The transmission filter 33T2 is a sixth transmission filter whose input terminal is connected to the selection terminal 64d, whose output terminal is connected to the selection terminal 72b, and which takes B1-Tx as a pass band.

The reception filter 31R2 is a third reception filter whose input terminal is connected to the selection terminal 72a, and which takes B66-Rx as a pass band.

The reception filter 32R2 is a second reception filter whose input terminal is connected to the selection terminal 72a, and which takes B25-Rx as a pass band.

The reception filter 33R2 is a sixth reception filter whose input terminal is connected to the selection terminal 72b, and which takes B1-Rx as a pass band.

The reception filter 34R2 is an eighth reception filter whose input terminal is connected to the selection terminal 72b, and which takes B3-Rx as a pass band.

The transmission filters 31T1 and 34T1 and the reception filters 31R1, 32R1, 33R1, and 34R1 constitute a first multiplexer that can selectively transmit high-frequency signals in Band 66 and Band 3 and receive high-frequency signals in Band 66, Band 25, Band 1, and Band 3. Note that the first multiplexer does not have a transmission filter which takes B25-Tx as a pass band and a transmission filter which takes B1-Tx as a pass band.

The transmission filters 32T2 and 33T2 and the reception filters 31R2, 32R2, 33R2, and 34R2 constitute a second multiplexer that can selectively transmit high-frequency signals in Band 25 and Band 1 and receive high-frequency signals in Band 66, Band 25, Band 1, and Band 3.

Note that the second multiplexer does not have a transmission filter which takes B66-Tx as a pass band and a transmission filter which takes B3-Tx as a pass band.

The high-frequency front end module 2E described above includes the primary antenna 15 and the secondary antenna 16, the switch circuits 20, 63, 64, 71, and 72, the first multiplexer, and the second multiplexer described above, thereby making it possible to arbitrarily distribute high-frequency signals in Band 66, Band 25, Band 1, and Band 3 to the primary antenna 15 and the secondary antenna 16 by switching the connection state of the switch circuits 20, 63, 64, 71, and 72, and execute CAs of two-uplink two-downlink cited in (1)-(4) described above. Here, since the first multiplexer does not have the transmission filter of Band 25 and the transmission filter of Band 1, and the second multiplexer does not have the transmission filter of Band 66 and the transmission filter of Band 3, it is possible to provide the high-frequency front end module 2E which is reduced in size and in which CA of two-uplink two-downlink can be performed.

3.2 Connection State of High-Frequency Front End Module 2E

Figure 12A:
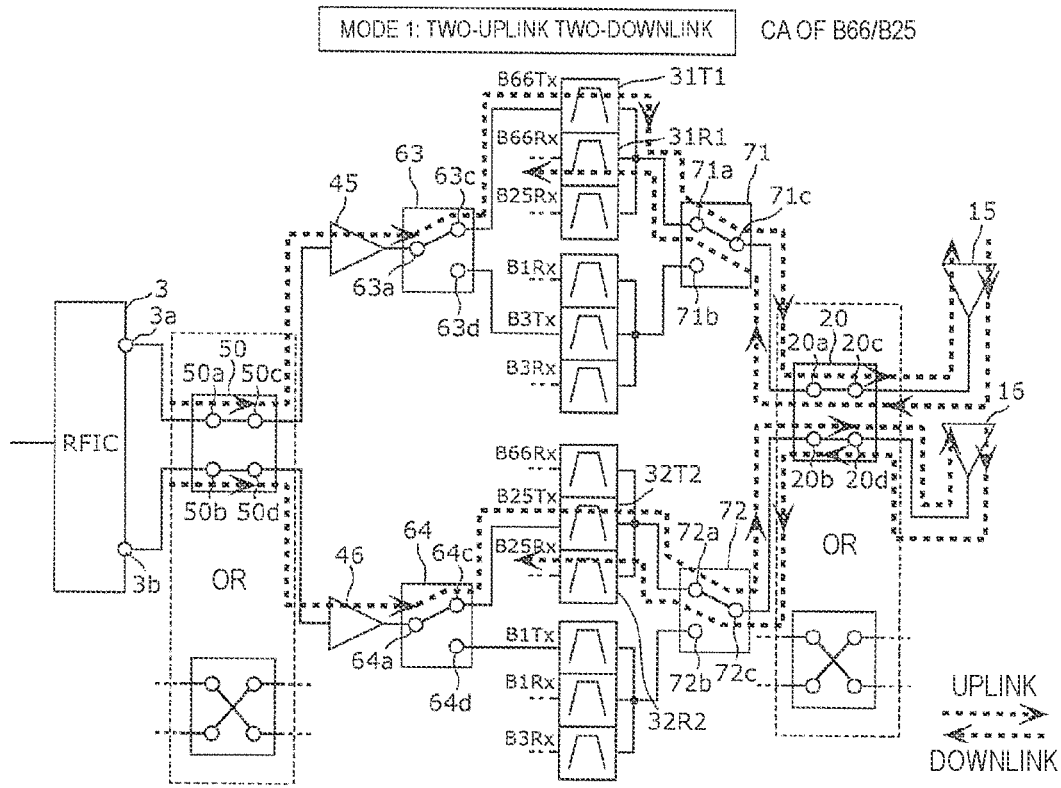
FIG. 12A is a circuit state diagram in a case of two-uplink (B66/B25) two-downlink of a high-frequency front end module according to Embodiment 3.

FIG. 12A is a circuit state diagram in a case of two-uplink two-downlink of the high-frequency front end module 2E according to Embodiment 3. This diagram illustrates a circuit connection state in a case of two-uplink of Band 66 and Band 25 and two-downlink of Band 66 and Band 25 (mode 1: two-uplink two-downlink).

In the mode 1, as illustrated in FIG. 12A, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

Furthermore, by the control unit, the common terminal 63a and the selection terminal 63c are connected to each other in the switch circuit 63, and the common terminal 64a and the selection terminal 64c are connected to each other in the switch circuit 64.

In this connection state, in the mode 1, a transmission signal in Band 66 is transmitted through the output terminal 3a, the switch circuit 50, the transmission amplifier 45, the switch circuit 63, the first multiplexer, the switch circuit 71, the switch circuit 20, and the primary antenna 15, and a transmission signal in Band 25 is transmitted through the output terminal 3b, the switch circuit 50, the transmission amplifier 46, the switch circuit 64, the second multiplexer, the switch circuit 72, the switch circuit 20, and the secondary antenna 16. Furthermore, a reception signal in Band 66 is received by the RFIC 3 through the primary antenna 15, the switch circuit 20, the switch circuit 71, and the first multiplexer, and a reception signal in Band 25 is received by the RFIC 3 through the secondary antenna 16, the switch circuit 20, the switch circuit 72, and the second multiplexer.

Alternatively, in the mode 1, as illustrated in FIG. 12A, by the control unit, the terminal 20a and the terminal 20d are connected to each other, and the terminal 20b and the terminal 20c are connected to each other, in the switch circuit 20 (second connection state). Furthermore, the terminal 50a and the terminal 50d are connected to each other, and the terminal 50b and the terminal 50c are connected to each other, in the switch circuit 50.

Furthermore, by the control unit, the common terminal 63a and the selection terminal 63c are connected to each other in the switch circuit 63, and the common terminal 64a and the selection terminal 64c are connected to each other in the switch circuit 64.

In this connection state, in the mode 1, a transmission signal in Band 25 is transmitted through the output terminal 3a, the switch circuit 50, the transmission amplifier 46, the switch circuit 64, the second multiplexer, the switch circuit 72, the switch circuit 20, and the primary antenna 15, and a transmission signal in Band 66 is transmitted through the output terminal 3b, the switch circuit 50, the transmission amplifier 45, the switch circuit 63, the first multiplexer, the switch circuit 71, the switch circuit 20, and the secondary antenna 16. Furthermore, a reception signal in Band 25 is received by the RFIC 3 through the primary antenna 15, the switch circuit 20, the switch circuit 72, and the second multiplexer, and a reception signal in Band 66 is received by the RFIC 3 through the secondary antenna 16, the switch circuit 20, the switch circuit 71, and the first multiplexer.

Figure 12B:
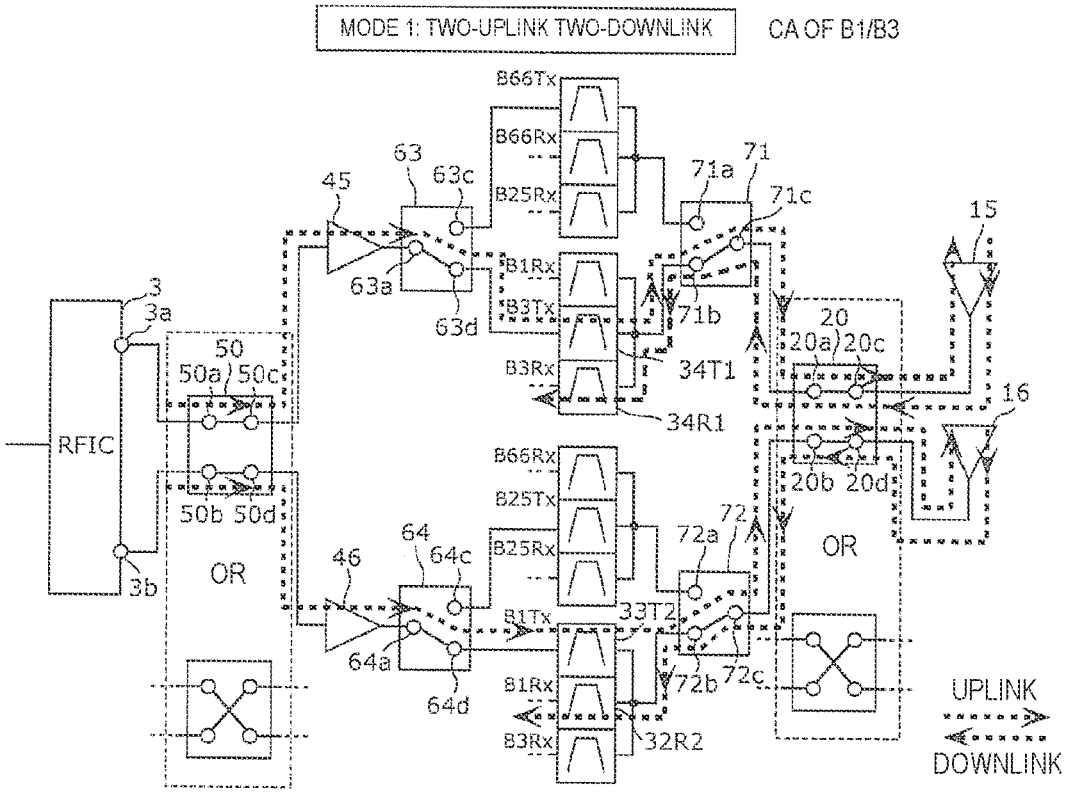
FIG. 12B is a circuit state diagram in a case of two-uplink (B1/B3) two-downlink of the high-frequency front end module according to Embodiment 3.

FIG. 12B is a circuit state diagram in a case of two-uplink two-downlink of the high-frequency front end module 2E according to Embodiment 3. This diagram illustrates a circuit connection state in a case of two-uplink of Band 1 and Band 3 and two-downlink of Band 1 and Band 3 (mode 1: two-uplink two-downlink).

In the mode 1, as illustrated in FIG. 12B, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

Furthermore, by the control unit, the common terminal 63a and the selection terminal 63d are connected to each other in the switch circuit 63, and the common terminal 64a and the selection terminal 64d are connected to each other in the switch circuit 64.

In this connection state, in the mode 1, a transmission signal in Band 1 is transmitted through the output terminal 3a, the switch circuit 50, the transmission amplifier 45, the switch circuit 63, the first multiplexer, the switch circuit 71, the switch circuit 20, and the primary antenna 15, and a transmission signal in Band 3 is transmitted through the output terminal 3b, the switch circuit 50, the transmission amplifier 46, the switch circuit 64, the second multiplexer, the switch circuit 72, the switch circuit 20, and the secondary antenna 16. Furthermore, a reception signal in Band 1 is received by the RFIC 3 through the primary antenna 15, the switch circuit 20, the switch circuit 71, and the first multiplexer, and a reception signal in Band 3 is received by the RFIC 3 through the secondary antenna 16, the switch circuit 20, the switch circuit 72, and the second multiplexer.

Alternatively, in the mode 1, as illustrated in FIG. 12B, by the control unit, the terminal 20a and the terminal 20d are connected to each other, and the terminal 20b and the terminal 20c are connected to each other, in the switch circuit 20 (second connection state). Furthermore, the terminal 50a and the terminal 50d are connected to each other, and the terminal 50b and the terminal 50c are connected to each other, in the switch circuit 50.

Furthermore, by the control unit, the common terminal 63a and the selection terminal 63d are connected to each other in the switch circuit 63, and the common terminal 64a and the selection terminal 64d are connected to each other in the switch circuit 64.

In this connection state, in the mode 1, a transmission signal in Band 3 is transmitted through the output terminal 3a, the switch circuit 50, the transmission amplifier 46, the switch circuit 64, the second multiplexer, the switch circuit 72, the switch circuit 20, and the primary antenna 15, and a transmission signal in Band 1 is transmitted through the output terminal 3b, the switch circuit 50, the transmission amplifier 45, the switch circuit 63, the first multiplexer, the switch circuit 71, the switch circuit 20, and the secondary antenna 16. Furthermore, a reception signal in Band 3 is received by the RFIC 3 through the primary antenna 15, the switch circuit 20, the switch circuit 72, and the second multiplexer, and a reception signal in Band 1 is received by the RFIC 3 through the secondary antenna 16, the switch circuit 20, the switch circuit 71, and the first multiplexer.

Figure 12C:
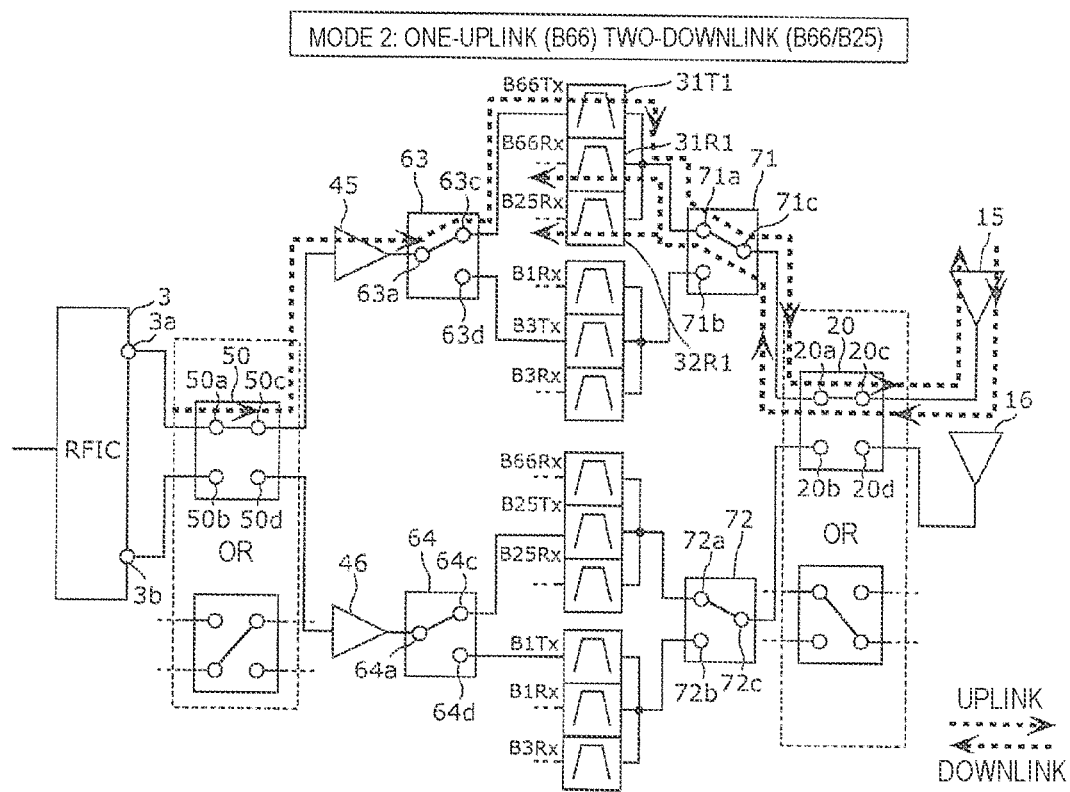
FIG. 12C is a circuit state diagram in a case of one-uplink (B66) two-downlink of the high-frequency front end module according to Embodiment 3.

FIG. 12C is a circuit state diagram in a case of one-uplink two-downlink of the high-frequency front end module 2E according to Embodiment 3. This diagram illustrates a circuit connection state in a case of one-uplink of Band 66 and two-downlink of Band 66 and Band 25 (mode 2: one-uplink two-downlink).

In the mode 2, as illustrated in FIG. 12C, by the control unit, the terminal 20a and the terminal 20c are connected to each other in the switch circuit 20 (third connection state). Furthermore, the terminal 50a and the terminal 50c are connected to each other in the switch circuit 50.

Furthermore, by the control unit, the common terminal 63a and the selection terminal 63c are connected to each other in the switch circuit 63.

In this connection state, in the mode 2, a transmission signal in Band 66 is transmitted through the output terminal 3a, the switch circuit 50, the transmission amplifier 45, the switch circuit 63, the first multiplexer, the switch circuit 71, the switch circuit 20, and the primary antenna 15, and reception signals in Band 66 and Band 25 are received by the RFIC 3 through the primary antenna 15, the switch circuit 20, the switch circuit 71, and the first multiplexer.

Note that in the above-described connection form, the case of one-uplink two-downlink by passing through the output terminal 3a and the primary antenna 15 has been described as an example, but one-uplink two-downlink by passing through the output terminal 3b and the secondary antenna 16 is also possible.

Alternatively, in the mode 2, one-uplink of Band 25 and two-downlink of Band 66 and Band 25 (mode 2: one-uplink two-downlink) can be performed. That is, by the control unit, the terminal 20b and the terminal 20c are connected to each other in the switch circuit 20 (fifth connection state). Furthermore, the terminal 50a and the terminal 50d are connected to each other in the switch circuit 50.

Furthermore, by the control unit, the common terminal 64a and the selection terminal 64c are connected to each other in the switch circuit 64.

In this connection state, in the mode 2, a transmission signal in Band 25 is transmitted through the output terminal 3a, the switch circuit 50, the transmission amplifier 46, the switch circuit 64, the second multiplexer, the switch circuit 72, the switch circuit 20, and the primary antenna 15, and reception signals in Band 66 and Band 25 are received by the RFIC 3 through the primary antenna 15, the switch circuit 20, the switch circuit 72, and the second multiplexer.

Note that in both the above-described two types of connection forms, the case of one-uplink two-downlink by passing through the output terminal 3a and the primary antenna 15 has been described as an example, but one-uplink two-downlink by passing through the output terminal 3b and the secondary antenna 16 is also possible.

Furthermore, although not illustrated in FIG. 12C, a circuit connection state in a case of one-uplink of Band 3 and two-downlink of Band 1 and Band 3 (mode 2: one-uplink two-downlink) is as follows.

That is, by the control unit, the terminal 20a and the terminal 20c are connected to each other in the switch circuit 20 (third connection state). Furthermore, the terminal 50a and the terminal 50c are connected to each other in the switch circuit 50.

Furthermore, by the control unit, the common terminal 63a and the selection terminal 63d are connected to each other in the switch circuit 63.

In this connection state, in the mode 2, a transmission signal in Band 3 is transmitted through the output terminal 3a, the switch circuit 50, the transmission amplifier 45, the switch circuit 63, the first multiplexer, the switch circuit 71, the switch circuit 20, and the primary antenna 15, and reception signals in Band 1 and Band 3 are received by the RFIC 3 through the primary antenna 15, the switch circuit 20, the switch circuit 71, and the first multiplexer.

Alternatively, in the mode 2, one-uplink of Band 1 and two-downlink of Band 1 and Band 3 (mode 2: one-uplink two-downlink) can be performed. That is, by the control unit, the terminal 20b and the terminal 20c are connected to each other in the switch circuit 20 (fifth connection state). Furthermore, the terminal 50a and the terminal 50d are connected to each other in the switch circuit 50.

Furthermore, by the control unit, the common terminal 64a and the selection terminal 64d are connected to each other in the switch circuit 64.

In this connection state, in the mode 2, a transmission signal in Band 1 is transmitted through the output terminal 3a, the switch circuit 50, the transmission amplifier 46, the switch circuit 64, the second multiplexer, the switch circuit 72, the switch circuit 20, and the primary antenna 15, and reception signals in Band 1 and Band 3 are received by the RFIC 3 through the primary antenna 15, the switch circuit 20, the switch circuit 72, and the second multiplexer.

Note that in both the above-described two types of connection forms, the case of one-uplink two-downlink by passing through the output terminal 3a and the primary antenna 15 has been described as an example, but one-uplink two-downlink by passing through the output terminal 3b and the secondary antenna 16 is also possible.

3.3 Comparison of High-Frequency Front End Modules According to Embodiment 3 and Comparative Example 3

Figure 13:
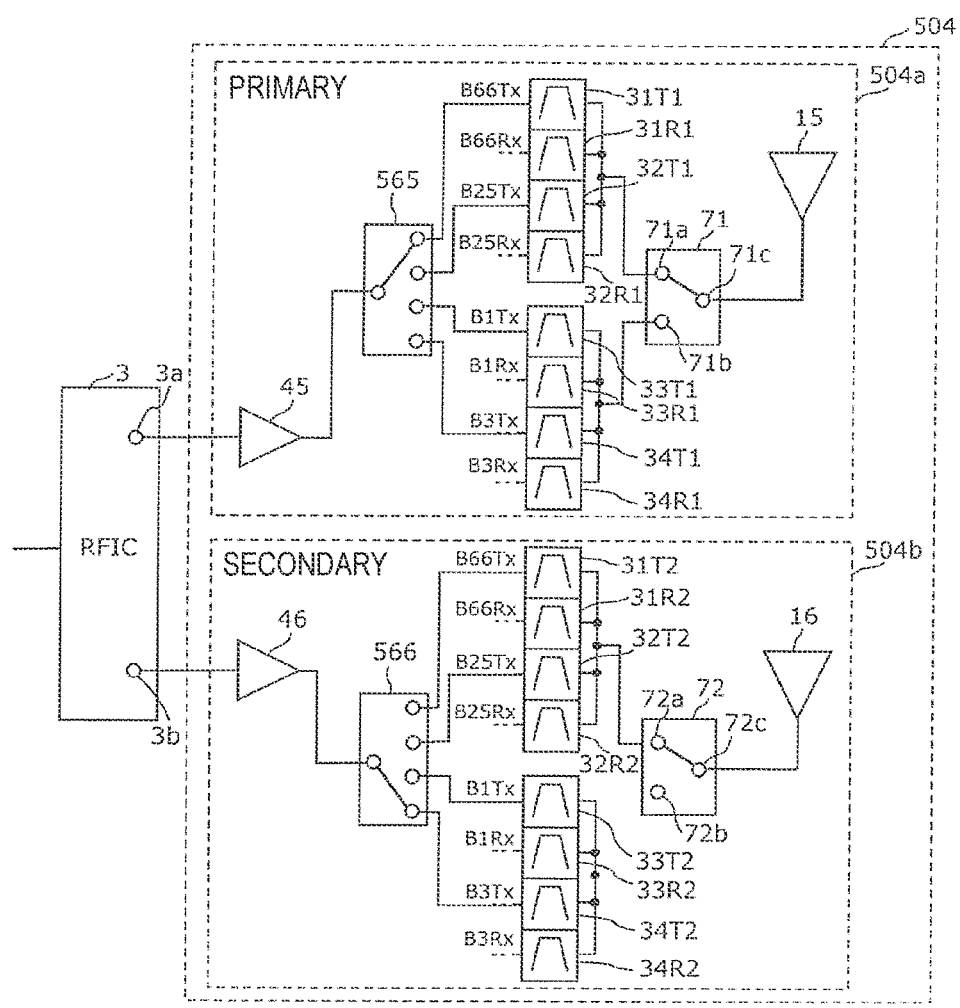
FIG. 13 is a circuit configuration diagram of a high-frequency front end module according to Comparative Example 3.

FIG. 13 is a circuit configuration diagram of a high-frequency front end module 504 according to Comparative Example 3. Note that the diagram also illustrates the RFIC 3 connected to the high-frequency front end module 504 according to Comparative Example 3. As illustrated in the diagram, the high-frequency front end module 504 includes a primary circuit 504a and a secondary circuit 504b. The primary circuit 504a includes the primary antenna 15, switch circuits 565 and 71, the transmission filters 31T1, 32T1, 33T1, and 34T1, the reception filters 31R1, 32R1, 33R1, and 34R1, and the transmission amplifier 45. The transmission filters 31T1, 32T1, 33T1, and 34T1 and the reception filters 31R1, 32R1, 33R1, and 34R1 constitute a first multiplexer. The secondary circuit 504b includes the secondary antenna 16, switch circuits 566 and 72, transmission filters 31T2, 32T2, 33T2, and 34T2, the reception filters 31R2, 32R2, 33R2, and 34R2, and the transmission amplifier 46. The transmission filters 31T2, 32T2, 33T2, and 34T2 and the reception filters 31R2, 32R2, 33R2, and 34R2 constitute a second multiplexer. The high-frequency front end module 504 according to Comparative Example 3 is different from the high-frequency front end module 2E according to Embodiment 3 in the configurations of the first multiplexer, the second multiplexer, and the switch circuit. Hereinafter, the high-frequency front end module 504 according to Comparative Example 3 will be described focusing on the differences from the high-frequency front end module 2E according to Embodiment 3.

The switch circuit 565 is an SP4T (Single Pole 4 Throw) type switch circuit having a common terminal and four selection terminals. The common terminal is connected to the output terminal of the transmission amplifier 45. The switch circuit 566 is an SP4T type switch circuit having a common terminal and four selection terminals. The common terminal is connected to the output terminal of the transmission amplifier 46.

The switch circuit 71 is an SPDT type switch circuit having the common terminal 71c and the selection terminals 71a and 71b. The common terminal 71c is connected to the primary antenna 15. The switch circuit 72 is an SPDT type switch circuit having the common terminal 72c and the selection terminals 72a and 72b. The common terminal 72c is connected to the secondary antenna 16.

The transmission filter 31T1 is a transmission filter whose input terminal is connected to the selection terminal of the switch circuit 565, whose output terminal is connected to the selection terminal 71a, and which takes B66-Tx as a pass band. The transmission filter 32T1 is a transmission filter whose input terminal is connected to the selection terminal of the switch circuit 565, whose output terminal is connected to the selection terminal 71a, and which takes B25-Tx as a pass band. The transmission filter 33T1 is a transmission filter whose input terminal is connected to the selection terminal of the switch circuit 565, whose output terminal is connected to the selection terminal 71b, and which takes B1-Tx as a pass band. The transmission filter 34T1 is a transmission filter whose input terminal is connected to the selection terminal of the switch circuit 565, whose output terminal is connected to the selection terminal 71b, and which takes B3-Tx as a pass band.

The reception filter 31R1 is a reception filter whose input terminal is connected to the selection terminal 71a, and which takes B66-Rx as a pass band. The reception filter 32R1 is a reception filter whose input terminal is connected to the selection terminal 71a, and which takes B25-Rx as a pass band. The reception filter 33R1 is a reception filter whose input terminal is connected to the selection terminal 71b, and which takes B1-Rx as a pass band. The reception filter 34R1 is a reception filter whose input terminal is connected to the selection terminal 71b, and which takes B3-Rx as a pass band.

The transmission filter 31T2 is a transmission filter whose input terminal is connected to the selection terminal of the switch circuit 566, whose output terminal is connected to the selection terminal 72a, and which takes B66-Tx as a pass band. The transmission filter 32T2 is a transmission filter whose input terminal is connected to the selection terminal of the switch circuit 566, whose output terminal is connected to the selection terminal 72a, and which takes B25-Tx as a pass band. The transmission filter 33T2 is a transmission filter whose input terminal is connected to the selection terminal of the switch circuit 566, whose output terminal is connected to the selection terminal 72b, and which takes B1-Tx as a pass band. The transmission filter 34T2 is a transmission filter whose input terminal is connected to the selection terminal of the switch circuit 566, whose output terminal is connected to the selection terminal 72b, and which takes B3-Tx as a pass band.

The reception filter 31R2 is a reception filter whose input terminal is connected to the selection terminal 72a, and which takes B66-Rx as a pass band. The reception filter 32R2 is a reception filter whose input terminal is connected to the selection terminal 72a, and which takes B25-Rx as a pass band. The reception filter 33R2 is a reception filter whose input terminal is connected to the selection terminal 72b, and which takes B1-Rx as a pass band. The reception filter 34R2 is a reception filter whose input terminal is connected to the selection terminal 72b, and which takes B3-Rx as a pass band.

According to the configuration described above, the high-frequency front end module 504 can execute (1) two-uplink in which a transmission signal in B66-Tx included in Band 66 and a transmission signal in B25-Tx included in Band 25 are simultaneously transmitted, (2) two-downlink in which a reception signal in B66-Rx included in Band 66 and a reception signal in B25-Rx included in Band 25 are simultaneously received, (3) two-uplink in which a transmission signal in B1-Tx included in Band 1 and a transmission signal in B3-Tx included in Band 3 are simultaneously transmitted, and (4) two-downlink in which a reception signal in B1-Rx included in Band 1 and a reception signal in B3-Rx included in Band 3 are simultaneously received.

In the high-frequency front end module 504 according to Comparative Example 3, in order to ensure signal quality such as isolation and the like of high-frequency signals in Band 66 and Band 25 simultaneously transmitted/received, and signal quality such as isolation and the like of high-frequency signals in Band 1 and Band 3 simultaneously transmitted/received, two antenna elements, such as the primary antenna 15 which is preferentially used and the secondary antenna 16 which is secondarily used, are disposed. In this case, because of necessity of making it possible to transmit/receive each of the high-frequency signals in Band 66, Band 25, Band 1, and Band 3 even by any of the antennas, transmission paths and reception paths of all bands are connected to the primary antenna 15, and transmission paths and reception paths of all bands are connected and disposed also to the secondary antenna 16. A filter for selectively allowing a desired frequency band to pass therethrough is arranged in each signal path, and in the configuration of the high-frequency front end module 504 according to Comparative Example 3, it is necessary to connect eight filters to the primary antenna 15, and to similarly connect eight filters to the secondary antenna 16. That is, in the front end module to which the primary antenna 15 and the secondary antenna 16 are applied, in order to achieve two-uplink two-downlink of two arbitrary frequency bands among Band 66, Band 25, Band 1, and Band 3, a total of 16 filters are required, and the circuit is enlarged.

In contrast, according to the high-frequency front end module 2E according to the present embodiment, it is possible to arbitrarily distribute high-frequency signals in Band 66, Band 25, Band 1, and Band 3 to the primary antenna 15 and the secondary antenna 16 by switching the connection state of the switch circuit 20, and execute CA of two-uplink two-downlink. Therefore, in the first multiplexer connected to one of the antennas, for example, the transmission filter of Band 25 and the transmission filter of Band 1 can be reduced. In the same manner, in the second multiplexer connected to the other of the antennas, for example, the transmission filter of Band 66 and the transmission filter of Band 3 can be reduced. That is, four or more filters can be reduced as compared with the configuration of the high-frequency front end module 504 according to Comparative Example 3.

In the configuration of the high-frequency front end module 2E according to the present embodiment, in comparison with the high-frequency front end module 504 according to Comparative Example 3, the one switch circuit 20 of the two-input two-output type is added, but the switch circuit 20 is sufficiently smaller than the transmission filter and the reception filter. Accordingly, it is possible to provide the high-frequency front end module 2E which is reduced in size and in which CA of two-uplink two-downlink can be performed.

3.4 Configurations of High-Frequency Front End Module 2F and Communication Device 1F According to Modification 1

Figure 14:
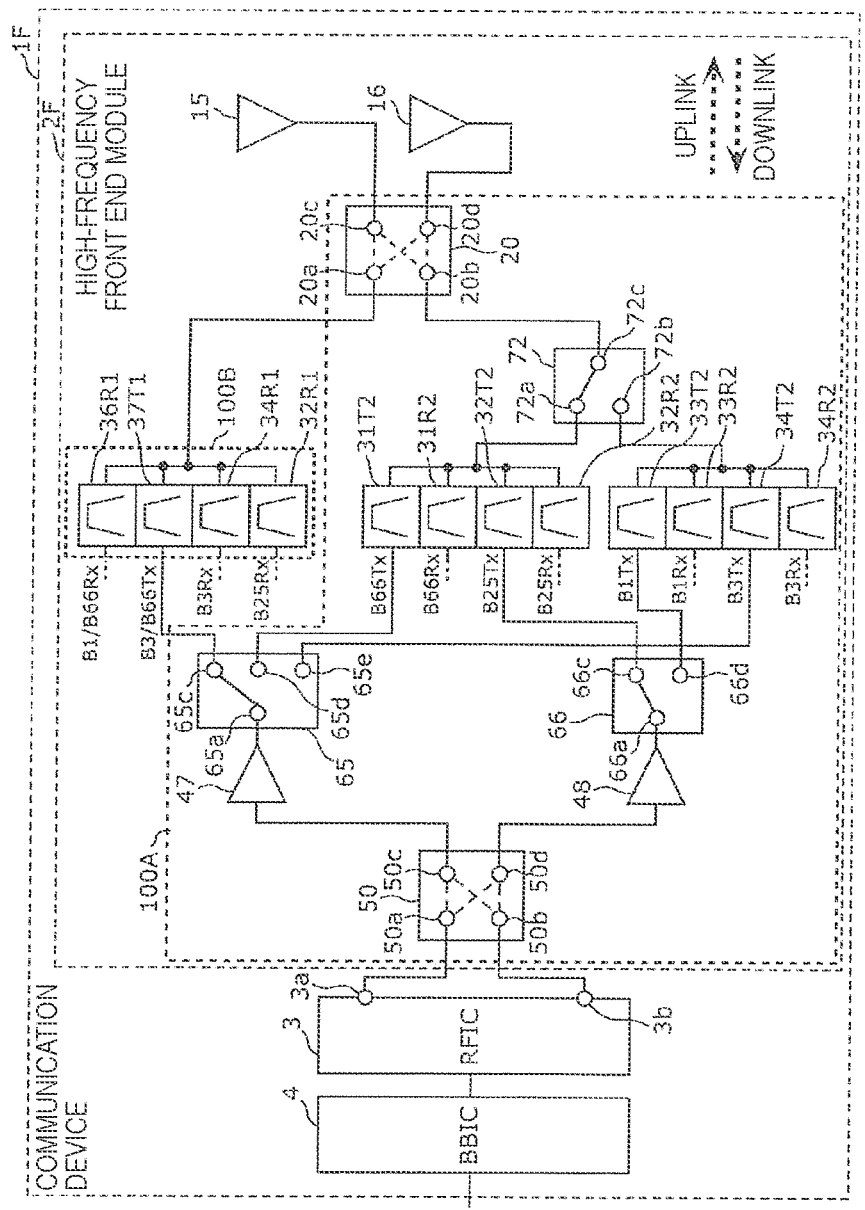
FIG. 14 is a circuit configuration diagram of a communication device according to Modification 1 of Embodiment 3.

FIG. 14 is a circuit configuration diagram of a communication device 1F according to Modification 1 of Embodiment 3. As illustrated in the diagram, the communication device 1F includes a high-frequency front end module 2F, the RFIC 3, and the BBIC 4. The communication device 1F according to the present modification differs from the communication device 1E according to Embodiment 3 in the configuration of the high-frequency front end module. Hereinafter, the communication device 1F according to the present modification will be described focusing on the differences from the communication device 1E according to Embodiment 3.

As illustrated in FIG. 14, the high-frequency front end module 2F includes the primary antenna 15 and the secondary antenna 16, switch circuits 20, 50, 65, 66, and 72, transmission filters 37T1, 31T2, 32T2, 33T2, and 34T2, reception filters 36R1, 34R1, 32R1, 31R2, 32R2, 33R2, and 34R2, and transmission amplifiers 47 and 48.

Note that in the communication device 1F according to the present modification, in frequency band allocation, a relationship in which the transmission band of Band 3 includes the transmission band of Band 66 is established, and a relationship in which the reception band of Band 66 includes the reception band of Band 1 is established. In the four frequency bands, there is no other overlapping and inclusion relationship.

According to the configuration described above, the high-frequency front end module 2F can execute (1) two-uplink in which a transmission signal in B66-Tx included in Band 66 and a transmission signal in B25-Tx included in Band 25 are simultaneously transmitted, (2) two-downlink in which a reception signal in B66-Rx included in Band 66 and a reception signal in B25-Rx included in Band 25 are simultaneously received, (3) two-uplink in which a transmission signal in B1-Tx included in Band 1 and a transmission signal in B3-Tx included in Band 3 are simultaneously transmitted, and (4) two-downlink in which a reception signal in B1-Rx included in Band 1 and a reception signal in B3-Rx included in Band 3 are simultaneously received. Note that two-uplink of Band 66 and Band 3 is not executed, and two-uplink of Band 66 and Band 1 is not executed.

The high-frequency front end module 2F according to the present modification is different from the high-frequency front end module 2E according to Embodiment 3 in the configurations of the first multiplexer, the second multiplexer, and the switch circuit. Hereinafter, the high-frequency front end module 2F according to the present modification will be described focusing on the differences from the high-frequency front end module 2E according to Embodiment 3.

The switch circuit 65 is an SP3T type switch circuit having a common terminal 65a and selection terminals 65c, 65d, and 65e. The common terminal 65a is connected to an output terminal of the transmission amplifier 47. The switch circuit 66 is an SPDT type switch circuit having a common terminal 66a and selection terminals 66c and 66d. The common terminal 66a is connected to an output terminal of the transmission amplifier 48.

The switch circuit 72 is an SPDT type switch circuit having the common terminal 72c and the selection terminals 72a and 72b. The common terminal 72c is connected to the terminal 20b of the switch circuit 20.

The transmission filter 37T1 is a first transmission filter whose input terminal is connected to the selection terminal 65c, whose output terminal is connected to the terminal 20a, and which takes, as a pass band, B3-Tx which includes B66-Tx.

The reception filter 36R1 is a first reception filter whose input terminal is connected to the terminal 20a, and which takes, as a pass band, B66-Rx which includes B1-Rx.

The reception filter 34R1 is a seventh reception filter whose input terminal is connected to the terminal 20a, and which takes B3-Rx as a pass band.

The reception filter 32R1 is a fourth reception filter whose input terminal is connected to the terminal 20a, and which takes B25-Rx as a pass band.

The transmission filter 31T2 is a transmission filter whose input terminal is connected to the selection terminal 65d, whose output terminal is connected to the selection terminal 72a, and which takes B66-Tx as a pass band.

The transmission filter 32T2 is a second transmission filter whose input terminal is connected to the selection terminal 66c, whose output terminal is connected to the selection terminal 72a, and which takes B25-Tx as a pass band.

The transmission filter 33T2 is a sixth transmission filter whose input terminal is connected to the selection terminal 66d, whose output terminal is connected to the selection terminal 72b, and which takes B1-Tx as a pass band.

The transmission filter 34T2 is an eighth transmission filter whose input terminal is connected to the selection terminal 65e, whose output terminal is connected to the selection terminal 72b, and which takes B3-Tx as a pass band.

The reception filter 31R2 is a third reception filter whose input terminal is connected to the selection terminal 72a, and which takes B66-Rx as a pass band.

The reception filter 32R2 is a second reception filter whose input terminal is connected to the selection terminal 72a, and which takes B25-Rx as a pass band.

The reception filter 33R2 is a sixth reception filter whose input terminal is connected to the selection terminal 72b, and which takes B1-Rx as a pass band.

The reception filter 34R2 is an eighth reception filter whose input terminal is connected to the selection terminal 72b, and which takes B3-Rx as a pass band.

The transmission filters 37T1 and 31T2 and the reception filters 36R1, 34R1, and 32R1 constitute a first multiplexer that can selectively transmit high-frequency signals in Band 3 and Band 66 and receive high-frequency signals in Band 66, Band 25, Band 1, and Band 3. Note that the first multiplexer does not have a transmission filter which takes B25-Tx as a pass band and a transmission filter which takes B1-Tx as a pass band. Furthermore, a transmission filter which takes B3-Tx as a pass band and a transmission filter which takes B66-Tx as a pass band are made as one transmission filter, and a reception filter which takes B1-Rx as a pass band and a reception filter which takes B66-Rx as a pass band are made as one reception filter.

The transmission filters 32T2, 33T2, and 34T2 and the reception filters 31R2, 32R2, 33R2, and 34R2 constitute a second multiplexer that can selectively transmit high-frequency signals in Band 25, Band 1, and Band 3 and receive high-frequency signals in Band 66, Band 25, Band 1, and Band 3. Note that the transmission filters 31T2 and 32T2 and the reception filters 31R2 and 32R2 constitute a first quadplexer of Band 66 and Band 25, and the transmission filters 33T2 and 34T2 and the reception filters 33R2 and 34R2 constitute a second quadplexer of Band 1 and Band 3.

According to the configuration described above, the high-frequency front end module 2F can execute (1) two-uplink in which a transmission signal in the first transmission band (B66-Tx) included in the first frequency band (Band 66) and a transmission signal in the second transmission band (B25-Tx) included in the second frequency band (Band 25) are simultaneously transmitted, (2) two-downlink in which a reception signal in the first reception band (B66-Rx) included in the first frequency band (Band 66) and a reception signal in the second reception band (B25-Rx) included in the second frequency band (Band 25) are simultaneously received, (3) two-uplink in which a transmission signal in B1-Tx included in Band 1 and a transmission signal in B3-Tx included in Band 3 are simultaneously transmitted, and (4) two-downlink in which a reception signal in B1-Rx included in Band 1 and a reception signal in B3-Rx included in Band 3 are simultaneously received.

The high-frequency front end module 2F described above includes the primary antenna 15 and the secondary antenna 16, the switch circuits 20, 65, 66, and 72, the first multiplexer, and the second multiplexer described above, thereby making it possible to arbitrarily distribute high-frequency signals in Band 66, Band 25, Band 1, and Band 3 to the primary antenna 15 and the secondary antenna 16 by switching the connection state of the switch circuits 20, 65, 66, and 72, and execute two-uplink two-downlink of Band 66 and Band 25, and two-uplink two-downlink of Band 1 and Band 3. Here, the first multiplexer does not have a transmission filter of Band 25 and a transmission filter of Band 1. Furthermore, instead of individually having the transmission filter of Band 66, the transmission filter of Band 3 and the transmission filter of Band 66 are made as one transmission filter, and the reception filter of Band 1 and the reception filter of Band 66 are made as one reception filter. Furthermore, the second multiplexer does not have a transmission filter of Band 66. Therefore, four filters can be reduced as compared with the configuration of the high-frequency front end module 504 according to Comparative Example 3. Accordingly, in comparison with the high-frequency front end module 504 according to Comparative Example 3, it is possible to provide the high-frequency front end module 2F which is reduced in size and in which CA of two-uplink two-downlink in four bands including three bands in the overlapping relationship can be performed.

Note that in the high-frequency front end module 2F according to the present modification, the first quadplexer and the second quadplexer, the switch circuits 65, 66, 72, 20, and 50, and the transmission amplifiers 47 and 48 constitute a front end module 100A supporting multi-band of Band 66, Band 25, Band 1, and Band 3. The front end module 100A is a basic circuit capable of selecting one band among the above-described four bands by switching the switch circuits 65, 66, and 72.

The high-frequency front end module 2F according to the present modification is capable of supporting two-uplink two-downlink of Band 66 and Band 25 and two-uplink two-downlink of Band 1 and Band 3 by adding a multiplexer 100B constituted by the transmission filter 37T1 and the reception filters 36R1, 34R1, and 32R1 to the basic front end module 100A described above.

3.5 Connection State of High-Frequency Front End Module 2F According to Modification 1

Figure 15A:
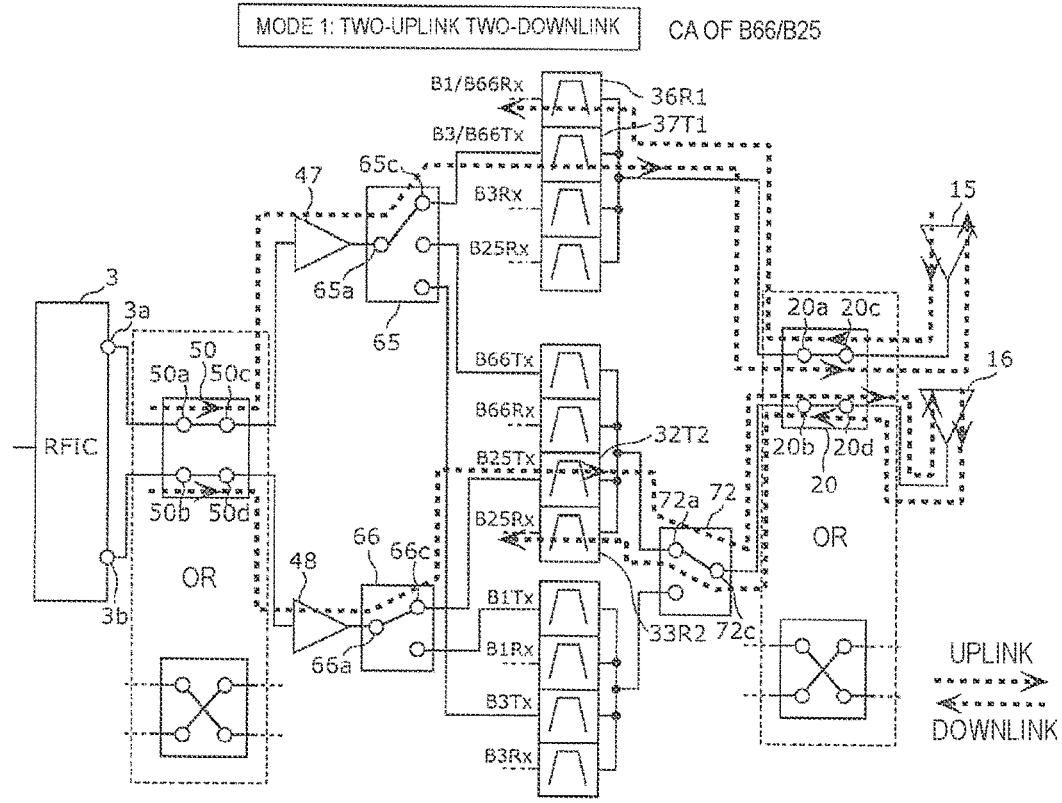
FIG. 15A is a circuit state diagram in a case of two-uplink (B66/B25) two-downlink of a high-frequency front end module according to Modification 1 of Embodiment 3.

FIG. 15A is a circuit state diagram in a case of two-uplink two-downlink of the high-frequency front end module 2F according to Modification 1 of Embodiment 3. This diagram illustrates a circuit connection state in a case of two-uplink of Band 66 and Band 25 and two-downlink of Band 66 and Band 25 (mode 1: two-uplink two-downlink).

In the mode 1, as illustrated in FIG. 15A, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

Furthermore, by the control unit, the common terminal 65a and the selection terminal 65c are connected to each other in the switch circuit 65, the common terminal 66a and the selection terminal 66c are connected to each other in the switch circuit 66, and the common terminal 72c and the selection terminal 72a are connected to each other in the switch circuit 72.

In this connection state, in the mode 1, a transmission signal in Band 66 is transmitted through the output terminal 3a, the switch circuit 50, the transmission amplifier 47, the switch circuit 65, the first multiplexer, the switch circuit 20, and the primary antenna 15, and a transmission signal in Band 25 is transmitted through the output terminal 3b, the switch circuit 50, the transmission amplifier 48, the switch circuit 66, the second multiplexer, the switch circuit 72, the switch circuit 20, and the secondary antenna 16. Furthermore, a reception signal in Band 66 is received by the RFIC 3 through the primary antenna 15, the switch circuit 20, and the first multiplexer, and a reception signal in Band 25 is received by the RFIC 3 through the secondary antenna 16, the switch circuit 20, the switch circuit 72, and the second multiplexer.

Alternatively, in the mode 1, as illustrated in FIG. 15A, by the control unit, the terminal 20a and the terminal 20d are connected to each other, and the terminal 20b and the terminal 20c are connected to each other, in the switch circuit 20 (second connection state). Furthermore, the terminal 50a and the terminal 50d are connected to each other, and the terminal 50b and the terminal 50c are connected to each other, in the switch circuit 50.

Furthermore, by the control unit, the common terminal 65a and the selection terminal 65c are connected to each other in the switch circuit 65, the common terminal 66a and the selection terminal 66c are connected to each other in the switch circuit 66, and the common terminal 72c and the selection terminal 72a are connected to each other in the switch circuit 72.

In this connection state, in the mode 1, a transmission signal in Band 25 is transmitted through the output terminal 3a, the switch circuit 50, the transmission amplifier 48, the switch circuit 66, the second multiplexer, the switch circuit 72, the switch circuit 20, and the primary antenna 15, and a transmission signal in Band 66 is transmitted through the output terminal 3b, the switch circuit 50, the transmission amplifier 47, the switch circuit 65, the first multiplexer, the switch circuit 20, and the secondary antenna 16. Furthermore, a reception signal in Band 25 is received by the RFIC 3 through the primary antenna 15, the switch circuit 20, the switch circuit 72, and the second multiplexer, and a reception signal in Band 66 is received by the RFIC 3 through the secondary antenna 16, the switch circuit 20, and the first multiplexer.

Figure 15B:
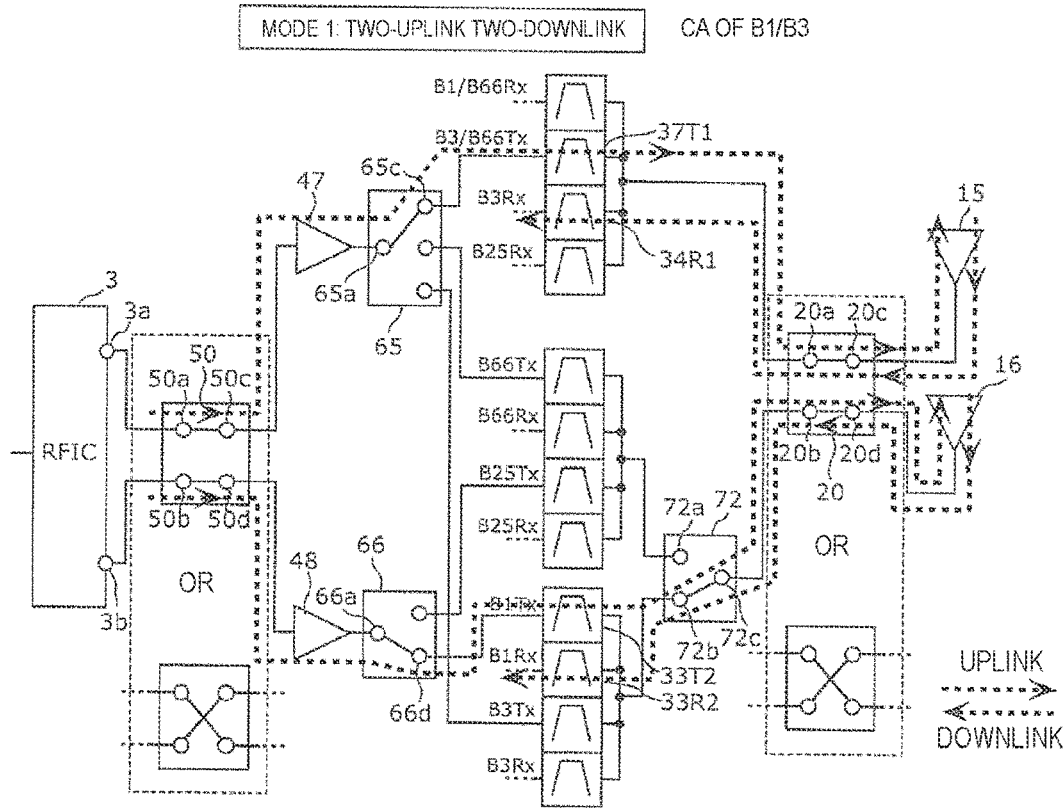
FIG. 15B is a circuit state diagram in a case of two-uplink (B1/B3) two-downlink of the high-frequency front end module according to Modification 1 of Embodiment 3.

FIG. 15B is a circuit state diagram in a case of two-uplink two-downlink of the high-frequency front end module 2F according to Modification 1 of Embodiment 3. This diagram illustrates a circuit connection state in a case of two-uplink of Band 1 and Band 3 and two-downlink of Band 1 and Band 3 (mode 1: two-uplink two-downlink).

In the mode 1, as illustrated in FIG. 15B, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

Furthermore, by the control unit, the common terminal 65a and the selection terminal 65c are connected to each other in the switch circuit 65, the common terminal 66a and the selection terminal 66d are connected to each other in the switch circuit 66, and the common terminal 72c and the selection terminal 72b are connected to each other in the switch circuit 72.

In this connection state, in the mode 1, a transmission signal in Band 3 is transmitted through the output terminal 3a, the switch circuit 50, the transmission amplifier 47, the switch circuit 65, the first multiplexer, the switch circuit 20, and the primary antenna 15, and a transmission signal in Band 1 is transmitted through the output terminal 3b, the switch circuit 50, the transmission amplifier 48, the switch circuit 66, the second multiplexer, the switch circuit 72, the switch circuit 20, and the secondary antenna 16. Furthermore, a reception signal in Band 3 is received by the RFIC 3 through the primary antenna 15, the switch circuit 20, and the first multiplexer, and a reception signal in Band 1 is received by the RFIC 3 through the secondary antenna 16, the switch circuit 20, the switch circuit 72, and the second multiplexer.

Alternatively, in the mode 1, as illustrated in FIG. 15B, by the control unit, the terminal 20a and the terminal 20d are connected to each other, and the terminal 20b and the terminal 20c are connected to each other, in the switch circuit 20 (second connection state). Furthermore, the terminal 50a and the terminal 50d are connected to each other, and the terminal 50b and the terminal 50c are connected to each other, in the switch circuit 50.

Furthermore, by the control unit, the common terminal 65a and the selection terminal 65c are connected to each other in the switch circuit 65, the common terminal 66a and the selection terminal 66d are connected to each other in the switch circuit 66, and the common terminal 72c and the selection terminal 72b are connected to each other in the switch circuit 72.

In this connection state, in the mode 1, a transmission signal in Band 1 is transmitted through the output terminal 3a, the switch circuit 50, the transmission amplifier 48, the switch circuit 66, the second multiplexer, the switch circuit 72, the switch circuit 20, and the primary antenna 15, and a transmission signal in Band 3 is transmitted through the output terminal 3b, the switch circuit 50, the transmission amplifier 47, the switch circuit 65, the first multiplexer, the switch circuit 20, and the secondary antenna 16. Furthermore, a reception signal in Band 1 is received by the RFIC 3 through the primary antenna 15, the switch circuit 20, the switch circuit 72, and the second multiplexer, and a reception signal in Band 3 is received by the RFIC 3 through the secondary antenna 16, the switch circuit 20, and the first multiplexer.

That is, in the high-frequency front end module 2F according to Modification 1, in addition to the fact that (1) two-uplink two-downlink of a high-frequency signal in the first frequency band (Band 66) and a high-frequency signal in the second frequency band (Band 25) can be executed, it is possible to execute two-uplink two-downlink of a high-frequency signal in Band 1 and a high-frequency signal in Band 3.

Furthermore, the high-frequency front end module 2F according to the present modification is applied also to the one-uplink two-downlink, in the same manner as the high-frequency front end module 2E according to Embodiment 3. That is, by switching the switch circuits 20, 50, 65, 66, and 72, it is possible to achieve (1) one-uplink of Band 66 and two-downlink of Band 66 and Band 25, (2) one-uplink of Band 25 and two-downlink of Band 66 and Band 25, (3) one-uplink of Band 1 and two-downlink of Band 1 and Band 3, and (4) one-uplink of Band 3 and two-downlink of Band 1 and Band (mode 2: one-uplink two-downlink).

3.6 Configurations of High-Frequency Front End Module 2G and Communication Device 1G According to Modification 2

Figure 16:
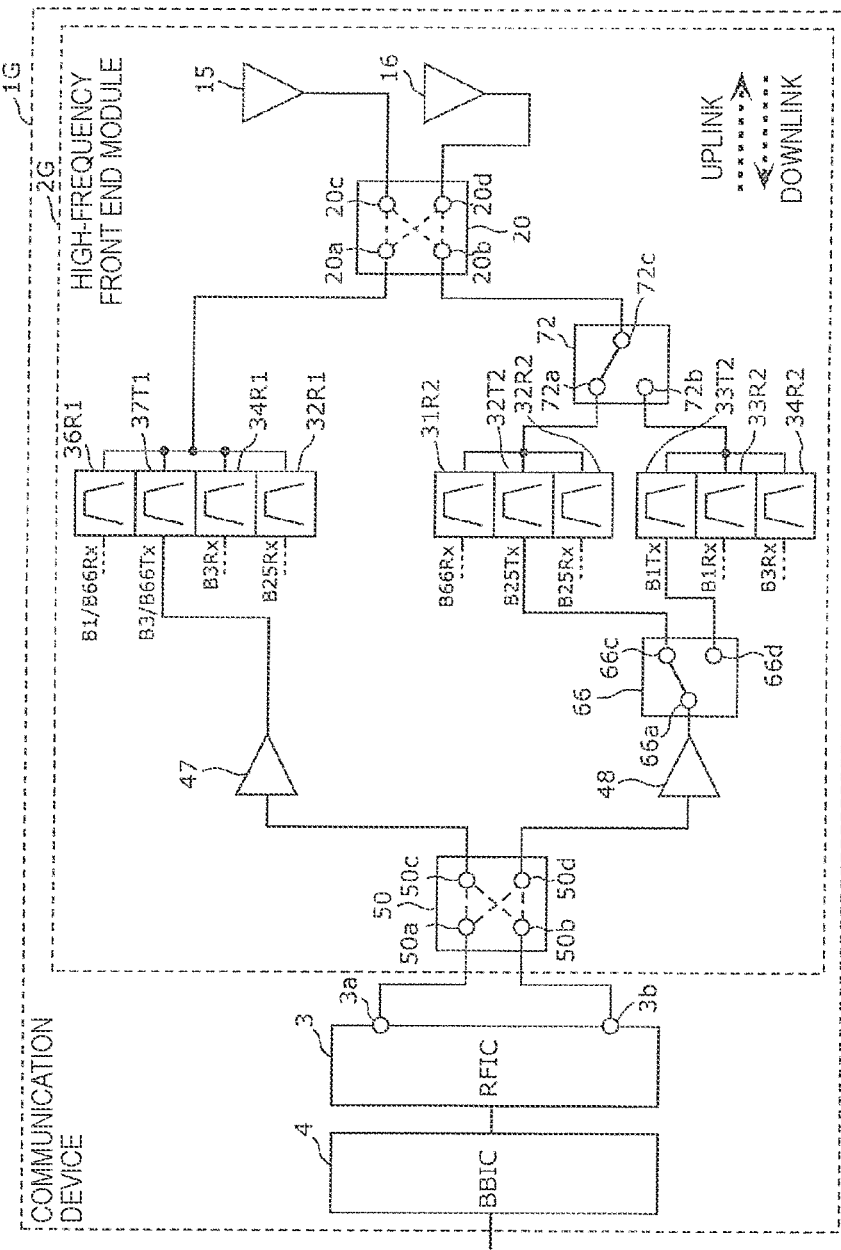
FIG. 16 is a circuit configuration diagram of a high-frequency front end module according to Modification 2 of Embodiment 3.

FIG. 16 is a circuit configuration diagram of a communication device 1G according to Modification 2 of Embodiment 3. As illustrated in the diagram, the communication device 1G includes a high-frequency front end module 2G, the RFIC 3, and the BBIC 4. The communication device 1G according to the present modification differs from the communication device 1F according to Modification 1 of Embodiment 3 in the configuration of the high-frequency front end module. Hereinafter, the communication device 1G according to the present modification will be described focusing on the differences from the communication device 1F according to Modification 1 of Embodiment 3.

As illustrated in FIG. 16, the high-frequency front end module 2G includes the primary antenna 15 and the secondary antenna 16, the switch circuits 20, 50, 66, and 72, the transmission filters 37T1, 32T2, and 33T2, the reception filters 36R1, 34R1, 32R1, 31R2, 32R2, 33R2, and 34R2, and the transmission amplifiers 47 and 48.

Note that in the communication device 1G according to the present modification, in frequency band allocation, a relationship in which the transmission band of Band 3 includes the transmission band of Band 66 is established, and a relationship in which the reception band of Band 66 includes the reception band of Band 1 is established. In the four frequency bands, there is no other overlapping and inclusion relationship.

According to the configuration described above, the high-frequency front end module 2G can execute (1) two-uplink in which a transmission signal in the first transmission band (B66-Tx) included in the first frequency band (Band 66) and a transmission signal in the second transmission band (B25-Tx) included in the second frequency band (Band 25) are simultaneously transmitted, and (2) two-downlink in which a reception signal in the first reception band (B66-Rx) included in the first frequency band (Band 66) and a reception signal in the second reception band (B25-Rx) included in the second frequency band (Band 25) are simultaneously received. Furthermore, Band 1 may be taken as the first frequency band, and Band 3 may be taken as the second frequency band, it is possible to execute (3) two-uplink in which a transmission signal in the first transmission band (B1-Tx) included in the first frequency band (Band 1) and a transmission signal in the second transmission band (B3-Tx) included in the second frequency band (Band 3) are simultaneously transmitted, and (4) two-downlink in which a reception signal in the first reception band (B1-Rx) included in the first frequency band (Band 1) and a reception signal in the second reception band (B3-Rx) included in the second frequency band (Band 3) are simultaneously received. Note that two-uplink of Band 66 and Band 3 is not executed, and two-downlink of Band 66 and Band 1 is not executed.

The high-frequency front end module 2G according to the present modification is different from the high-frequency front end module 2F according to Modification 1 of Embodiment 3 in the configuration of the second multiplexer and in a point that the switch circuit 65 is removed. Hereinafter, the high-frequency front end module 2G according to the present modification will be described focusing on the differences from the high-frequency front end module 2F according to Modification 1 of Embodiment 3.

The transmission filter 37T1 is a transmission filter whose input terminal is connected to the transmission amplifier 47, whose output terminal is connected to the terminal 20a, and which takes, as a pass band, B3-Tx which includes B66-Tx.

The transmission filter 37T1 and the reception filters 36R1, 34R1, and 32R1 constitute a first multiplexer that can selectively transmit high-frequency signals in Band 3 and Band 66 and receive high-frequency signals in Band 66, Band 25, Band 1, and Band 3. Note that the first multiplexer does not have a transmission filter which takes B25-Tx as a pass band and a transmission filter which takes B1-Tx as a pass band. Furthermore, a transmission filter which takes B3-Tx as a pass band and a transmission filter which takes B66-Tx as a pass band are made as one transmission filter, and a reception filter which takes B1-Rx as a pass band and a reception filter which takes B66-Rx as a pass band are made as one reception filter.

The transmission filters 32T2 and 33T2 and the reception filters 31R2, 32R2, 33R2, and 34R2 constitute a second multiplexer that can selectively transmit high-frequency signals in Band 1 and Band 25 and receive high-frequency signals in Band 66, Band 25, Band 1, and Band 3. Note that the second multiplexer does not have a transmission filter which takes B66-Tx as a pass band and a transmission filter which takes B3-Tx as a pass band.

Therefore, six filters can be reduced as compared with the configuration of the high-frequency front end module 504 according to Comparative Example 3.

The high-frequency front end module 2G according to the present modification has a configuration in which simplification and miniaturization of the circuit is prioritized without ensuring the basic function of the front end module 100A as compared with the high-frequency front end module 2F according to Modification 1. Accordingly, in comparison with the high-frequency front end module 504 according to Comparative Example 3 and the high-frequency front end module 2F according to Modification 1 of Embodiment 3, it is possible to provide the high-frequency front end module 2G which is reduced in size and in which CA of two-uplink two-downlink in four bands including three bands in an overlapping relationship can be performed.

3.7 Connection State of High-Frequency Front End Module 2G According to Modification 2

Figure 17A:
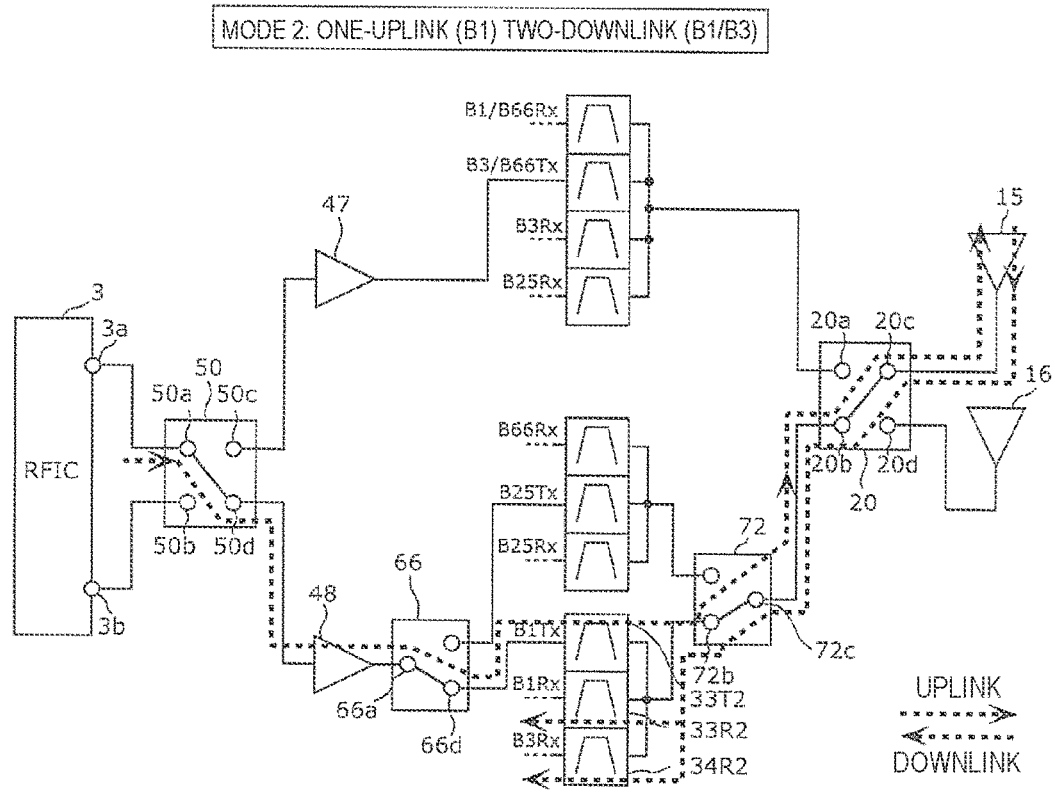
FIG. 17A is a circuit state diagram in a case of one-uplink (B1) two-downlink of the high-frequency front end module according to Modification 2 of Embodiment 3.

FIG. 17A is a circuit state diagram in a case of one-uplink two-downlink of the high-frequency front end module 2G according to Modification 2 of Embodiment 3. This diagram illustrates a circuit connection state in a case of one-uplink of Band 1 and two-downlink of Band 1 and Band 3 (mode 2: one-uplink two-downlink).

In the mode 2, as illustrated in FIG. 17A, by the control unit, the terminal 20b and the terminal 20c are connected to each other in the switch circuit 20 (fifth connection state). Furthermore, the terminal 50a and the terminal 50d are connected to each other in the switch circuit 50.

Furthermore, by the control unit, the common terminal 66a and the selection terminal 66d are connected to each other in the switch circuit 66, and the common terminal 72c and the selection terminal 72b are connected to each other in the switch circuit 72.

In this connection state, in the mode 2, a transmission signal in Band 1 is transmitted through the output terminal 3a, the switch circuit 50, the transmission amplifier 48, the switch circuit 66, the second multiplexer, the switch circuit 72, the switch circuit 20, and the primary antenna 15, and reception signals in Band 1 and Band 3 are received by the RFIC 3 through the primary antenna 15, the switch circuit 20, the switch circuit 72, and the second multiplexer.

Note that in the above-described connection form, the case of one-uplink two-downlink by passing through the output terminal 3a and the primary antenna 15 has been described as an example, but one-uplink two-downlink by passing through the output terminal 3b and the secondary antenna 16 is also possible.

Figure 17B:
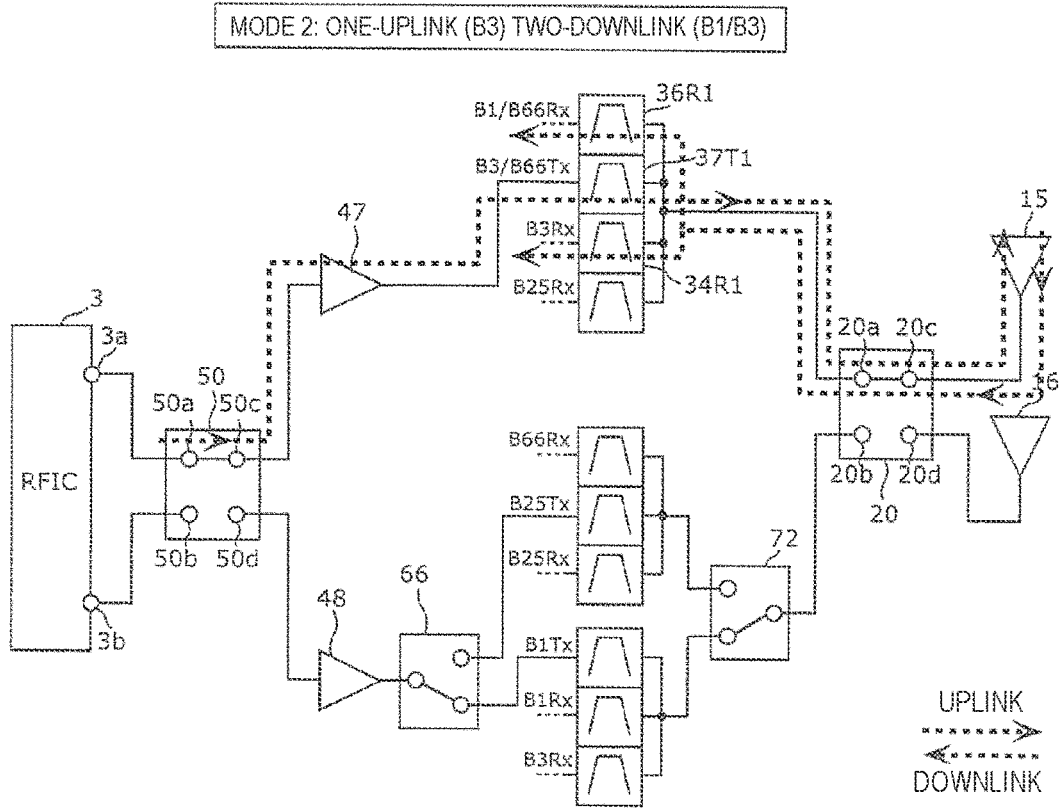
FIG. 17B is a circuit state diagram in a case of one-uplink (B3) two-downlink of the high-frequency front end module according to Modification 2 of Embodiment 3.

FIG. 17B is a circuit state diagram in a case of one-uplink two-downlink of the high-frequency front end module 2G according to Modification 2 of Embodiment 3. This diagram illustrates a circuit connection state in a case of one-uplink of Band 3 and two-downlink of Band 1 and Band 3 (mode 2: one-uplink two-downlink).

In the mode 2, as illustrated in FIG. 17B, by the control unit, the terminal 20a and the terminal 20c are connected to each other in the switch circuit 20 (third connection state). Furthermore, the terminal 50a and the terminal 50c are connected to each other in the switch circuit 50.

In this connection state, in the mode 2, a transmission signal in Band 3 is transmitted through the output terminal 3a, the switch circuit 50, the transmission amplifier 47, the first multiplexer, the switch circuit 20, and the primary antenna 15, and reception signals in Band 1 and Band 3 are received by the RFIC 3 through the primary antenna 15, the switch circuit 20, and the first multiplexer.

Note that in the above-described connection form, the case of one-uplink two-downlink by passing through the output terminal 3a and the primary antenna 15 has been described as an example, but one-uplink two-downlink by passing through the output terminal 3b and the secondary antenna 16 is also possible.

Figure 17C:
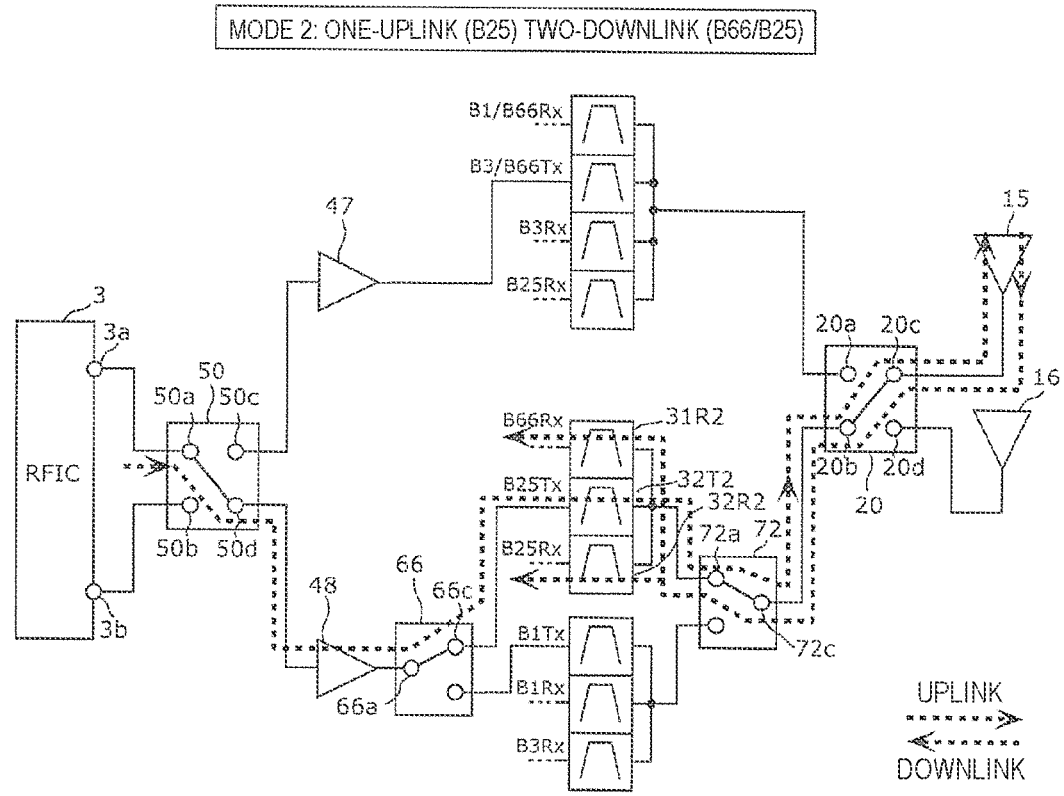
FIG. 17C is a circuit state diagram in a case of one-uplink (B25) two-downlink of the high-frequency front end module according to Modification 2 of Embodiment 3.

FIG. 17C is a circuit state diagram in a case of one-uplink two-downlink of the high-frequency front end module 2G according to Modification 2 of Embodiment 3. This diagram illustrates a circuit connection state in a case of one-uplink of Band 25 and two-downlink of Band 66 and Band 25 (mode 2: one-uplink two-downlink).

In the mode 2, as illustrated in FIG. 17C, by the control unit, the terminal 20b and the terminal 20c are connected to each other in the switch circuit 20 (fifth connection state). Furthermore, the terminal 50a and the terminal 50d are connected to each other in the switch circuit 50.

Furthermore, by the control unit, the common terminal 66a and the selection terminal 66c are connected to each other in the switch circuit 66, and the common terminal 72c and the selection terminal 72a are connected to each other in the switch circuit 72.

In this connection state, in the mode 2, a transmission signal in Band 25 is transmitted through the output terminal 3a, the switch circuit 50, the transmission amplifier 48, the switch circuit 66, the second multiplexer, the switch circuit 72, the switch circuit 20, and the primary antenna 15, and reception signals in Band 66 and Band 25 are received by the RFIC 3 through the primary antenna 15, the switch circuit 20, the switch circuit 72, and the second multiplexer.

Note that in the above-described connection form, the case of one-uplink two-downlink by passing through the output terminal 3a and the primary antenna 15 has been described as an example, but one-uplink two-downlink by passing through the output terminal 3b and the secondary antenna 16 is also possible.

Figure 17D:
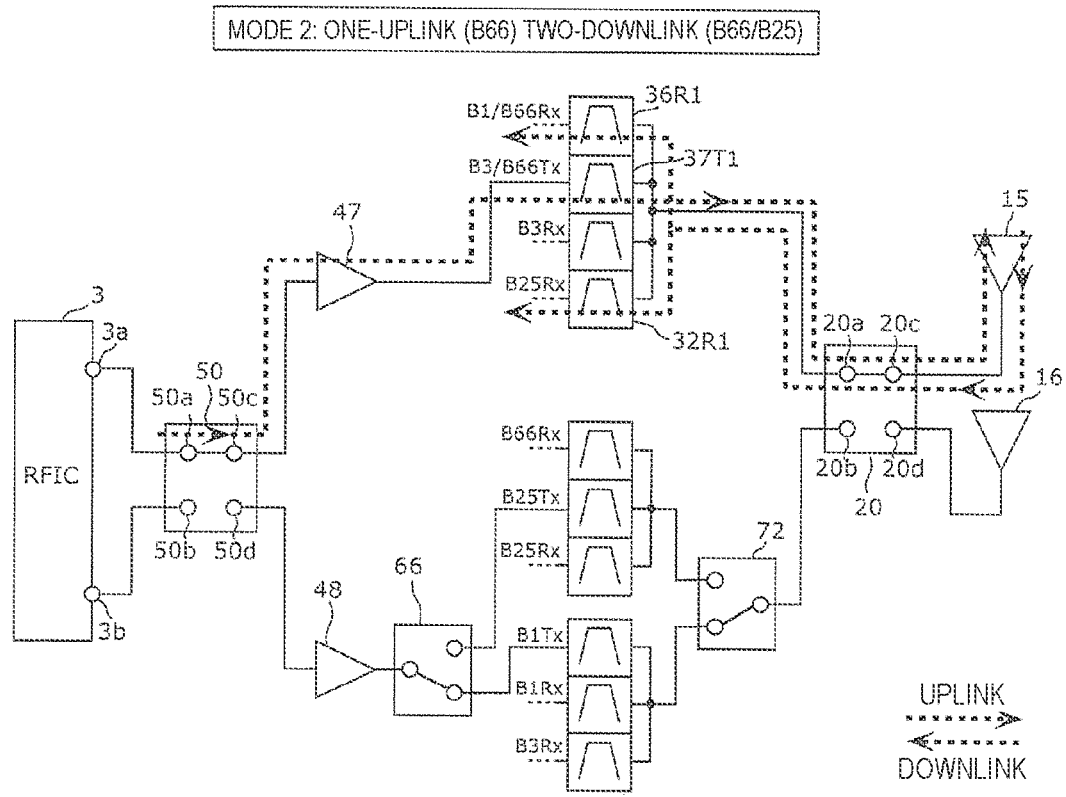
FIG. 17D is a circuit state diagram in a case of one-uplink (B66) two-downlink of the high-frequency front end module according to Modification 2 of Embodiment 3.

FIG. 17D is a circuit state diagram in a case of one-uplink two-downlink of the high-frequency front end module 2G according to Modification 2 of Embodiment 3. This diagram illustrates a circuit connection state in a case of one-uplink of Band 66 and two-downlink of Band 66 and Band 25 (mode 2: one-uplink two-downlink).

In the mode 2, as illustrated in FIG. 17D, by the control unit, the terminal 20a and the terminal 20c are connected to each other in the switch circuit 20 (third connection state). Furthermore, the terminal 50a and the terminal 50c are connected to each other in the switch circuit 50.

In this connection state, in the mode 2, a transmission signal in Band 66 is transmitted through the output terminal 3a, the switch circuit 50, the transmission amplifier 47, the first multiplexer, the switch circuit 20, and the primary antenna 15, and reception signals in Band 66 and Band 25 are received by the RFIC 3 through the primary antenna 15, the switch circuit 20, and the first multiplexer.

Note that in the above-described connection form, the case of one-uplink two-downlink by passing through the output terminal 3a and the primary antenna 15 has been described as an example, but one-uplink two-downlink by passing through the output terminal 3b and the secondary antenna 16 is also possible.

Figure 17E:
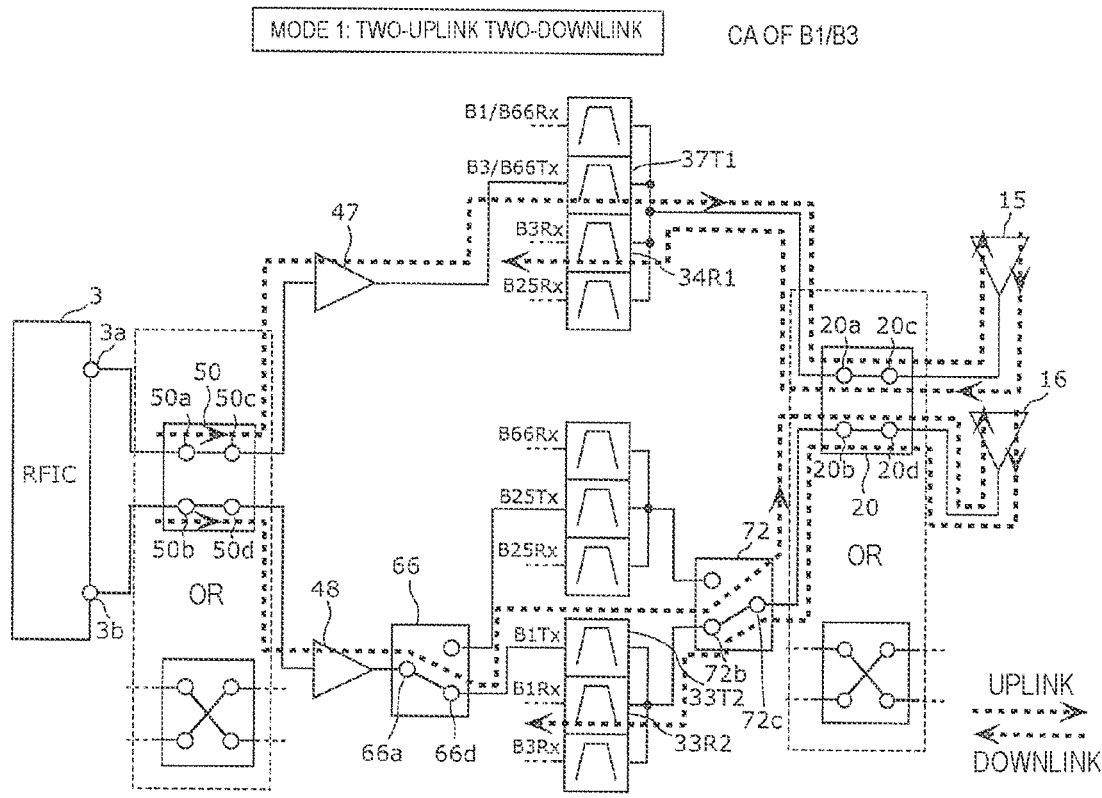
FIG. 17E is a circuit state diagram in a case of two-uplink (B1/B3) two-downlink of the high-frequency front end module according to Modification 2 of Embodiment 3.

FIG. 17E is a circuit state diagram in a case of two-uplink two-downlink of the high-frequency front end module 2G according to Modification 2 of Embodiment 3. This diagram illustrates a circuit connection state in a case of two-uplink of Band 1 and Band 3 and two-downlink of Band 1 and Band 3 (mode 1: two-uplink two-downlink).

In the mode 1, as illustrated in FIG. 17E, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

Furthermore, by the control unit, the common terminal 66a and the selection terminal 66d are connected to each other in the switch circuit 66, and the common terminal 72c and the selection terminal 72b are connected to each other in the switch circuit 72.

In this connection state, in the mode 1, a transmission signal in Band 3 is transmitted through the output terminal 3a, the switch circuit 50, the transmission amplifier 47, the first multiplexer, the switch circuit 20, and the primary antenna 15, and a transmission signal in Band 1 is transmitted through the output terminal 3b, the switch circuit 50, the transmission amplifier 48, the switch circuit 66, the second multiplexer, the switch circuit 72, the switch circuit 20, and the secondary antenna 16. Furthermore, a reception signal in Band 3 is received by the RFIC 3 through the primary antenna 15, the switch circuit 20, and the first multiplexer, and a reception signal in Band 1 is received by the RFIC 3 through the secondary antenna 16, the switch circuit 20, the switch circuit 72, and the second multiplexer.

Alternatively, in the mode 1, as illustrated in FIG. 17E, by the control unit, the terminal 20a and the terminal 20d are connected to each other, and the terminal 20b and the terminal 20c are connected to each other, in the switch circuit 20 (second connection state). Furthermore, the terminal 50a and the terminal 50d are connected to each other, and the terminal 50b and the terminal 50c are connected to each other, in the switch circuit 50.

Furthermore, by the control unit, the common terminal 66a and the selection terminal 66d are connected to each other in the switch circuit 66, and the common terminal 72c and the selection terminal 72b are connected to each other in the switch circuit 72.

In this connection state, in the mode 1, a transmission signal in Band 1 is transmitted through the output terminal 3a, the switch circuit 50, the transmission amplifier 48, the switch circuit 66, the second multiplexer, the switch circuit 72, the switch circuit 20, and the primary antenna 15, and a transmission signal in Band 3 is transmitted through the output terminal 3b, the switch circuit 50, the transmission amplifier 47, the first multiplexer, the switch circuit 20, and the secondary antenna 16. Furthermore, a reception signal in Band 1 is received by the RFIC 3 through the primary antenna 15, the switch circuit 20, the switch circuit 72, and the second multiplexer, and a reception signal in Band 3 is received by the RFIC 3 through the secondary antenna 16, the switch circuit 20, and the first multiplexer.

Figure 17F:
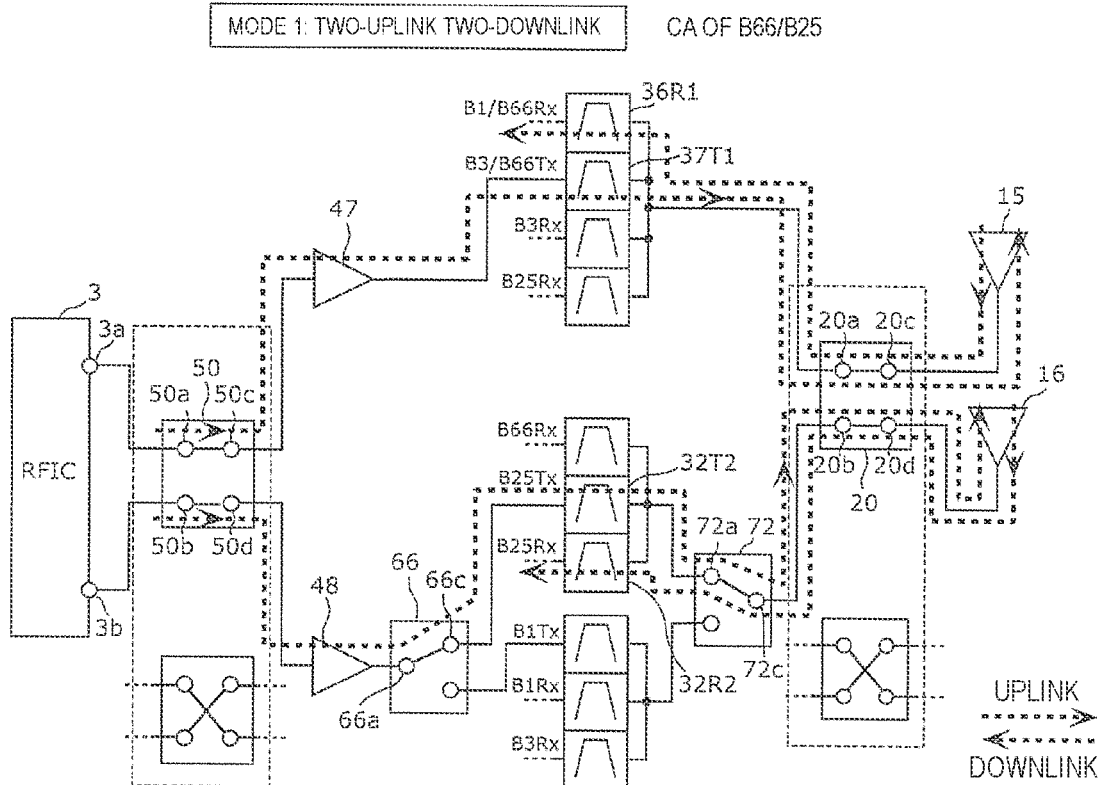
FIG. 17F is a circuit state diagram in a case of two-uplink (B66/B25) two-downlink of the high-frequency front end module according to Modification 2 of Embodiment 3.

FIG. 17F is a circuit state diagram in a case of two-uplink two-downlink of the high-frequency front end module 2G according to Modification 2 of Embodiment 3. This diagram illustrates a circuit connection state in a case of two-uplink of Band 66 and Band 25 and two-downlink of Band 66 and Band 25 (mode 1: two-uplink two-downlink).

In the mode 1, as illustrated in FIG. 17F, by the control unit, the terminal 20a and the terminal 20c are connected to each other, and the terminal 20b and the terminal 20d are connected to each other, in the switch circuit 20 (first connection state). Furthermore, the terminal 50a and the terminal 50c are connected to each other, and the terminal 50b and the terminal 50d are connected to each other, in the switch circuit 50.

Furthermore, by the control unit, the common terminal 66a and the selection terminal 66c are connected to each other in the switch circuit 66, and the common terminal 72c and the selection terminal 72a are connected to each other in the switch circuit 72.

In this connection state, in the mode 1, a transmission signal in Band 66 is transmitted through the output terminal 3a, the switch circuit 50, the transmission amplifier 47, the first multiplexer, the switch circuit 20, and the primary antenna 15, and a transmission signal in Band 25 is transmitted through the output terminal 3b, the switch circuit 50, the transmission amplifier 48, the switch circuit 66, the second multiplexer, the switch circuit 72, the switch circuit 20, and the secondary antenna 16. Furthermore, a reception signal in Band 66 is received by the RFIC 3 through the primary antenna 15, the switch circuit 20, and the first multiplexer, and a reception signal in Band 25 is received by the RFIC 3 through the secondary antenna 16, the switch circuit 20, the switch circuit 72, and the second multiplexer.

Alternatively, in the mode 1, as illustrated in FIG. 17F, by the control unit, the terminal 20a and the terminal 20d are connected to each other, and the terminal 20b and the terminal 20c are connected to each other, in the switch circuit 20 (second connection state). Furthermore, the terminal 50a and the terminal 50d are connected to each other, and the terminal 50b and the terminal 50c are connected to each other, in the switch circuit 50.

Furthermore, by the control unit, the common terminal 66a and the selection terminal 66c are connected to each other in the switch circuit 66, and the common terminal 72c and the selection terminal 72a are connected to each other in the switch circuit 72.

In this connection state, in the mode 1, a transmission signal in Band 25 is transmitted through the output terminal 3a, the switch circuit 50, the transmission amplifier 48, the switch circuit 66, the second multiplexer, the switch circuit 72, the switch circuit 20, and the primary antenna 15, and a transmission signal in Band 66 is transmitted through the output terminal 3b, the switch circuit 50, the transmission amplifier 47, the first multiplexer, the switch circuit 20, and the secondary antenna 16. Furthermore, a reception signal in Band 25 is received by the RFIC 3 through the primary antenna 15, the switch circuit 20, the switch circuit 72, and the second multiplexer, and a reception signal in Band 66 is received by the RFIC 3 through the secondary antenna 16, the switch circuit 20, and the first multiplexer.

OTHER EMBODIMENTS

Although the high-frequency front end modules and the communication devices according to the embodiments have been described above using the embodiments and the modifications thereof, the high-frequency front end module and the communication device according to the present disclosure are not limited to the above-described embodiments and the modifications thereof. The present disclosure also encompasses other embodiments that are implemented by combining desired constituent elements in the above-described embodiments and modifications thereof, modifications obtained by adding various changes to the above-described embodiments and modifications thereof, which are conceived by those skilled in the art, without departing from the gist of the present disclosure, and various apparatuses incorporating the high-frequency front end module and the communication device according to the present disclosure.

Note that, the above-described embodiments and modifications thereof have described the configuration of two-uplink two-downlink in which a high-frequency signal in the first frequency band and a high-frequency signal in the second frequency band are simultaneously used as an example, but the configurations of the high-frequency front end module and the communication device according to the present disclosure can also be applied to the configuration of uplink and/or downlink (for example, three-uplink three-downlink) in which three or more different frequency bands are simultaneously used. That is, the present disclosure also includes a high-frequency front end module or a communication device including the configuration for executing uplink and/or downlink in which three or more different frequency bands are simultaneously used, the configuration of the high-frequency front end module or the communication device according to the above-described embodiments and modification thereof.

For example, in the high-frequency front end modules and the communication devices according to the above-described embodiments and modifications thereof, other high-frequency circuit elements, wirings, and the like may be inserted between the paths connecting the respective circuit elements and signal paths disclosed in the drawings.

INDUSTRIAL APPLICABILITY

The present disclosure can be widely used for communication apparatuses, such as mobile phones, as a multi-band/multi-mode compatible front end module that adopts a carrier aggregation system.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:
1. A high-frequency front end module comprising:
a primary antenna terminal and a secondary antenna terminal;
a first multiplexer and a second multiplexer; and
a first switch circuit having a first terminal, a second terminal, a third terminal, and a fourth terminal,
wherein:
the first multiplexer comprises:
a first transmission filter having a pass band comprising a first transmission band, and
a first reception filter having a pass band comprising a first reception band,
wherein the first multiplexer does not comprise a transmission filter having a pass band comprising a second transmission band included in a second frequency band which is different from a first frequency band, and the second multiplexer comprises:
a second transmission filter having a pass band comprising the second transmission band, and
a second reception filter having a pass band comprising a second reception band, wherein the second multiplexer does not comprise a transmission filter having a pass band comprising the first transmission band, and wherein a band extending from minimum pass band frequency to a maximum pass band frequency of the filters of the first multiplexer at least partially overlaps a band extending from a minimum pass band frequency to a maximum pass band frequency of the filters of the second multiplexer, a first output terminal is connected to a first input terminal of the first transmission filter, a second output terminal is connected to a second input terminal of the second transmission filter, the first terminal is connected to the primary antenna terminal, the second terminal is connected to the secondary antenna terminal, the third terminal is connected to an output terminal of the first transmission filter and to an input terminal of the first reception filter, and the fourth terminal is connected to an output terminal of the second transmission filter and to an input terminal of the second reception filter.

2. The high-frequency front end module according to claim 1, further comprising:
a first amplifier having a first output terminal; and
a switch circuit having a common terminal and a plurality of selection terminals,
wherein the common terminal is connected to the first output terminal.

3. The high-frequency front end module according to claim 1, further comprising:
a switch circuit having a common terminal and a plurality of selection terminals,
wherein the common terminal is connected to the third terminal.

4. The high-frequency front end module according to claim 1, wherein, in the first switch circuit:
conduction between the third terminal and the first terminal and conduction between the third terminal and the second terminal are exclusively switched, and
conduction between the fourth terminal and the first terminal and conduction between the fourth terminal and the second terminal are exclusively switched.

5. The high-frequency front end module according to claim 1,
wherein the first multiplexer does not comprise a reception filter having a pass band comprising the second reception band, and
wherein the second multiplexer does not comprise a reception filter having a pass band comprising the first reception band.

6. The high-frequency front end module according to claim 5, wherein, when simultaneous transmission and simultaneous reception are performed in the first frequency band and the second frequency band, and when only one of a first signal in the first transmission band or a second signal in the second transmission band is transmitted and simultaneous reception in the first frequency band and the second frequency band are performed,
then a first connection state in which the third terminal and the first terminal are conductive to each other and the fourth terminal and the second terminal are conductive to each other, or a second connection state in which the third terminal and the second terminal are conductive to each other and the fourth terminal and the first terminal are conductive to each other is selected.

7. The high-frequency front end module according to claim 1,
wherein the first multiplexer further comprises a fourth reception filter having a pass band comprising the second reception band, and
wherein the second multiplexer further comprises a third reception filter having a pass band comprising the first reception band.

8. The high-frequency front end module according to claim 7,
wherein, simultaneous transmission and simultaneous reception are performed in the first frequency band and the second frequency band, a first connection state in which the third terminal and the first terminal are conductive to each other and the fourth terminal and the second terminal are conductive to each other, or a second connection state in which the third terminal and the second terminal are conductive to each other and the fourth terminal and the first terminal are conductive to each other is selected,
when transmission in the first frequency band is performed and a first signal in the first reception band and a second signal in the second reception band are simultaneously received, a third connection state in which the third terminal and the first terminal are conductive to each other, or a fourth connection state in which the third terminal and the second terminal are conductive to each other is selected, and
when transmission in the second frequency band is performed and the first signal in the first reception band and the second signal in the second reception band are simultaneously received, a fifth connection state in which the fourth terminal and the first terminal are conductive to each other, or a sixth connection state in which the fourth terminal and the second terminal are conductive to each other is selected.

9. The high-frequency front end module according to claim 7,
wherein the high-frequency front end module is configured to perform simultaneous transmission of two first transmission signals among a plurality of transmission signals in the first transmission band included in the first frequency band, a second transmission signal in the second transmission band included in the second frequency band which is different from the first frequency band, and a third transmission signal in a third transmission band included in a third frequency band which is different from the first frequency band and the second frequency band, and simultaneous reception of two first reception signals among a plurality of reception signals in the first reception band included in the first frequency band, a second reception signal in the second reception band included in the second frequency band, and a third reception signal in a third reception band included in the third frequency band,
wherein the first multiplexer further comprises:
a fifth transmission filter having a pass band comprising the third transmission band, and a fifth reception filter having a pass band comprising the third reception band, and
wherein the second multiplexer further comprises:
a sixth transmission filter having a pass band comprising the third transmission band, and
a sixth reception filter having a pass band comprising the third reception band.

10. The high-frequency front end module according to claim 1,
wherein, among a first transmission signal in the first transmission band included in the first frequency band, a second transmission signal in the second transmission band included in the second frequency band which is different from the first frequency band, and a third transmission signal in a third transmission band included in a third frequency band which is different from the first frequency band and the second frequency band, the high-frequency front end module is configured to perform simultaneous transmission of the first transmission signal in the first transmission band and the second transmission signal in the second transmission band, and simultaneous transmission of the first transmission signal in the first transmission band and the third transmission signal in the third transmission band are executed,
wherein among a first reception signal in the first reception band included in the first frequency band, a second reception signal in the second reception band included in the second frequency band, and a third reception signal in a third reception band which is included in the third frequency band and includes the second reception band, the high-frequency front end module is configured to perform simultaneous reception of the first reception signal in the first reception band and the second reception signal in the second reception band, and simultaneous reception of the first reception signal in the first reception band and the third reception signal in the third reception band are executed,
wherein the first multiplexer further comprises a fourth reception filter having a pass band comprising the third reception band,
wherein the second multiplexer further comprises a third reception filter having a pass band comprising the first reception band, and a sixth transmission filter having a pass band comprising the third transmission band, and
wherein the pass band of the second reception filter further comprises the third reception band.

11. The high-frequency front end module according to claim 1,
wherein the high-frequency front end module is configured to perform simultaneous transmission and simultaneous reception of the first frequency band and the second frequency band, and is configured to simultaneously transmit and simultaneously receive a fourth high-frequency signal in a fourth frequency band which is different from the first frequency band and the second frequency band, and a fifth high-frequency signal in a fifth frequency band which is different from the first frequency band, the second frequency band, and the fourth frequency band,
wherein the first frequency band is a band 66 of LTE (Long Term Evolution),
wherein the second frequency band is a band 25 of LTE,
wherein the fourth frequency band is a band 1 of LTE, and
wherein the fifth frequency band is a band 3 of LTE.

12. The high-frequency front end module according to claim 1,
wherein the high-frequency front end module is configured to perform simultaneous transmission and simultaneous reception of the first frequency band and the second frequency band, and is configured to simultaneously transmit and simultaneously receive a fourth high-frequency signal in a fourth frequency band which is different from the first frequency band and the second frequency band, and a fifth high-frequency signal in a fifth frequency band which is different from the first frequency band, the second frequency band, and the fourth frequency band,
wherein the first frequency band is a band 1 of LTE,
wherein the second frequency band is a band 3 of LTE,
wherein the fourth frequency band is a band 66 of LTE, and
wherein the fifth frequency band is a band 25 of LTE.

13. A communication device comprising:
the high-frequency front end module according to claim 1; and
an RF signal processing circuit configured to process a high-frequency signal transmitted and received by the high-frequency front end module.

14. The high-frequency front end module according to claim 1,
wherein the high-frequency front end module is configured to execute a two-uplink in which a first signal in the first transmission band included in the first frequency band and a second signal in the second transmission band included in the second frequency band which is different from the first frequency band are simultaneously transmitted, and a two-downlink in which a third signal in the first reception band included in the first frequency band and a fourth signal in the second reception band included in the second frequency band are simultaneously received.

* * * * *

UNITED STATES PATENT AND TRADEMARK OFFICE
CERTIFICATE OF CORRECTION

PATENT NO. : 11,621,732 B2
APPLICATION NO. : 17/651922
DATED : April 4, 2023
INVENTOR(S) : Motoji Tsuda et al.

It is certified that error appears in the above-identified patent and that said Letters Patent is hereby corrected as shown below:

In the Specification

Column 12, Line 31, "LA" should be -- 1A --.

Column 20, Line 64, "LA" should be -- 1A --.

Column 48, Line 59, "Band (mode 2" should be -- Band 3 (mode 2 --.

Signed and Sealed this
Second Day of January, 2024

Katherine Kelly Vidal
*Director of the United States Patent and Trademark Office*